United States Patent
Wang et al.

(10) Patent No.: US 12,407,032 B2
(45) Date of Patent: Sep. 2, 2025

(54) ELECTRIC VEHICLE AND BATTERY SYSTEM

(71) Applicant: Globe (Jiangsu) Co. Ltd., Changzhou (CN)

(72) Inventors: Wenwei Wang, Changzhou (CN); Qunli Wei, Changzhou (CN); Jiafu Xue, Changzhou (CN); Dongdong Shi, Changzhou (CN); Hui Chen, Changzhou (CN); Peng Zhao, Changzhou (CN); Qinghua Shi, Changzhou (CN)

(73) Assignee: Globe (Jiangsu) Co. Ltd. (CN)

( * ) Notice: Subject to any disclaimer, the term of this patent is extended or adjusted under 35 U.S.C. 154(b) by 321 days.

(21) Appl. No.: 17/913,564

(22) PCT Filed: Mar. 25, 2021

(86) PCT No.: PCT/CN2021/083071
§ 371 (c)(1),
(2) Date: Sep. 22, 2022

(87) PCT Pub. No.: WO2021/190612
PCT Pub. Date: Sep. 30, 2021

(65) Prior Publication Data
US 2023/0105559 A1    Apr. 6, 2023

(30) Foreign Application Priority Data

Mar. 26, 2020 (CN) .......................... 202010222174.8
Mar. 26, 2020 (CN) .......................... 202010222359.9
(Continued)

(51) Int. Cl.
*H01M 10/44* (2006.01)
*A01D 34/66* (2006.01)
(Continued)

(52) U.S. Cl.
CPC ............ *H01M 10/441* (2013.01); *B60L 1/00* (2013.01); *B60L 50/64* (2019.02);
(Continued)

(58) Field of Classification Search
CPC ... H01M 10/441; H01M 50/249; B60L 50/64; B60L 1/00; A01D 34/66; A01D 34/178; A01D 69/02
(Continued)

(56) References Cited

U.S. PATENT DOCUMENTS 8,575,800 B1 * 11/2013 Fox ........................ A01D 69/02
                                                      310/157
9,840,143 B1 * 12/2017 Keller ..................... F16H 57/04
(Continued)

FOREIGN PATENT DOCUMENTS

| CN | 1074867 | 8/1993 |
|----|---------|--------|
| CN | 2886896 | 4/2007 |

(Continued)

OTHER PUBLICATIONS

International Search Report for related International Patent Application No. PCT/CN2021/083071 issued on Jul. 6, 2021 and English translation.

*Primary Examiner* — Hau V Phan
(74) *Attorney, Agent, or Firm* — Shumaker, Loop & Kendrick, LLP; Brandon C. Trego

(57) ABSTRACT

The present application provides an electric vehicle and a battery system. The electric vehicle comprises: a frame; a first power consumption unit and a second power consumption unit, the first power consumption unit and the second power consumption unit being connected to the frame; and a battery system, comprising a first power supply unit and a second power supply unit, the first power supply unit and the second power supply unit each comprising at least one
(Continued)

battery pack, the first power supply unit supplying power to the first power consumption unit, and the second power supply unit supplying power to the second power consumption unit, wherein the at least one battery pack can supply power to a handheld tool.

6 Claims, 34 Drawing Sheets

(30) Foreign Application Priority Data

| | | |
|---|---|---|
| Mar. 26, 2020 | (CN) | 202020399165.1 |
| Mar. 27, 2020 | (CN) | 202010227225.6 |
| Apr. 27, 2020 | (CN) | 202010341659.9 |
| Jun. 2, 2020 | (CN) | 202010489646.6 |
| Oct. 16, 2020 | (CN) | 202011107782.0 |
| Jan. 14, 2021 | (CN) | 202110048184.9 |

(51) Int. Cl.
    *B60L 1/00*      (2006.01)
    *B60L 50/64*      (2019.01)
    *H01M 50/249*      (2021.01)
    *A01D 34/78*      (2006.01)
    *A01D 69/02*      (2006.01)
    *A01D 101/00*      (2006.01)

(52) U.S. Cl.
CPC ........... *H01M 50/249* (2021.01); *A01D 34/66* (2013.01); *A01D 34/78* (2013.01); *A01D 69/02* (2013.01); *A01D 2101/00* (2013.01); *H01M 2220/20* (2013.01)

(58) Field of Classification Search
USPC ...................................................... 180/68.5
See application file for complete search history.

(56) References Cited

U.S. PATENT DOCUMENTS

| | | | | |
|---|---|---|---|---|
| 10,426,084 | B2* | 10/2019 | Ito | A01D 34/78 |
| 10,882,509 | B2* | 1/2021 | Books | B60K 6/448 |
| 11,199,798 | B2* | 12/2021 | Morishita | G03G 15/5004 |
| 11,942,807 | B2* | 3/2024 | Wang | H02J 7/00304 |
| 2003/0037525 | A1* | 2/2003 | Iida | A01D 34/6812 |
| | | | | 56/11.9 |
| 2004/0021437 | A1* | 2/2004 | Maslov | H02K 1/141 |
| | | | | 318/400.01 |
| 2005/0087375 | A1 | 4/2005 | Steele et al. | |
| 2010/0307844 | A1 | 12/2010 | Peters | |
| 2012/0186887 | A1* | 7/2012 | Moriguchi | B60L 58/15 |
| | | | | 180/65.1 |
| 2012/0228946 | A1 | 9/2012 | Sim et al. | |
| 2012/0317949 | A1* | 12/2012 | Abe | H01H 3/20 |
| | | | | 56/11.9 |
| 2014/0084689 | A1 | 3/2014 | Jung et al. | |
| 2014/0137528 | A1* | 5/2014 | Schygge | A01D 34/78 |
| | | | | 180/14.1 |
| 2014/0165524 | A1* | 6/2014 | Schygge | B60L 1/16 |
| | | | | 180/62 |
| 2016/0183451 | A1* | 6/2016 | Conrad | A01D 34/66 |
| | | | | 56/10.2 R |
| 2017/0263914 | A1 | 9/2017 | Ito et al. | |
| 2018/0118011 | A1* | 5/2018 | Grace | B60L 58/26 |
| 2018/0303027 | A1* | 10/2018 | Koike | B60L 50/51 |
| 2019/0124837 | A1* | 5/2019 | Ito | A01D 69/02 |
| 2019/0152342 | A1* | 5/2019 | Shen | B60L 50/64 |
| 2019/0199118 | A1 | 6/2019 | Hoppel et al. | |
| 2019/0381988 | A1* | 12/2019 | Matsuda | B60L 58/12 |

FOREIGN PATENT DOCUMENTS

| | | |
|---|---|---|
| CN | 101128287 | 2/2008 |
| CN | 102082307 | 6/2011 |
| CN | 102122740 | 7/2011 |
| CN | 102145691 | 8/2011 |
| CN | 201961148 | 9/2011 |
| CN | 202712292 | 1/2013 |
| CN | 203120457 | 8/2013 |
| CN | 103283403 | 9/2013 |
| CN | 103518487 | 1/2014 |
| CN | 104167770 | 11/2014 |
| CN | 203575118 | 5/2015 |
| CN | 105172988 | 12/2015 |
| CN | 105552260 | 5/2016 |
| CN | 105799549 | 7/2016 |
| CN | 106210208 | 12/2016 |
| CN | 106891753 | 6/2017 |
| CN | 107054451 | 8/2017 |
| CN | 107093918 | 8/2017 |
| CN | 108146294 | 6/2018 |
| CN | 110228369 | 9/2019 |
| CN | 110827495 | 2/2020 |
| CN | 110834558 | 2/2020 |
| CN | 210617861 | 5/2020 |
| CN | 111296044 | 6/2020 |
| CN | 111313503 | 6/2020 |
| CN | 212573554 | 2/2021 |
| EP | 2332760 | 6/2011 |
| JP | 2002078214 | 3/2002 |
| JP | 2016166864 | 9/2016 |
| JP | 6300127 | 12/2016 |
| JP | 2016206685 | 12/2016 |
| JP | 2019137104 | 8/2019 |
| KR | 20050042716 | 5/2005 |
| WO | 2020025024 | 2/2020 |

\* cited by examiner

ELECTRIC VEHICLE AND BATTERY SYSTEM

TECHNICAL FIELD

The invention relates to the technical field of garden equipment, in particular to an electric vehicle and a battery system.

BACKGROUND TECHNIQUE

The type of battery pack used for lithium-ion mounted garden tools currently on the market is usually a large battery pack or a combination of several small battery packs. The output energy is used for walking, mowing or other garden tools at the same time. Accessory use. With this setting, if one battery pack or one of several battery pack combinations is damaged, the power supply of the whole machine will be abnormal and it will not be able to drive, and then the operator will not be able to operate the machine outdoors; the garden tools will be sent to the designated transportation point or In the process of maintenance, the machine can only be transported by labor or other tools, which damages the user experience of garden tools.

SUMMARY OF THE INVENTION

The present disclosure provides an electric vehicle, including:
frame;
A first power consuming unit and a second power consuming unit, the first power consuming unit and the second power consuming unit are connected to the rack; and
A battery system includes a first power supply unit and a second power supply unit, the first power supply unit and the second power supply unit each include at least one battery pack, and the first power supply unit supplies power to the first power consumption unit, The second power supply unit supplies power to the second power consumption unit;
Wherein, at least one of the battery packs can supply power to the hand-held tool.

The present disclosure provides a battery system, including:
The first power supply unit supplies power to the first power consumption unit; and
The second power supply unit supplies power to the second power consumption unit;
Wherein, the first power supply unit and the second power supply unit both include at least one battery pack, and at least one of the battery packs can supply power to the handheld tool.

In summary, the present disclosure proposes an electric vehicle and a battery system. By providing a battery system on the electric vehicle, the battery system can include different power supply units, and different power supply units can supply power to different power consumption units, thus avoiding the abnormal use of the battery system is caused by the damage of the battery pack in the single power supply unit, thereby making the electric vehicle convenient to use, with high use efficiency and good user experience.

DETAILED WAYS

The following describes the implementation of the present invention through specific examples, and those skilled in the art can easily understand other advantages and effects of the present invention from the content disclosed in this specification. The present invention can also be implemented or applied through other different specific embodiments, and various details in this specification can also be modified or changed based on different viewpoints and applications without departing from the spirit of the present invention.

It should be noted that the illustrations provided in this embodiment only illustrate the basic idea of the present invention in a schematic manner. The figures only show the components related to the present invention instead of the number, shape, and shape of the components in actual implementation. For the size drawing, the type, quantity, and proportion of each component can be changed at will during actual implementation, and the component layout type may also be more complicated.

Figure 1:
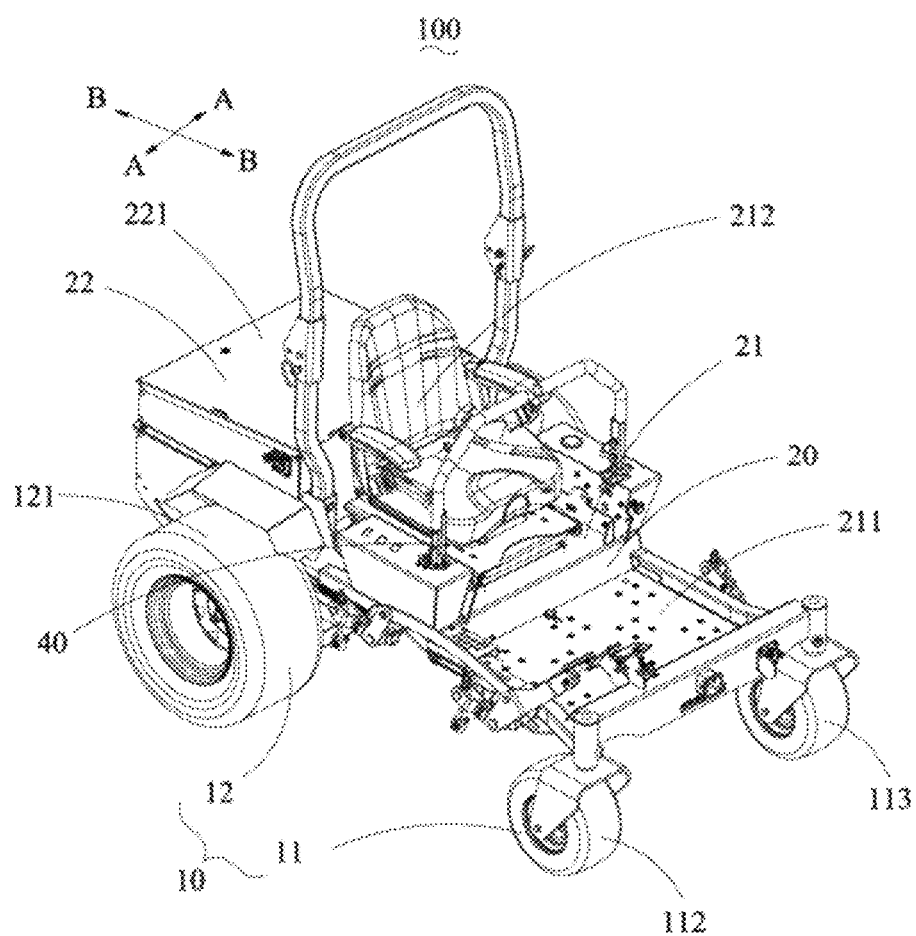
FIG. 1 is a schematic diagram of the three-dimensional structure of the mounted electric tool of the present invention.
Figure 2:
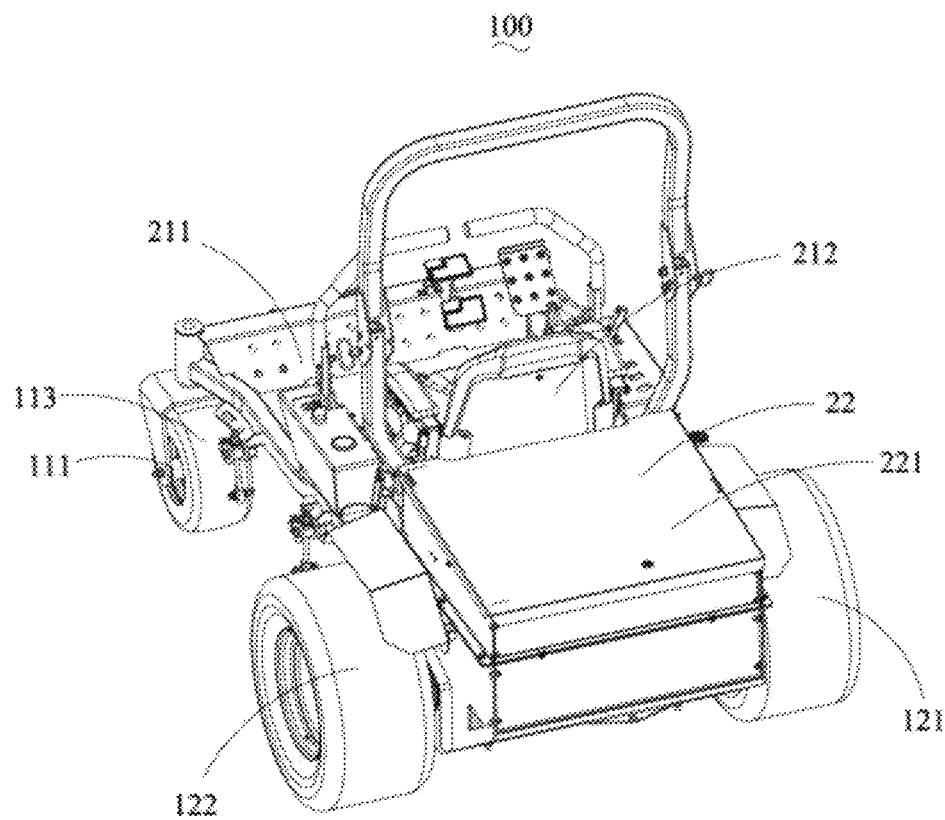
FIG. 2 is a schematic view of another perspective three-dimensional structure of the mount-type electric tool shown in FIG. 1.
Figure 3:
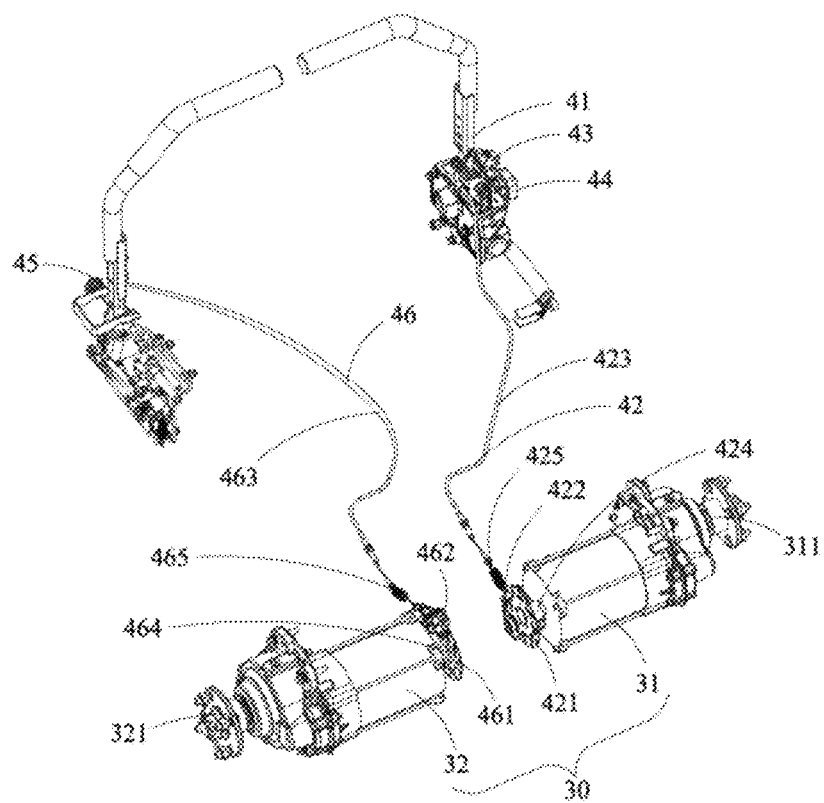
FIG. 3 is a schematic diagram of the cooperation of the driving mechanism and the operating mechanism.

As shown in FIGS. 1 to 3, the present invention discloses a mount-type electric tool 100, which includes a walking wheel 10, a frame 20 mounted on the walking wheel 10, and a frame 20 mounted on the frame 20 to perform the operation. The working mechanism (not shown) that functions of the mount-type electric power tool 100, the driving mechanism 30 and the operating mechanism 40 that drive the traveling wheels 10 to work are described.

As shown in FIGS. 1 to 3, the walking wheel 10 includes a front wheel 11 and a rear wheel 12 arranged opposite to the front wheel 11 and matched with the driving mechanism 30. The front wheel 11 includes a front axle 111 and a first front wheel 112 and a second front wheel 113 installed at both ends of the front axle 111. The rear wheel 12 includes a first rear wheel 121 and a second rear wheel 122 opposite to the first rear wheel 121.

As shown in FIGS. 1 to 2, the frame 20 is mounted on the walking wheel 10, and includes a base 21 located between the front wheel 11 and the rear wheel 12 and the rear wheel 12 facing away from the front The tail 22 on the side of the wheel 11. The base 21 is provided with a pedal 211 and a seat 212. The pedal 211 is located on the side of the base 21 away from the tail 22 for the user to step on. The seat 212 is located between the pedal 211 and the tail 22. The tail portion 22 is provided with a receiving cavity 221 for receiving various tools, parts and the like. The operating mechanism is installed on the side of the base 21 facing away from the seat 212 to perform the functions of the mounted electric tool 100. In this embodiment, the operating mechanism is a blade for mowing grass.

As shown in FIG. 3, the driving mechanism 30 is used to drive the rear wheel 12 to rotate, and includes a first motor 31 and a second motor 32 disposed opposite to the first motor 31. The first motor 31 is provided with a first output shaft 311. The first rear wheel 121 is mounted on the first output shaft 311 to be driven by the first motor 31 to rotate. The second motor 32 is provided with a second output shaft 321. The second rear wheel 122 is mounted on the second output shaft 321 to be driven by the second motor 32 to rotate. The first output shaft 311 and the second output shaft 321 jointly constitute the output shaft of the driving mechanism 30 to output power to the traveling wheel 10.

As shown in FIG. 3, the operating mechanism 40 includes a handle and a brake assembly matched with the handle; the brake assembly includes a brake disc mounted on the output shaft of the driving mechanism 30, and is opposite to the brake disc. Matching brake calipers and brake cables; one end of the brake cable is connected to the handle, and the other end is connected to the brake caliper; when the handle is pushed to move from neutral to parking, the handle drives the brake cable Movement so that the brake caliper clamps the brake disc under the action of the brake wire.

Figure 4:
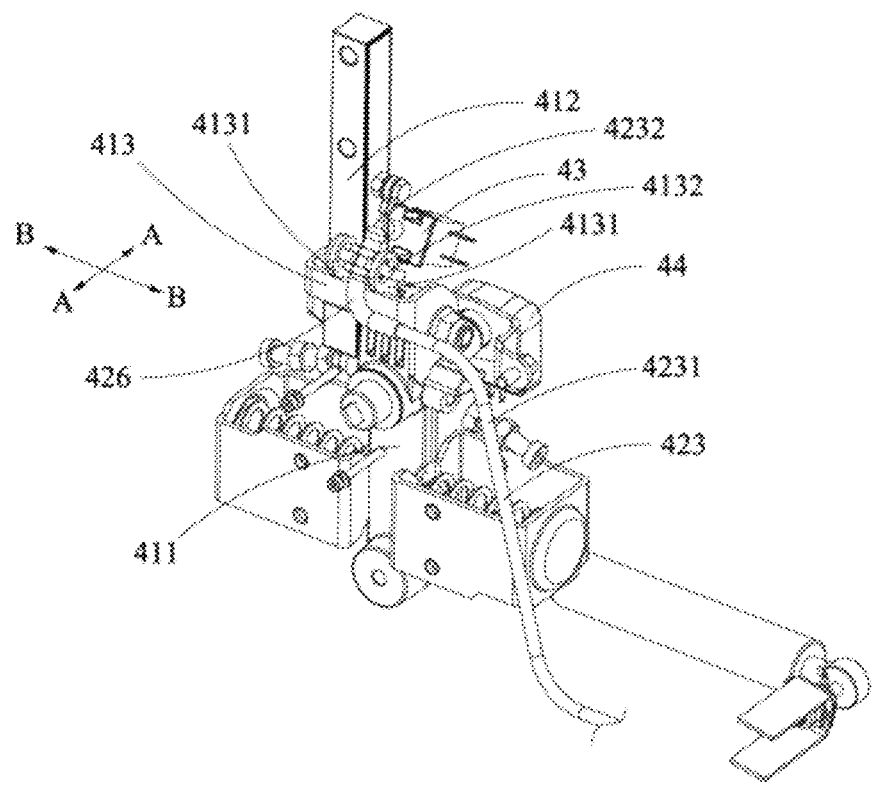
FIG. 4 is a schematic diagram of the structure of the first handle.

As shown in FIGS. 3 to 4, the operating mechanism 40 further includes a first control element 43 and a second control element 44; the handle includes a first handle 41 and a second handle disposed opposite to the first handle 41 45; The brake assembly includes a first brake assembly 42 matched with the first handle 41 and a second brake assembly 46 matched with the second handle 45. The first handle 41 includes a swing arm 411 that is pivotally mounted on the base 21 and swings in the second direction BB (as shown in FIG. The swing arm 411 is a control arm 412 that swings along the first direction AA (as shown in FIG. 4). A support arm 413 is fixedly installed at one end of the swing arm 411 close to the control arm 412, and the support arm 413 is located on the side of the control arm 412 away from the parking gear. This arrangement can effectively prevent the support arm 413 from obstructing the movement of the control arm 412 from the neutral gear to the parking gear. In this embodiment, the support arm 413 is located on the side of the control arm 412 facing the seat 212.

Figure 5:
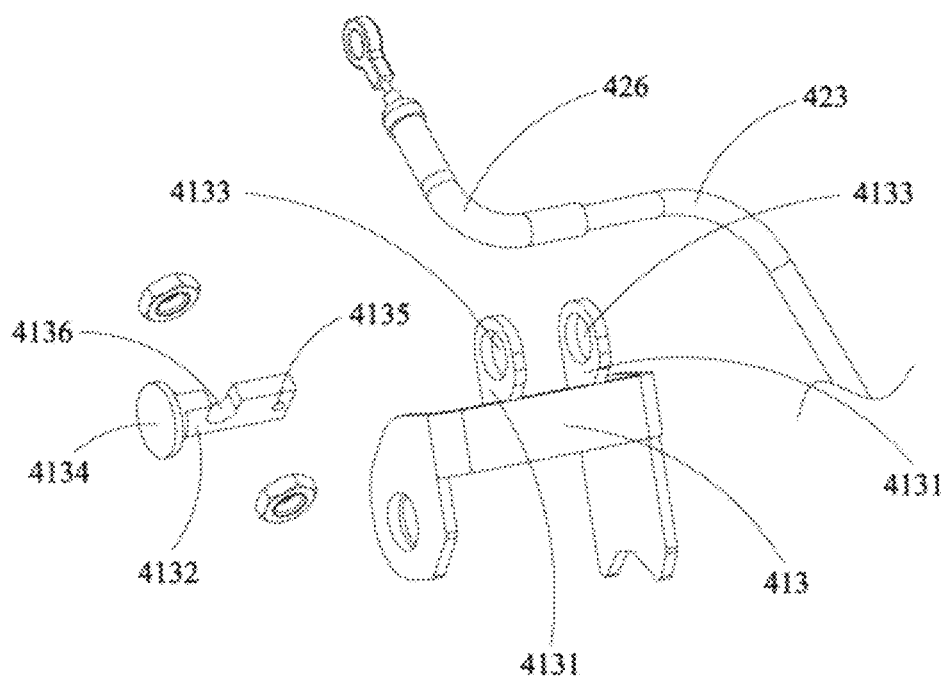
FIG. 5 is a schematic diagram of the cooperation between the support arm and the first brake line.

As shown in FIGS. 4 to 5, the supporting arm 413 is provided with a pair of brackets 4131 and a cable fixing plate 4132 installed on the pair of brackets 4131 and used for fixing the brake cable. The bracket 4131 is provided with a mounting hole 4133. The cable fixing plate 4132 is pivotally mounted on the bracket 4131 so that the cable fixing plate 4132 can rotate. One end of the cable fixing plate 4132 is provided with a limiting portion 4134, and the other end is provided with a limiting hole 4135 and a limiting pin (not shown) matched with the limiting hole 4135. The cable fixing plate 4132 passes through the mounting hole 4133, and the pair of brackets 4131 are located between the limiting portion 4134 and the limiting pin. One side of the cable fixing plate 4132 is further provided with a bayonet 4136 for holding the brake wire, and the bayonet 4136 is located between the limiting portion 4134 and the limiting hole 4135. The spacing between the limiting portion 4134 and the limiting pin is slightly larger than the spacing between the pair of brackets 4131, so that the cable fixing plate 4132 can slide in the connecting direction of the pair of brackets 4131, Thereby making the movement of the brake cable more reliable. The first brake assembly 42 includes a first brake disc 421 mounted on the first output shaft 311, a first brake caliper 422 matched with the first brake disc 421, a first brake cable 423, and a cable adjustment Rod 426. The first brake wire 423 includes a brake sleeve 4231 and a steel wire 4232 located in the brake sleeve 4231. One end of the brake sleeve 4231 is installed on the first brake caliper 422, and the other end is installed on the cable adjusting rod 426; the cable adjusting rod 426 is clamped and fixed on the bayonet 4136 to fix the Mentioned first brake line 423. One end of the steel wire 4232 is installed on the brake caliper 422, and the other end is connected to the control arm 412. The cable adjusting rod 426 is used to adjust the tightness between the brake sleeve 4231 and the steel wire 4232, thereby adjusting the braking effect. The cable adjusting rod 426 is an existing structure. Since the cable adjusting rod 426 is mounted on the cable fixing plate 4132, and the cable fixing plate 4132 can be rotated, the cable adjusting rod 426 can freely adjust the angle according to the position of the control arm 412, and then This allows the user to easily pull the steel wire 4232. A flange 424 is installed on the first output shaft 311, and the first brake disc 421 is installed on the flange 424. A first brake spring 425 is also provided between the first brake wire 423 and the first brake caliper 422. The first control element 43 is used to cooperate with the control arm 412 and the second handle 45 of the first handle 41 to control the driving mechanism 30 to be energized or de-energized.

Figure 6:
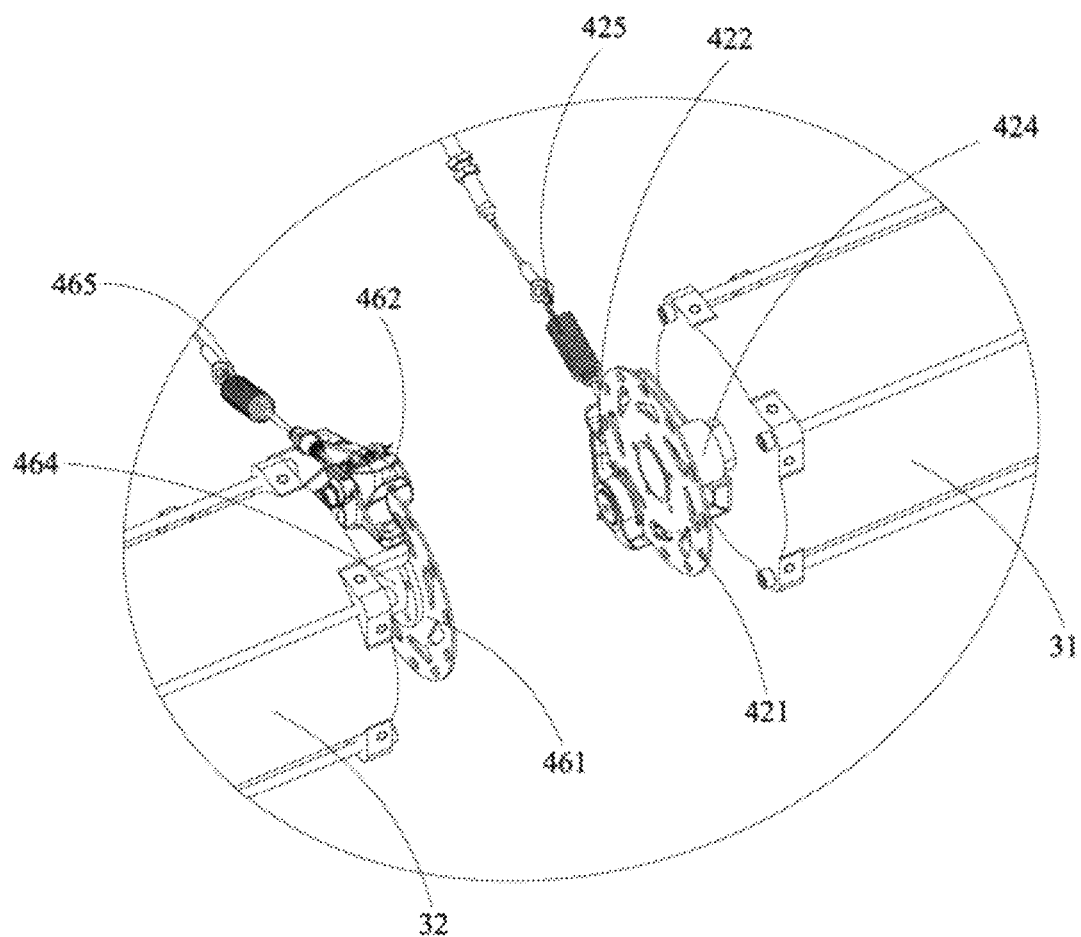
FIG. 6 is a partial enlarged view of FIG. 3.

As shown in FIGS. 4-6, there are, for example, two first control elements 43, which are matched with the first handle 41 and the second handle 45, respectively. In this embodiment, the first control element 43 is a switch. However, it can be understood that the first control element 43 may also have other structures. For example, the first control element 43 may be a displacement sensor, and the displacement sensor controls the driving mechanism 30 to be energized or de-energized according to the displacement of the control arm 412. The present invention does not limit the specific structure of the first control element 43. The second control element 44 is used to cooperate with the swing arm 411 to control the driving mechanism 30 to rotate forward or reverse, or accelerate or decelerate. In this embodiment, the second control element 44 is a rotational position sensor. However, it can be understood that the second control element 44 may also have other structures, such as a pressure sensor, a distance sensor, and so on. The present invention does not limit the specific structure of the second control element 44. The second brake assembly 46 includes a second brake disc 461 installed on the second output shaft 321, a second brake caliper 462 matched with the second brake disc 461, and a second brake wire 463. One end of the second brake wire 463 is connected to the second handle 45, and the other end is connected to the second brake caliper 462. A flange 464 is installed on the second output shaft 321, and the second brake caliper 462 is installed on the flange 464. A second brake spring 465 is also provided between the second brake wire 463 and the second brake caliper 462.

As shown in FIGS. 4-6, the second brake assembly 46 is controlled by the second handle 45, but it is understandable that the first brake assembly 42 and the second brake assembly 46 can pass through at the same time. The first handle 41 is controlled, that is, one end of the second brake wire 463 is connected to the second brake caliper 462, and the other end is connected to the control arm 412.

As shown in FIGS. 4-6, the first output shaft 311 and the second output shaft 321 are further provided with a first keyway (not shown), and the flanges 424, 464 are also provided with a first keyway. Oppositely arranged second key grooves (not shown), the first key grooves and the second key grooves are matched by a moment key to transmit the power output by the first output shaft 311 and the second output shaft 321 to the Flange 424, flange 464.

As shown in FIG. 4, when the first handle 41 is pushed in the first direction AA to move from neutral to parking, the control arm 412 drives the first brake wire 423 to move, so that the first the brake caliper 422 clamps the first brake disc 421 under the action of the first brake wire 423 to achieve parking brake. At this time, the control arm 412 cooperates with the first control element 43 to control the driving mechanism 30 is powered off. When the first handle 41 moves from the parking position to the neutral position, the first control element 43 controls the driving mechanism 30 to be powered on. When the first handle 41 is pushed in the second direction BB to move from the neutral position to the second position (that is, the forward position), the driving mechanism 30 rotates forward to drive the mounted electric tool 100 forward; When the first handle 41 is moved from the neutral position to the third position (that is, the reverse gear) in the two directions BB, the driving mechanism 30 reverses to drive the mounted electric tool 100 to move backward. When the second handle 45 is pushed in the first direction AA to move from neutral to the fourth position (that is, the brake gear), the second handle 45 drives the second brake wire 463 to move, so that the second the brake caliper 462 clamps the second brake disc 461 under the action of the second brake wire 463 to achieve parking brake. At this time, the second handle 45 cooperates with the first control element 43 to the driving mechanism 30 is controlled to be powered off. Due to the simple structure and high reliability of the first brake assembly 42 and the second brake assembly 46, the cumbersome operation of manual release of the existing electromagnetic brake can be effectively avoided when the whole machine cannot be powered on. The user only needs to place the first handle 41 and the second handle 45 in the neutral position, and then can easily push the mount-type electric tool 100 to a maintenance point for maintenance.

As shown in FIG. 1, the present invention also discloses a mounted lawn mower, including a walking wheel 10, a frame 20 mounted on the walking wheel 10, and a frame 20 mounted on the frame 20 to perform lawn mowing work. A cutter head assembly (not shown), a driving mechanism 30 and an operating mechanism 40 that drive the traveling wheel 10 to work.

As shown in FIG. 1, the parking brake of the mount-type electric tool 100 of the present invention has a simple structure, high reliability, and low cost. When the power fails, the user can easily release the brake to push the mount-type electric tool 100 for maintenance. Point for repairs.

Figure 7:
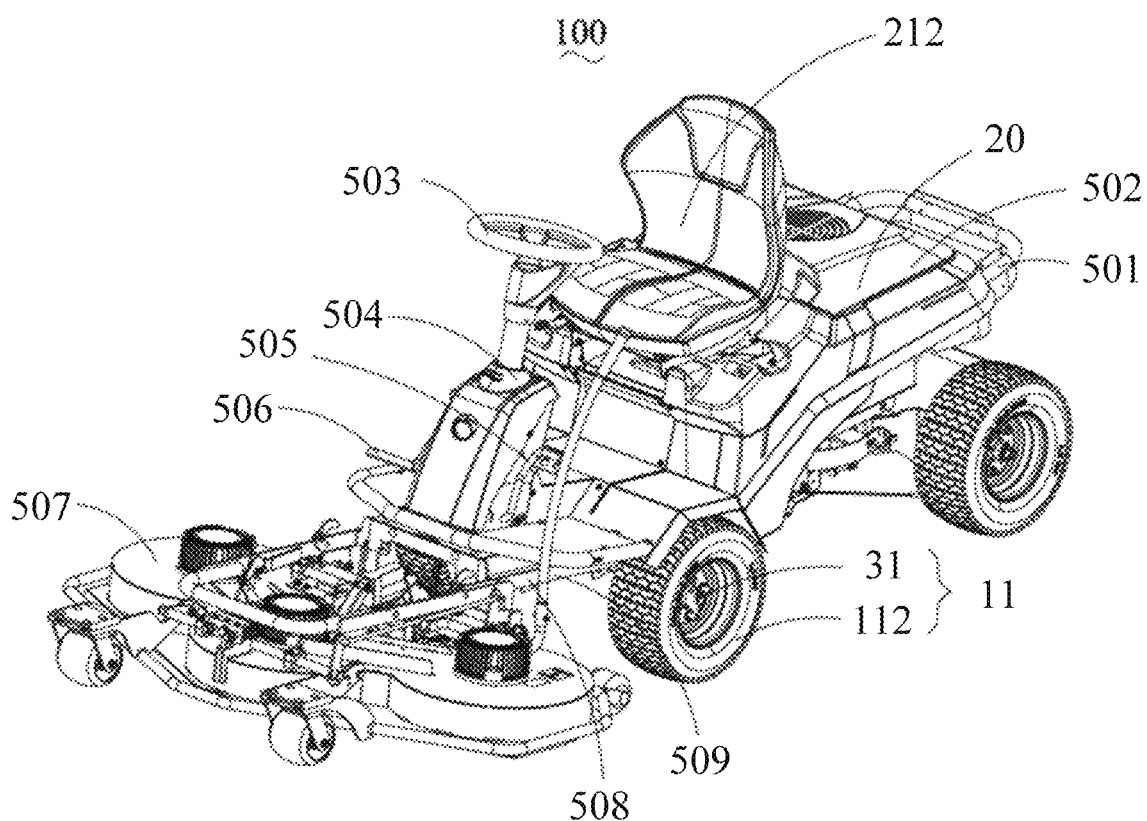
FIG. 7 is a three-dimensional schematic diagram of the electric vehicle of the present invention.
Figure 8:
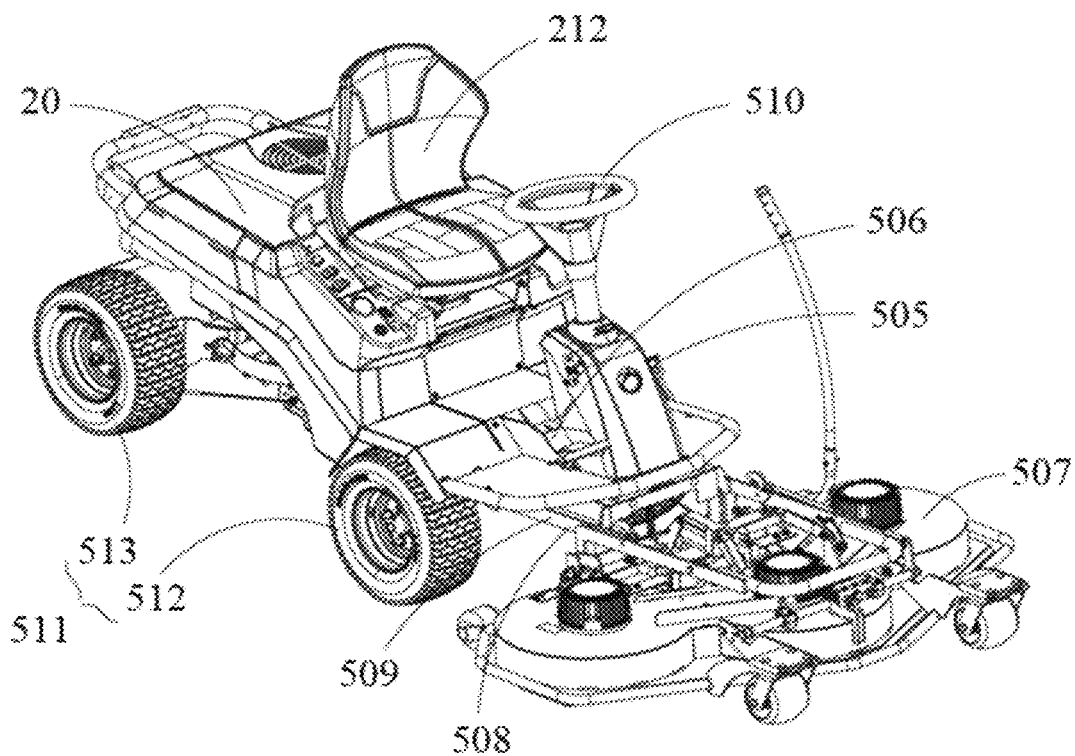
FIG. 8 is a perspective schematic view of the electric vehicle shown in FIG. 7 from another angle.
Figure 12:
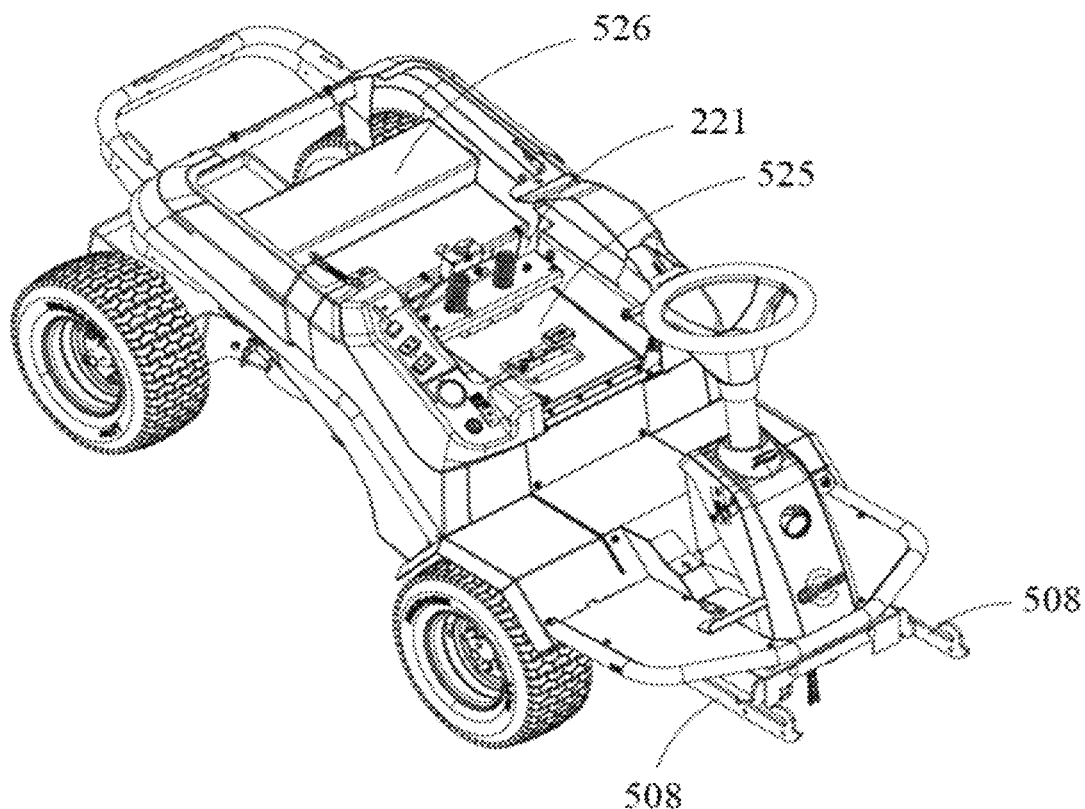
FIG. 12 is a perspective schematic view of the electric vehicle shown in FIG. 7 with the working mechanism and housing removed.

As shown in FIGS. 7-8 and 12, the present invention discloses an electric tool 100, which includes a frame 20, a drive assembly 511 installed at the bottom of the frame 20, a steering assembly 504, and a brake assembly (not shown), a power supply unit 525, a control unit 526, and an operating mechanism 507. The power supply component 525 supplies power to the driving component 511, the control component 526 and the operating mechanism 507. In this embodiment, the operating mechanism 507 is a cutter head assembly for cutting grass, but in other embodiments, the operating mechanism 507 may also be a snow shovel, a snow sweeping assembly, a blowing and suction assembly, and the like. The electric tool 100 may be an electric vehicle, for example, an electric lawn mower.

Figure 9:
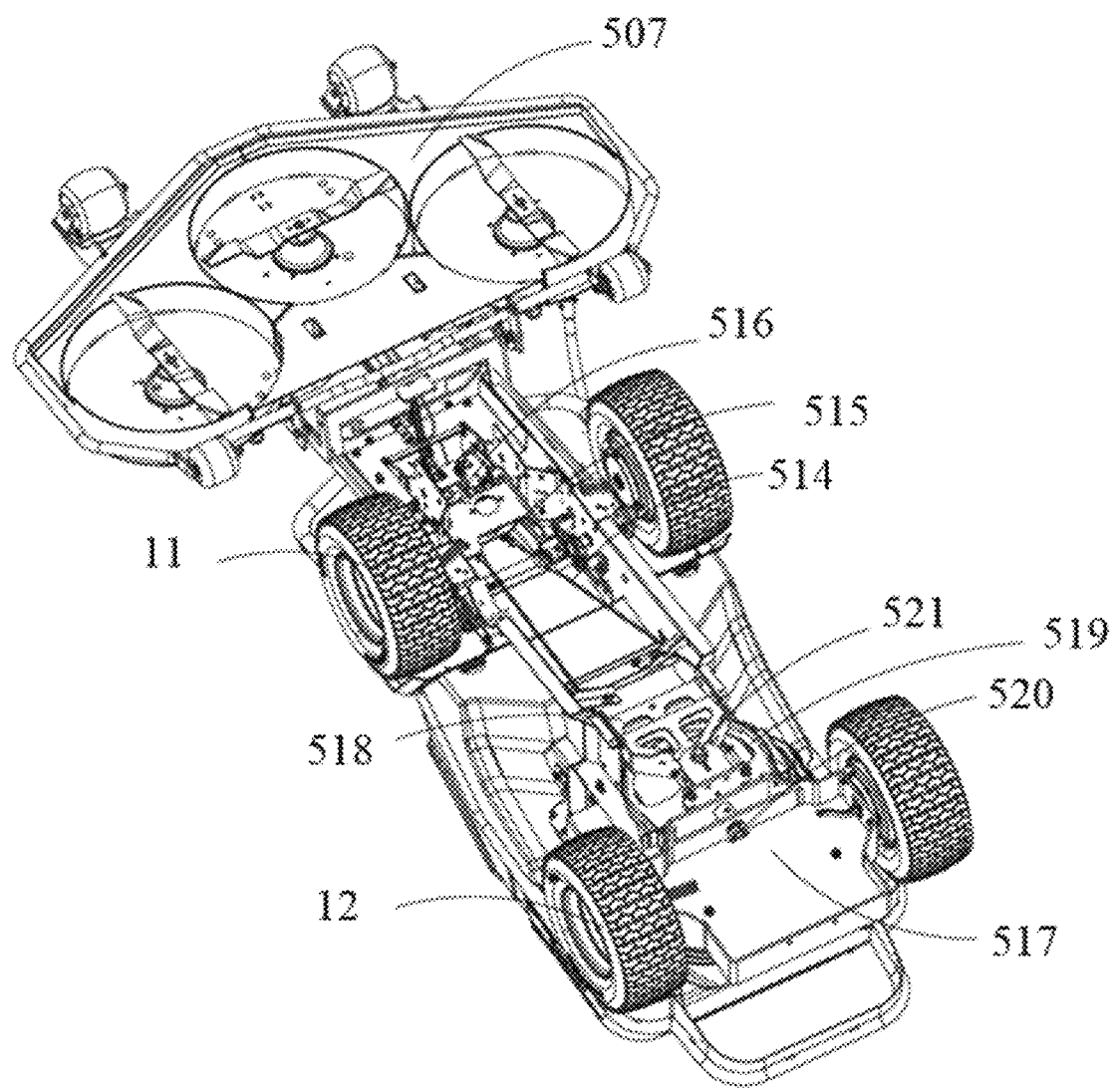
FIG. 9 is a schematic diagram of the bottom of the electric vehicle shown in FIG. 7.

As shown in FIGS. 7-9, the frame 20 includes a frame 501, a shell 502 mounted on the frame 501, a seat 212 mounted in the middle of the frame 501, and a seat 212 mounted on the frame 501. The suspension assembly 509, the left foot control assembly 505, and the right foot control assembly 506 at the front of the frame 501. The frame 501 and the housing 502 jointly form a receiving cavity 221 for receiving the power supply assembly 525 and the control assembly 526. The seat 212 is pivotally mounted on the frame 501 and located above the receiving cavity 221. When the seat 212 is rotated, the receiving cavity 221 is exposed to the outside, so that the user can place or take out the power supply assembly 525 and the control assembly 526. In this embodiment, the power supply assembly 525 is located directly below the seat 212, and the control assembly 526 is located on the side of the power supply assembly 525 away from the operating mechanism 507. The suspension assembly 509 includes a cantilever 508 pivotally mounted on the front end of the frame 501 and an elastic element (not shown) that cooperates with the cantilever 508, and one end of the elastic element is fixedly mounted on the frame. On the frame 501, the other end is fixedly installed on the cantilever 508. The operating mechanism 507 is fixedly mounted on the cantilever 508 so that the operating mechanism 507 can rotate around the pivot through the cantilever 508. The elastic element is used to assist the working mechanism 507 to lift up or to act as a buffer when the working mechanism 507 is lowered. For example, when the operating mechanism 507 travels from flat to high ground, the elastic element assists the lifting of the operating mechanism 507; when the operating mechanism 507 travels from high to flat ground, the elastic element assists the operating mechanism 507 dropped, playing a buffering role.

Figure 10:
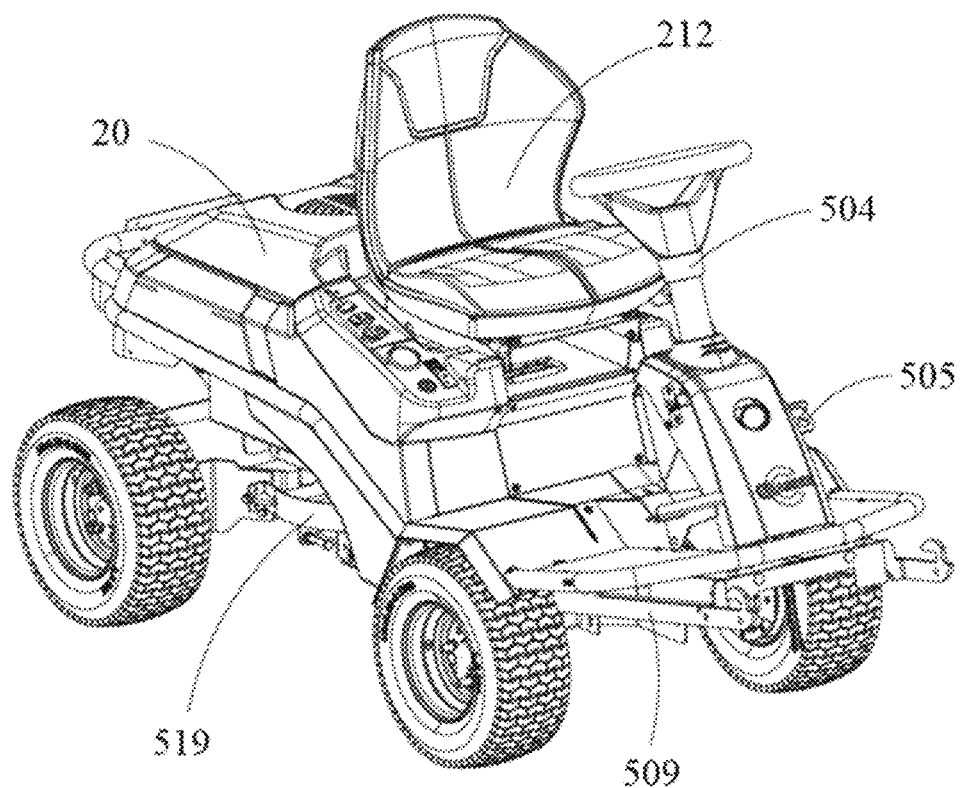
FIG. 10 is a perspective schematic view of the electric vehicle described in FIG. 7 with the working mechanism removed.
Figure 11:
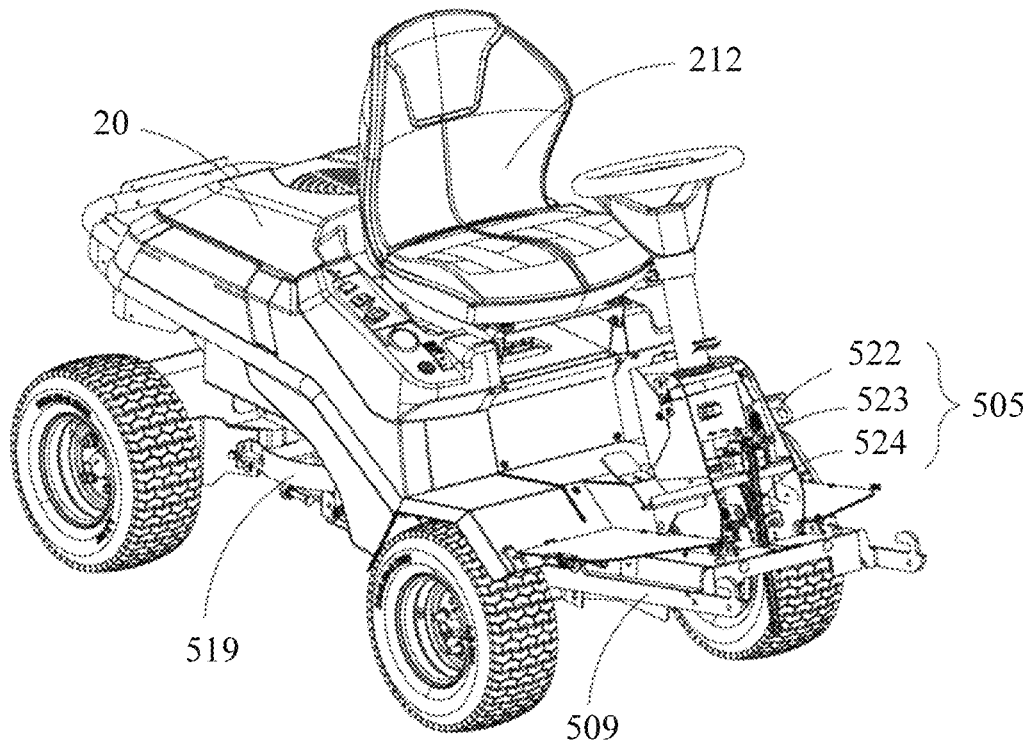
FIG. 11 is a perspective schematic view from another angle of the electric vehicle shown in FIG. 7 with the working mechanism removed.

As shown in FIGS. 10-11, the left foot control assembly 505 includes a left foot pedal 522, a gear 523 matched with the left foot pedal 522, and a chain 524 matched with the gear 523. The left foot pedal 522 is pivotally mounted on the frame 501 and can drive the gear 523 to rotate. One end of the chain 524 is fixedly installed on the frame 501, the other end is fixedly installed on the operating mechanism 507, and the middle part of the chain is wound on the gear 523. When a user steps on the left foot pedal 522 and causes the left foot pedal 522 to rotate, the left foot pedal 522 drives the gear 523 to rotate. At this time, the gear 523 drives the chain 524 to move. In turn, the operating mechanism 507 is lifted upward under the action of the chain 524. With this arrangement, the operating mechanism 507 can smoothly overcome obstacles. When the user releases the left foot pedal 522, the operating mechanism 507 is reset under the action of gravity. The right foot control assembly 506 includes a right foot pedal pivotally mounted on the frame 501 and a walking sensor (not shown) matched with the right foot pedal. When the user steps on the right pedal to rotate the right pedal, the walking sensor senses information such as the forward rotation, reverse rotation, and rotation amplitude of the right pedal, and transmits the information to the control Component 526. The control component 526 controls the driving component 511 to advance, retreat, or stop according to the foregoing information.

As shown in FIGS. 7-8, the driving assembly 511 includes a front drive assembly 512 installed at the bottom end of the front part of the frame 501 and a rear drive assembly 513 installed at the bottom end of the rear part of the frame 501. One of the front drive assembly 512 and the rear drive assembly 513 is pivotally mounted on the frame 20 so that it can rotate around the frame 20, and the other is fixedly mounted on the frame 20. In this embodiment, the front drive assembly 512 is fixedly installed on the frame 20; the rear drive assembly 513 is pivotally installed on the frame 20 so as to cooperate with the steering assembly 504 to achieve the power tool 100 turns. The front drive assembly 512 includes a pair of front drive wheels 11, and the pair of front drive wheels 11 are fixedly installed on both sides of the frame 20. The front driving wheel 11 includes a front wheel hub motor 31 and a front wheel 112 mounted on the front wheel hub motor 31.

Figure 13:
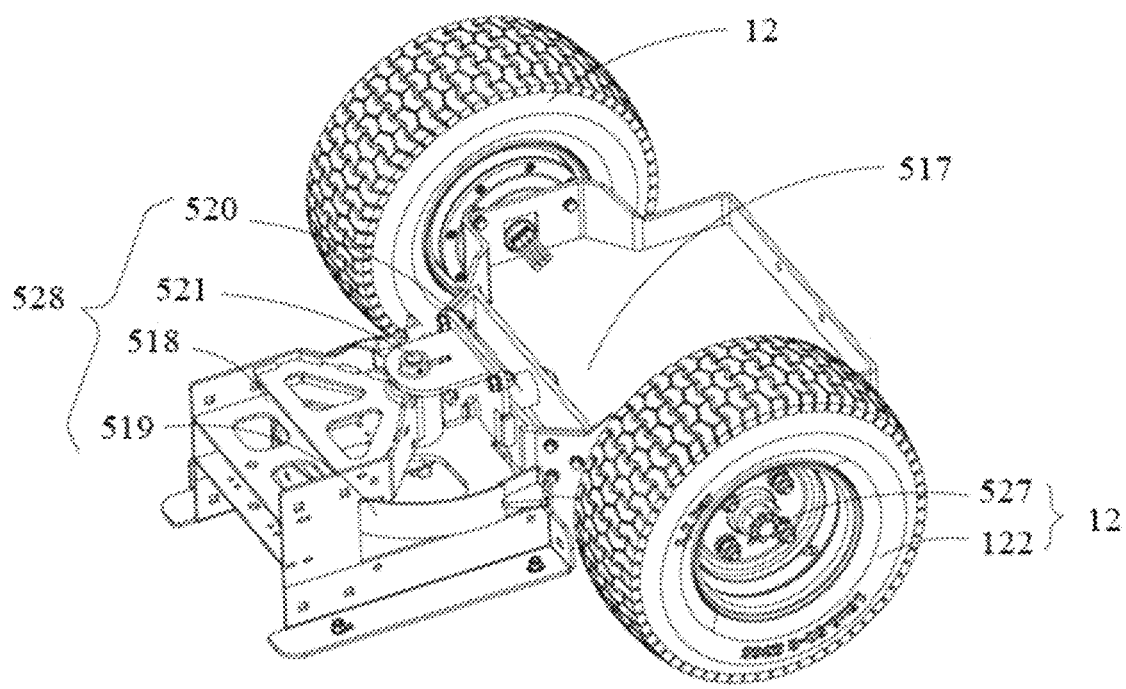
FIG. 13 is a three-dimensional schematic diagram of a rear drive assembly and a pivotal assembly.
Figure 14:
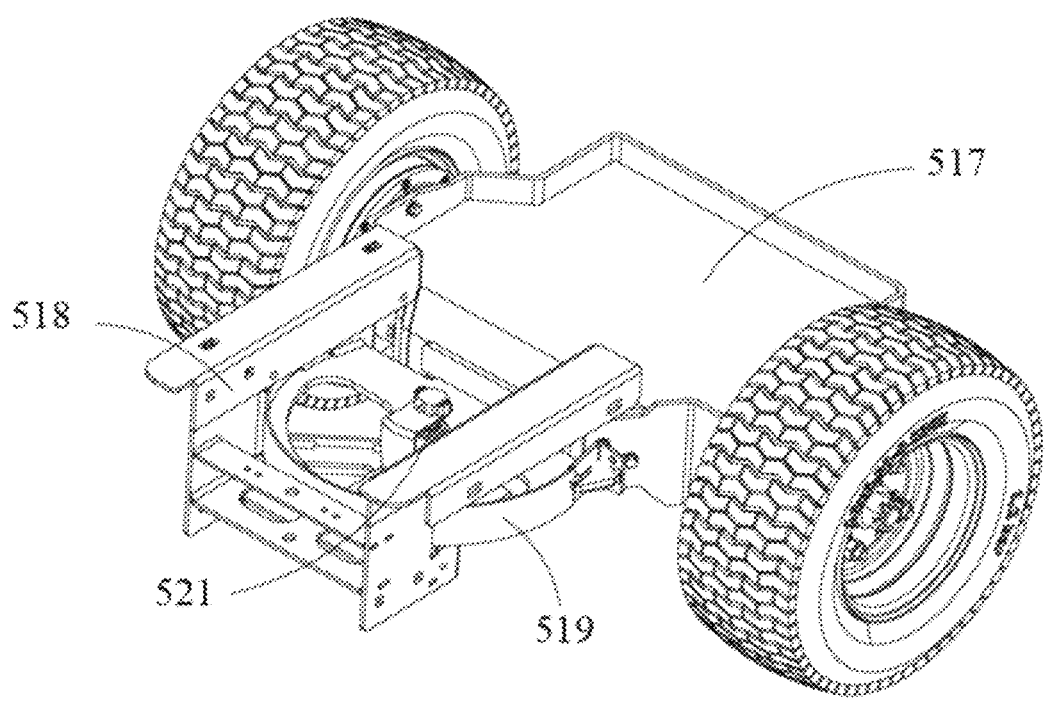
FIG. 14 is a perspective schematic view of the rear drive assembly and the pivotal assembly from another angle.

As shown in FIGS. 13-14, the rear drive assembly 513 includes a rear drive axle 517, rear drive wheels 12 fixedly installed on both sides of the rear drive axle 517, and pivotal connections installed on the rear drive axle 517. Component 528. The rear driving wheel 12 includes a rear hub motor 527 and a rear wheel 122 mounted on the rear hub motor 527. The pivot assembly 528 includes a fixing frame 518, a steering wheel 519 matched with the fixing frame 518, a first pivot 520 arranged in a horizontal direction, and a second pivot 521 arranged in a vertical direction. The fixing frame 518 is fixedly installed at the rear end of the rack 20. The steering wheel 519 is pivotally mounted on the fixing frame 518 by the second pivot shaft 521 in the vertical direction, and is pivotally mounted on the rear drive shaft by the first pivot shaft 520 in the horizontal direction. On the bridge 517. Since the rear drive axle 517 is pivotally mounted on the frame 20 through the second pivot shaft 521, the rear drive axle 517 can rotate around the second pivot shaft 521 in a horizontal plane, so that the electric tool 100 can turn. Since the rear drive axle 517 is pivotally mounted on the pivot assembly 528 through the first pivot 520, the rear drive axle 517 can rotate about the first pivot 520 in a vertical plane. With this arrangement, when the electric tool 100 is walking on uneven grass, the rear drive axle 517 can freely rotate around the first pivot 520 as needed, so that the front drive wheel 11 and the rear drive wheel 12 can land on the ground at the same time, avoiding the problem of a wheel hanging in the air when the existing electric vehicle is walking on uneven roads. The frame 20 is also provided with a limiting member (not shown) that cooperates with the rear drive axle 517 to limit the rotation angle of the rear drive axle 517 in a vertical plane.

As shown in FIGS. 8-9, the steering assembly 504 includes a driving wire 514 and a steering wheel 510 that drives the driving wire 514 to rotate. The two ends of the driving wire 514 are fixedly installed on both sides of the steering wheel 519 respectively. When the steering wheel 510 is rotated, the steering wheel 510 drives the drive wire 514 to rotate, thereby pulling the steering wheel 519 to rotate around the second pivot 521, so that the rear drive axle 517 is positioned on the steering wheel. Under the action of the 519, it rotates around the second pivot 521, thereby realizing the steering of the electric vehicle 100. Of course, it can be understood that, in other embodiments, the two ends of the drive line 514 can also be directly fixedly installed on the rear axle 517 and located on the two sides of the second pivot 521 respectively. The driving wire 514 is provided with a chain, and the steering wheel 510 is provided with a gear matched with the chain.

As shown in FIG. 12, the control assembly 526 is installed in the receiving cavity 221 and located at the rear of the frame 20. The control component 526 is used to control the operation of the driving component 511. The control component 526 may be a single-chip microcomputer, a central processing unit, etc., or a control circuit formed by a logic circuit, or a combination of the two. When the electric tool 100 moves forward, the control assembly 526 controls the front drive assembly 512 and the rear drive assembly 513 to drive the electric tool 100 to move forward. At this time, the front drive wheel 11 and the rear drive wheel 12 is configured such that the rotation speed of the front driving wheel 11 is not less than the rotation speed of the rear driving wheel 12. With this arrangement, the power tool 100 can always be in a state in which the frame 20 is dragged forward by the rear drive axle 517 through the pivot assembly 528 during the forwarding process, thereby avoiding the rear drive axle. The rotation speed of the wheels 12 is greater than that of the front driving wheels 11, which causes the rear drive axle 517 to hit the pivotal assembly 528, thereby eliminating the collision sensation that occurs during the driving of the existing electric vehicle, and improving the stability of the whole machine. performance. When the electric tool 100 is in an acceleration process, the acceleration of the front driving wheel 11 is greater than the acceleration of the rear driving wheel 12. Of course, it can also be set as follows: the acceleration time of the front drive wheel 11 is less than the acceleration time of the rear drive wheel 12; the difference between the acceleration time of the rear drive wheel 12 and the acceleration time of the front drive wheel 11 is 0.2 Second. In addition, when the electric tool 100 is in an acceleration process, the front driving wheel 11 and the rear driving wheel 12 may also be set such that the acceleration of the front driving wheel 11 is not less than the acceleration of the rear driving wheel 12, and the front driving wheel 11 starts to accelerate a preset time earlier than the rear driving wheel 12. This arrangement can also avoid the problem that the rear drive axle 517 hits the pivot assembly 528 due to the rotation speed of the rear drive wheel 12 being greater than that of the front drive wheel 11. When the electric tool 100 turns, the pair of rear drive wheels 12 of the rear drive assembly 513 are set such that the speed of the rear drive wheel 12 located inside the turning radius is less than the speed of the rear drive wheel 12 located outside the turning radius. Such a setting can avoid the tire wear problem caused by the same speed of the pair of rear driving wheels when the existing electric vehicle is turning. The difference between the rotational speed of the rear drive wheel 12 located inside the turning radius and the rotational speed of the rear drive wheel 12 located outside the turning radius is inversely proportional to the turning radius. Of course, it can be understood that, in other embodiments, the difference between the rotational speed of the rear drive wheel 12 located inside the turning radius and the rotational speed of the rear drive wheel 12 located outside the turning radius can also be set to be the same as that of the rear drive axle 517. The angle of rotation in the horizontal plane is proportional.

As shown in FIGS. 9 and 14, when the electric tool 100 is in the deceleration process, the control assembly 526 controls the brake assembly to work, and makes the acceleration of the front drive wheel 11 greater than that of the rear drive wheel 12. Acceleration, that is, the decreasing speed of the rotation speed of the front driving wheel 11 is less than the decreasing speed of the rotation speed of the rear driving wheel 12. Of course, it is understandable that when the electric tool 100 is in the deceleration process, it can also be set to: the deceleration time of the front drive wheel 11 is greater than the deceleration time of the rear drive wheel 12, or the front drive wheel 11 The acceleration of is not less than the acceleration of the rear driving wheel 12, and the rear driving wheel 12 starts to decelerate ahead of the front driving wheel 11 by a preset time. In this embodiment, the control component 526 controls the operation of the brake component, but in other embodiments, the brake component can also be directly controlled by the user. When the user controls the brake assembly to brake, the brake assembly brakes the rear drive wheel 12, and the control assembly 526 controls the power supply assembly 525 to power off the front drive assembly 512.

As shown in FIG. 9, the electric tool 100 of the present invention directly drives the wheels to rotate through the hub motor, so that the transmission gear box can be omitted, thereby avoiding the problem that the existing gear box drive structure requires regular maintenance and oil replacement, saving labor costs and reducing In addition, since the speed of the front drive wheel 11 is not less than the speed of the rear drive wheel 12, the front drive assembly 512 and the rear drive assembly 513 will not collide with the frame 20, thereby eliminating the driving process. The rotation speed of the rear driving wheel 12 is greater than the rotation speed of the front driving wheel 11, which causes the collision problem, so that the whole machine travels more smoothly.

The invention also discloses a control method for an electric vehicle, which includes the following steps:
S1: Detect the movement state of the electric tool 100; when the electric tool 100 is accelerating, skip to step S2; otherwise, skip to step S3;
S2: Control the acceleration of the front drive assembly 512 and the rear drive assembly 513 so that the rotation speed of the front drive wheel 11 is greater than the rotation speed of the rear drive wheel 12;
S3: Control the deceleration of the front drive assembly 512 and the rear drive assembly 513 so that the rotation speed of the front drive wheel 11 is greater than the rotation speed of the rear drive wheel 12.

The step S2 further includes: controlling the front-wheel drive assembly 512 to start accelerating in advance of a preset time than the rear-drive assembly 513.

The step S3 further includes: controlling the front drive assembly 512 to start decelerating after a preset time delay from the rear drive assembly 513. Alternatively, the front drive assembly 512 is directly controlled to power off, and the rear drive assembly 513 is controlled to brake.

Figure 15:
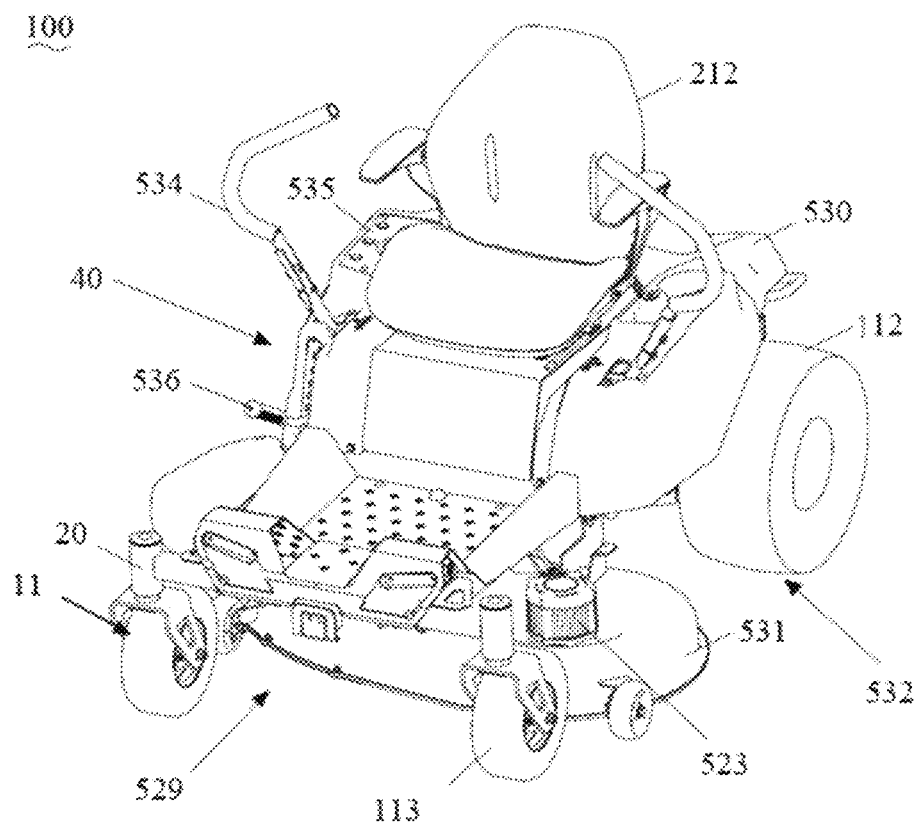
FIG. 15 is a three-dimensional schematic diagram of the electric tool of the present invention.
Figure 16:
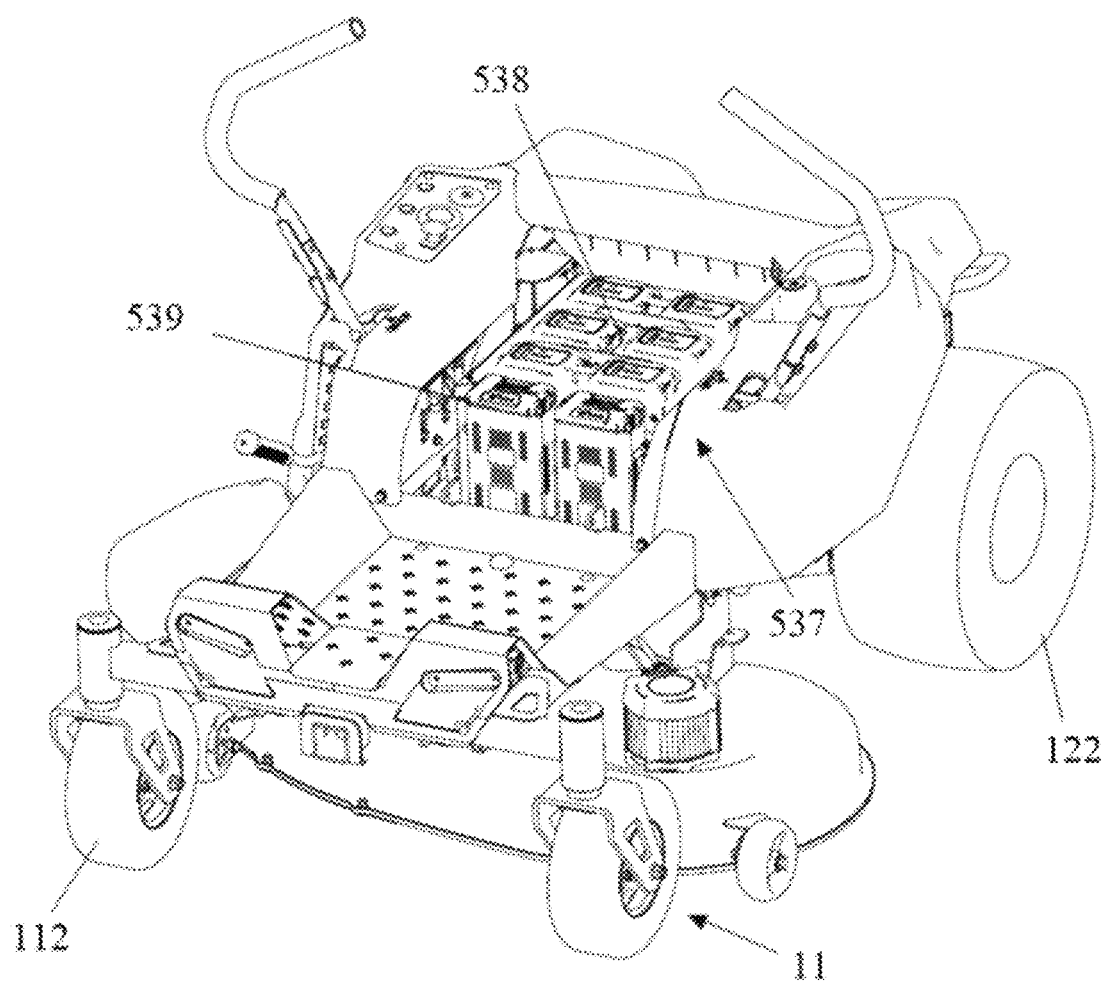
FIG. 16 is a schematic structural view of FIG. 15 omitting the seat assembly.

As shown in FIGS. 15-16, the present invention also provides an electric tool 100, which includes a frame 20, a seat assembly 212 respectively disposed on the frame 20, an electric unit 529, a manipulation unit 40, and a battery management system 537. The battery management system 537 may also be defined as a battery system.

As shown in FIG. 15, the frame 20 is used to carry the seat assembly 212 for the operator to ride; the frame 20 extends along the running direction of the power tool 100, and the seat assembly 212 is located at the center line of the frame 20 perpendicular to its running direction. One side. The frame 20 is provided with a cover assembly 530 for protecting the power consumption unit 529, the manipulation unit 40, and the battery management system 537, and the cover assembly 530 is arranged around the seat assembly 212.

Figure 17:
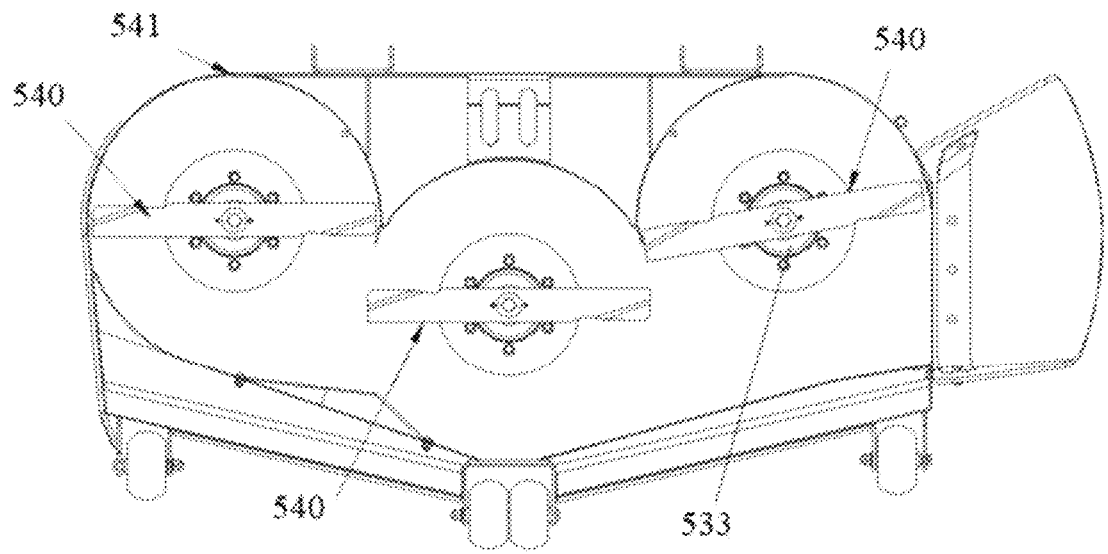
FIG. 17 is a schematic diagram of the structure of the working assembly in FIG. 15.

As shown in FIGS. 15-17, the power consumption unit 529 includes a working component 531 detachably connected to the frame 20 and a walking component 532 for driving the electric tool 100 to walk, that is, the working component 531 can be defined as the first power consumption The unit, the walking component 532 can also be defined as the second power-consuming unit. Of course, the power consumption unit 529 may also include a third power consumption unit and a fourth power consumption unit. The working assembly 531 is electrically connected with the operating unit 40 to complete the corresponding gardening tasks under the control of the operating unit 40. The working assembly 531 has a working member 540 (i.e., a cutter) for realizing gardening work and a working member for carrying the work. The components of 540 are welded 541, and the working component 540 is detachably connected to the frame 20 through the component welding 541. With this arrangement, on the one hand, it is convenient to disassemble and replace the working components 531, so that the same electric tool 100 can complete a variety of gardening tasks, which effectively improves the use range of the electric tool 100; on the other hand, when the power of the electric tool 100 is too low. The working assembly 531 can be directly removed to reduce the self-weight of the electric tool 100, so that it can return to the charging/storage position with the electric power, and perform charging/maintenance to ensure the convenience of using the electric tool 100.

As shown in FIG. 17, multiple working members 540 may be provided at the same time to improve the working efficiency of the electric tool 100. The working assembly 531 also includes a driving member 533 for driving the working member 540 to operate. The driving member 533 and the working member 540 are arranged in a one-to-one correspondence, and the driving member 533 is, for example, a driving motor. Of course, the same driving member 533 can also drive multiple Working member 540.

As shown in FIGS. 15-17, the working component 531 is, for example, a mowing component, and the working component 540 is a mowing component used to perform mowing operations. The number of working components 540 corresponds to the number of driving components 533 to ensure cutting. The working efficiency of the grass component 131 when mowing the grass.

As shown in FIGS. 15-17, the work component 531 can also be a garden work component used to perform other garden work tasks, such as a snowplow. It is only necessary to ensure that the work component 531 can be adapted to the frame 20 and can be manipulated by the unit. 40. Manipulation control is sufficient. That is, in the drawings and specification of the present invention, only the electric tool 100 is a riding lawn mower and the working assembly 531 is a lawn mower as an example for illustration, but it should not be used as an example. limit.

As shown in FIGS. 15-16, the walking assembly 532 is used to drive the electric tool 100 to travel, and the walking assembly 532 includes a front wheel assembly 11 and a driving wheel assembly 12. Wherein, the front wheel assembly 11 includes a rotating wheel 113 rotatably connected to the front end of the frame 20 and a steering mechanism (not shown) for controlling the turning of the rotating wheel 113, and the rotating wheel 113 is a universal wheel, and the rotating wheel 113 is a smooth surface. The steering wheel can effectively avoid the influence of the rotating wheel 113 on the working ground when it rotates.

Figure 18:
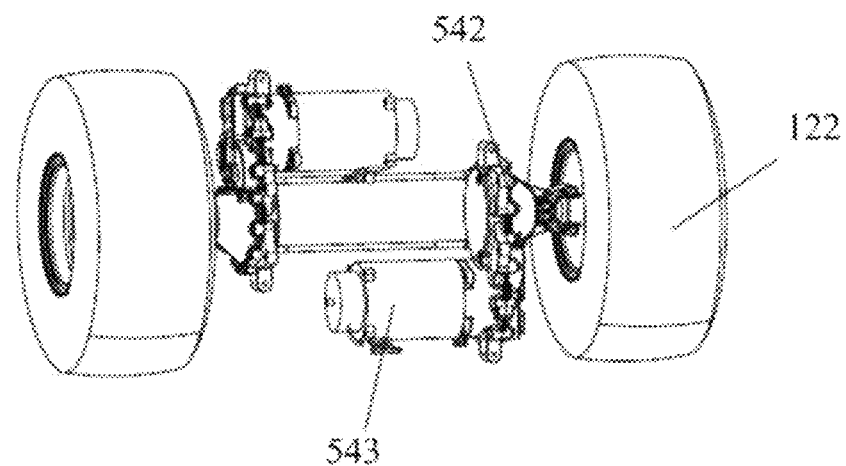
FIG. 18 is a schematic diagram of the structure of the driving wheel assembly in FIG. 15.

As shown in FIG. 18, the driving wheel assembly 12 is used to drive the electric tool 100 to run and realize steering, and includes two sets of driving wheels 122, a reduction box 542, and a driving motor 543. Among them, the two driving wheels 122 are respectively arranged at the end of the frame 20. On both sides of the end, the reduction gear box and the driving motor jointly constitute a driving axle for controlling the operation of the driving wheels 122, and the driving axle and the driving wheels 122 are arranged correspondingly.

As shown in FIG. 15, the drive axle is installed under the frame 20, and the drive axle can control the two drive wheels 122 to perform differential motions respectively, which can effectively increase the steering angle of the drive wheels 122 and make the drive wheel assembly 12 The zero steering mechanism with the turning radius infinitely approaching zero further improves the practicability and usability of the electric tool 100.

As shown in FIG. 15, the manipulation unit 40 is arranged on the frame 20, and is used to control the operation of the power consumption unit 529 in the electric tool 100; in the present invention, the manipulation unit 40 includes an electric control unit 534 and an electric control unit 534. A control panel 535 that is sexually connected and a height adjustment unit 536 for adjusting the operating height of the electric tool 100.

As shown in FIG. 15, the electrical control unit 534 is used to collect the operating signals transmitted by the electrical unit 529, the battery management system 537, and the control panel 535, judge the operating signals, and issue corresponding instructions to control the electrical unit 529/battery The management system 537/control panel 535 executes corresponding actions or performs corresponding displays.

As shown in FIG. 15, the control panel 535 is used to receive instructions from the operator, and send corresponding operating signals to the electrical control unit 534 for processing, so as to further complete the corresponding garden work or function switching according to the operator's requirements to achieve The purpose of improving the convenience of use of the electric tool 100.

As shown in FIG. 15, the height adjustment assembly 536 includes an adjustment structure (not shown) for adjusting the relative height between the rack 20 and the working ground under the frame 20, and an adjustment member (not labeled) for controlling the adjustment structure. The high component 536 is located on the side of the seat assembly 212 to facilitate the use of the operator and improve the convenience of use of the electric tool 100. Of course, the height adjustment assembly 536 can also be located at the foot pedal position at the front end of the frame 20. At this time, the adjustment structure can be controlled by stepping on the pedal adjustment member, which further improves the convenience of use of the electric tool 100.

Figure 19:
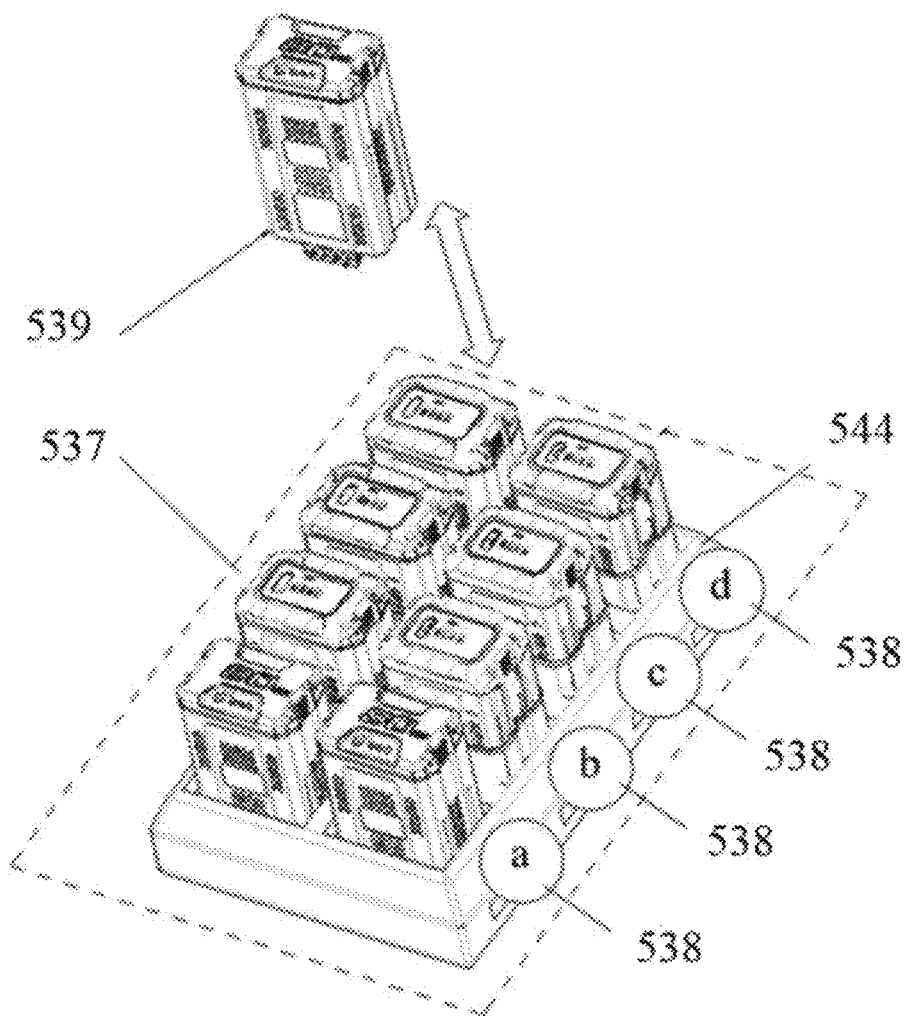
FIG. 19 is a schematic diagram of the structure of the distributed battery management system in FIG. 16.
Figure 21:
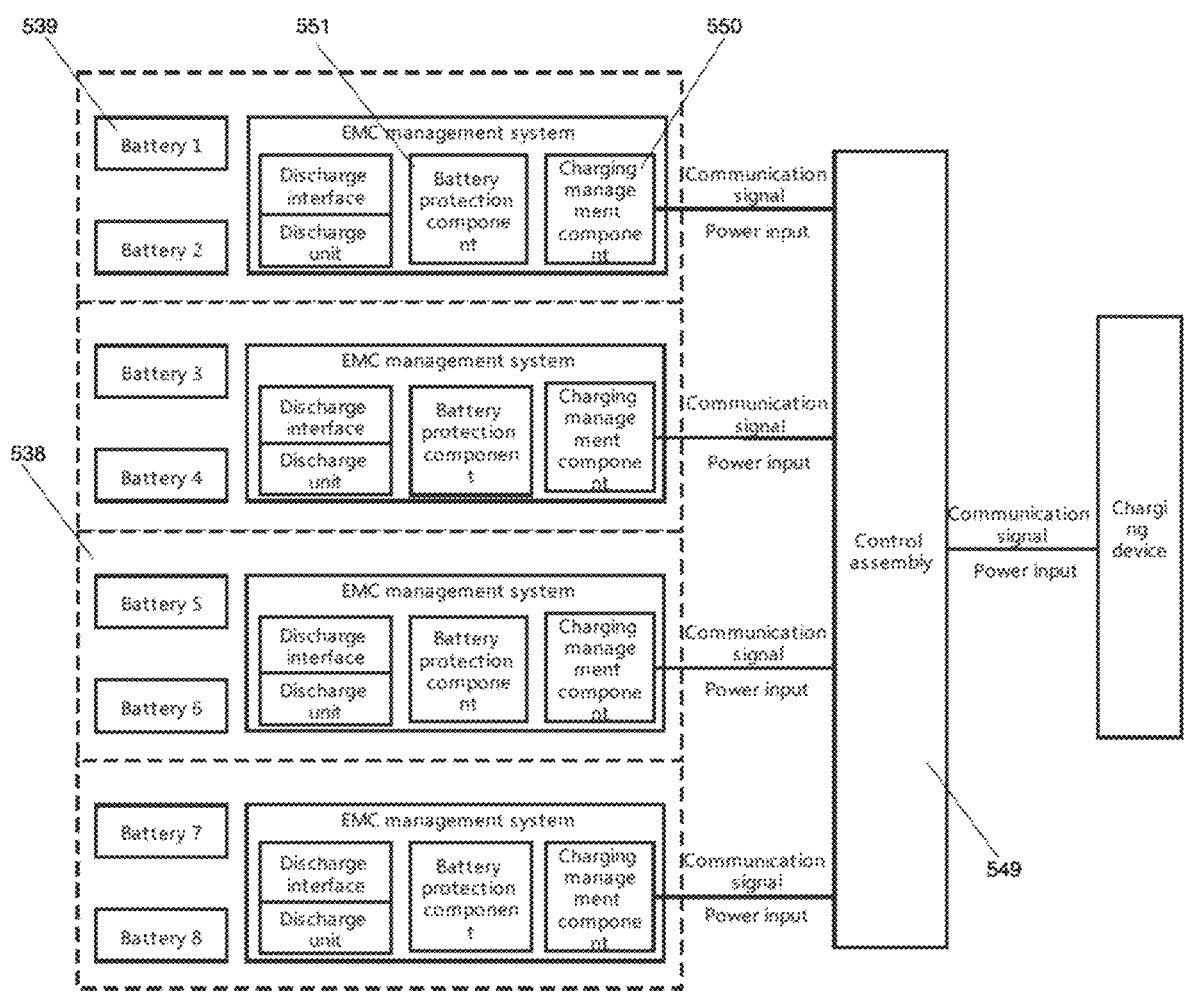
FIG. 21 is a working principle diagram of the distributed battery management system in FIG. 19 during charging.

As shown in FIGS. 19 and 21, the battery management system 537 is installed on the frame 20 to provide power to the power tool 100. In the present invention, the battery management system 537 includes a battery accommodating part 544 and a control component 549.

Figure 20:
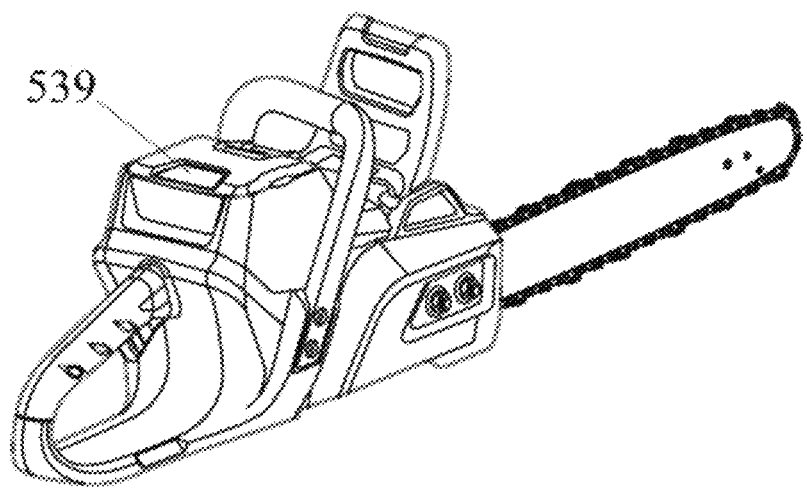
FIG. 20 is a three-dimensional schematic diagram of a hand-held garden tool suitable for the battery pack in FIG. 19.

As shown in FIGS. 19-20, the battery accommodating part 544 is fixedly arranged on the rack 20 for accommodating a plurality of battery packs 539, and the battery pack 539 is detachably connected to the battery accommodating part 544 to further make the battery pack 539 and The electric tool 100 can be detachably connected to facilitate the replacement of the battery pack 539, and each battery pack 539 can supply power for at least one hand-held tool.

As shown in FIG. 19, the multiple battery packs 539 are divided into different power supply units 538 to supply power to the working component 531 and the walking component 532, respectively. For example, FIG. 19 shows four power supply units 538, such as a first power supply unit, a second power supply unit, a third power supply unit, and a fourth power supply unit from top to bottom. The first power supply unit, for example, supplies power for the first power consumption unit, the second power supply unit, for example, supplies power for the second power consumption unit, the third power consumption unit, for example, supplies power for the third power consumption unit, and the fourth power consumption unit, for example, the fourth power consumption unit. The electric unit supplies power, that is, different power supply units supply power to different electric units. The power supply unit 538 is composed of at least two battery packs 539 in parallel. The battery packs 539 in the same power supply unit 538 have the same rated voltage. This setting can facilitate the power supply unit 538 to achieve stable voltage output; the number of battery packs 539 in each power supply unit 538 is equal, so that each power supply unit 538 can Under the control of the control component 549 and the control unit 40, the same power-consuming unit 529 is supplied with power to ensure the endurance of the power-consuming unit 529. Each group of power supply units 538 has two battery packs 539 arranged side by side, and multiple groups of power supply The unit 538 is connected as a whole through an integral battery receiving portion 544, so that a plurality of battery packs 539 are arranged in a matrix, and the battery packs 539 are arranged in a matrix to be connected and installed in the frame 20 and located under the seat assembly 212. Of course, the battery management systems 537 arranged in a matrix can also be located at other positions of the rack 20, such as the rear of the rack 20, etc. That is, the specific location of the battery management system 537 can be selected according to the actual situation. To limit.

As shown in FIG. 19, the different power supply units 538 are arranged separately, that is, the battery accommodating portion 544 is arranged separately. In this way, the power supply unit 538 in the battery management system 537 or the battery pack 539 in the power supply unit 538 can be separated from each other. The power supply unit 538 or the battery pack 539 can be respectively arranged at different positions of the rack 20. On the one hand, the distributed installation of the power supply unit 538/battery pack 539 in the battery management system 537 is realized; on the other hand, it is convenient for the battery management system 537 to be the power consumption unit 529 supplies power.

As shown in FIG. 19, when the power supply units 538 are installed in a distributed manner, multiple groups of power supply units 538 need to be evenly arranged on the frame 20, and the center of all battery packs 539 is located at the rotation axis of the drive wheel assembly 12 and the front wheel assembly 11 rotates. Between the axis. The weight at the upper position of the frame 20 is evenly distributed to ensure the smooth operation of the electric tool 100, and to prevent the shortening of the service life of the electric tool 100 caused by the excessive partial load of the frame 20 caused by uneven weight distribution.

As shown in FIG. 19, the number of battery packs 539 in each power supply unit 538 may also be different. In this case, multiple power supply units 538 may simultaneously/respectively supply electric energy to power consumption units 529 with different rated powers. Specifically, when the number of battery packs 539 in each power supply unit 538 is different, for example, there is only one battery pack 539 in some power supply units 538, the power supply unit 538 can supply power to a working component 540 in the working assembly 531. It can be seen from FIG. 17 that there are three working members 540. In this embodiment, at least three power supply units 538 supply power to the three working members 540 respectively. At this time, the battery management system 537 also includes at least walking Another power supply unit 538 powered by the component 13, and the power supply unit 538 may have two battery packs 539.

As shown in FIGS. 19-20, the power supply unit 538 also has a current adjustment component (not shown), which is electrically connected to the control component 549, and can adjust the power supply unit 538 under the control of the control component 549 The current is output so that the power supply units 538 with different numbers of battery packs 539 have the same power output, so that different power supply units 538 can be applied to the same power consumption unit 529 to ensure the normal operation of the power consumption unit 529.

As shown in FIG. 19-20, the limitation on the number of battery packs 539 in the power supply unit 538 is only exemplary. In actual use, the number and arrangement of the battery packs 539 in each power supply unit 538 can be made according to actual needs. Choice should not be limited by this.

As shown in FIGS. 19-20, each battery pack 539 in the present invention can be separated from the power tool 100 to supply power to the electrical components that are different from the electrical unit 529. In the present invention, the electrical components are A hand-held garden tool driven by the battery pack 539, and when the battery pack 539 in one group of power supply units 538 is disassembled for use, the other group or groups of power supply units 538 can still be the power-consuming units 529 electrically connected to it. Power supply ensures the normal use of the power tool 100. At the same time, the power supply battery pack applied to hand-held garden tools (as shown in FIG. 20) can also be used in the power supply unit 538 of the present invention after being disassembled, and only the rated power supply battery pack needs to be guaranteed. The voltage is equal to the rated voltage of the battery pack 539, and the discharge interface of the power supply battery pack and the connection structure of the battery pack match each other. This arrangement effectively improves the practicability of the electric tool 100 and reduces the use cost of the electric tool 100.

Figure 22:
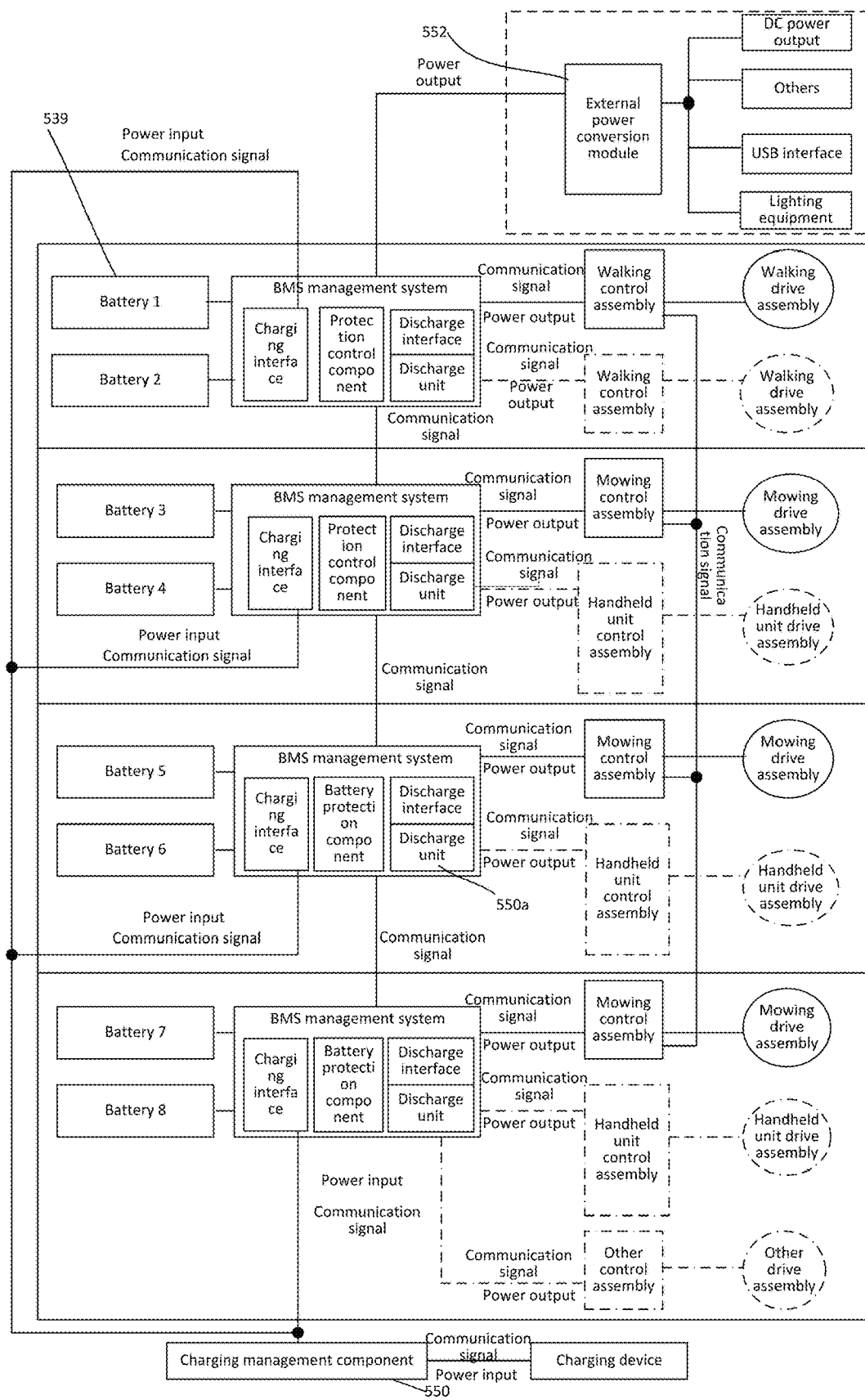
FIG. 22 is a control principle diagram of the electric tool in FIG. 15.

As shown in FIGS. 21-22, the control component 549 is used to control each power supply unit 538 to individually complete the energy supply to the power consumption unit 529. The battery management system 537 also includes a charging management component 550 and discharging that are electrically connected to the control component 549, respectively. Management component 550a.

As shown in FIGS. 21-22, the control component 549 is electrically connected to the operating unit 40. On the one hand, it is used to receive the communication signal transmitted by the operating unit 40 or the charging device and the discharging device and control the charging management component 550 or discharge management according to the communication signal. The work of the component 550a; on the other hand, it can also be used to receive the collection signal transmitted by the charge management component 550 and the discharge management component 550a, and send a control signal according to the collection signal to control the charging management component 550 to charge or the discharge management component 550a to discharge.

As shown in FIGS. 21-22, the charging management component 550 includes an information collection module and a charging interface respectively corresponding to each power supply unit 538, wherein the information collection module is used to collect the power information and current information of each power supply unit 538. Voltage information, cell temperature information, and power information, and transmit them to the control component 549 for processing; the charging interface is used to realize the electrical connection between the power supply unit 538 and the charging device, so as to finally realize the charging of the power supply unit 538. Each charging interface has a shut-off member (not shown) electrically connected to the control assembly 549.

As shown in FIGS. 21-22, the shutdown component can receive the control instruction sent by the control component 549 after the control component 549 receives the collected information collected by the information collection module, and act according to the control instruction of the control component 549. If the information collection module transmits the collected information such as voltage, current, and cell temperature to the control component 549, the control component 549 determines whether the relevant data exceeds the set control threshold. If it exceeds the control threshold, the control component 549 will Send out the corresponding signal to control the shut-off component to disconnect.

As shown in FIGS. 21-22, the control component 549 can also be used to preset the charging threshold. When the control component 549 detects that the power information of any power supply unit 538/battery pack 539 collected by the information collection module is lower than the charging threshold and has not When the charging device is connected, the control component 549 sends a warning signal that the battery is too low to the operating unit 40, and displays it through the control panel 535, prompting the operator to charge; further, when the control component 549 receives the communication that is connected to the charging device When the signal is signaled, the control component 549 completes the charging of each power supply unit 538 through the charging interface in the order of the power supply unit 538's power from low to high, and only when the power supply unit 538 is in the charging state, the corresponding shut-off device is in the on state In order to prevent abnormal discharge of the power supply unit 538 to be charged, the charging efficiency of the battery management system 537 is further improved.

As shown in FIGS. 21-22, the electric tool 100 is provided with a charging interface, through which the charging device can charge all or part of the battery pack 539; of course, in other embodiments of the present invention, the battery pack 539 can also be used. It is disassembled from the power tool 100 and charged separately using a charger.

As shown in FIGS. 21-22, in the process of charging the battery pack 539 alone, the charging sequence of the battery pack 539 is not particularly limited, and when multiple battery packs 539 are installed on the electric tool 100 for charging, the control assembly 549 detects the power of the battery pack 539. The charging can be carried out in the order of high to low, or in the order of low to high, or starting from the battery pack 539 with the middle power, or according to different the frequency of use of the power supply unit 538 determines the charging sequence.

As shown in FIGS. 21-22, the discharge management component 550a includes a battery detection unit and a discharge interface corresponding to each power supply unit 538, wherein the battery detection unit is used to detect the number and output of the battery pack 539 in the corresponding power supply unit 538 Power and information such as the voltage, current and cell temperature of each battery pack 539 are transmitted to the control component 549 for processing, so as to supply power in the working state according to the number and/or output power of the battery pack 539 in each power supply unit 538 The switching of the unit 538, further, the battery detection unit is also set to balance the voltage of each battery pack 539 in the same power supply unit 538, and the battery detection unit can also be used to receive a control signal from the control component 549 to turn off the parallel Switch the power supply unit 538 in the power output state.

As shown in FIGS. 21-22, the discharge interface is used to connect the power-consuming unit 529 and the operating unit 40 to provide power to it and ensure its normal operation. Further, the discharge management component 550a further includes an external power conversion module 552 for achieving electric energy output. The external power conversion module 552 includes one or more of a USB interface, a lighting device interface, or a DC output device interface. The battery management system 537 and the power tool 100 of the present invention can also provide power for small electrical equipment such as lighting equipment, effectively improving the scope of application.

As shown in FIGS. 21-22, the control component 549 can also be used to preset the discharge threshold. In the present invention, the discharge threshold includes the threshold of the number of battery packs 539 in the power supply unit 538 and the current threshold of each power supply unit 538/battery pack 539. Voltage threshold/Temperature threshold/Power threshold; when the information collected by the discharge management component 550a is the number of battery packs 539 in the power supply unit 538, the control component 549 checks the number and quantity threshold of the battery packs 539 in each power supply unit 538. Compare, and when the number of battery packs 539 in the power supply unit 538 in the working state is less than the preset number threshold, the control component 549 controls the power supply unit 538 to stop the output of power, and matches the power supply unit 538 in the idle state. The power-consuming unit 529 that needs electricity is provided to ensure the continuity of use of the power-consuming unit 529. Incidentally, in the present embodiment, only the information management component 550a discharge amount of information collected is illustrated as an example, when the information management component 550$_a$ discharge acquired when other information, information such as current, voltage information, In the case of temperature information or power information, the control component 549 and the discharge management component 550a can still switch the power supply unit 538 for energy output according to the above process.

As shown in FIGS. 21-22, the control component 549 also includes a battery protection component 551 electrically connected to the control component 549 and the power supply unit 538, including battery pack overcurrent and overvoltage protection components, battery pack high and low temperature protection components, and battery protection components. The short-circuit protection component and the low-voltage protection component of the battery pack are used to monitor the battery pack 539 in the power supply unit 538 from time to time. When the battery pack 539 is abnormal in use, the battery protection component 153 can turn off the power supply unit 538 in time and stop the power supply unit 538. The electric energy is sent out, and prompt information is sent to the control panel 535 through the control component 549.

As shown in FIGS. 18-19 and FIG. 21, the battery management system 537 has 4 groups of power supply units 538, each group of power supply units 538 has 2 battery packs 539, and the 4 groups of power supply units 538 are connected in the same battery accommodating part 544 And the battery accommodating part 544 can be installed under the seat assembly 212.

As shown in FIG. 19, the power supply unit 538 is used to supply power to the driving wheel assembly 12 and the external power conversion module 552 in the walking assembly 532 to ensure that the electric tool 100 is driven by the walking assembly 532 to walk in the work area.

As shown in FIG. 19, the power supply units 538 are used to supply power to the working components 531, and the battery packs in each group of power supply units 538 can be used to supply power to the power supply units 538 individually. Or when more than one battery pack 539 is taken out, the working assembly 531 can still work normally.

As shown in FIG. 16, the electric tool 100 in the present invention is only exemplary. Of course, the battery management system 537 can also be used as a power source in golf carts, ATVs, electric bicycles, electric motorcycles, and unmanned lawn vehicles. Wait for electric power tools driven by electricity.

The terms "manipulation unit", "control component", "power consumption unit", "battery management system" and the like in the present invention may include or relate to at least one of hardware and software.

As shown in FIG. 16, the electric tool 100 of the present invention is powered by a battery management system 537, and is provided with multiple sets of power supply units 538 and a control component 549 for controlling the power supply unit 538, so that the control component 549 can control the power supply unit 538 to be different The power consumption unit 529 independently supplies power, which avoids the abnormal use of the power tool 100 and the battery management system 537 caused by the damage of the battery pack 539 in the single power supply unit 538, making the lawn mower using the battery management system 537 easy to use, Has a high use efficiency and a good user experience.

Figure 23:
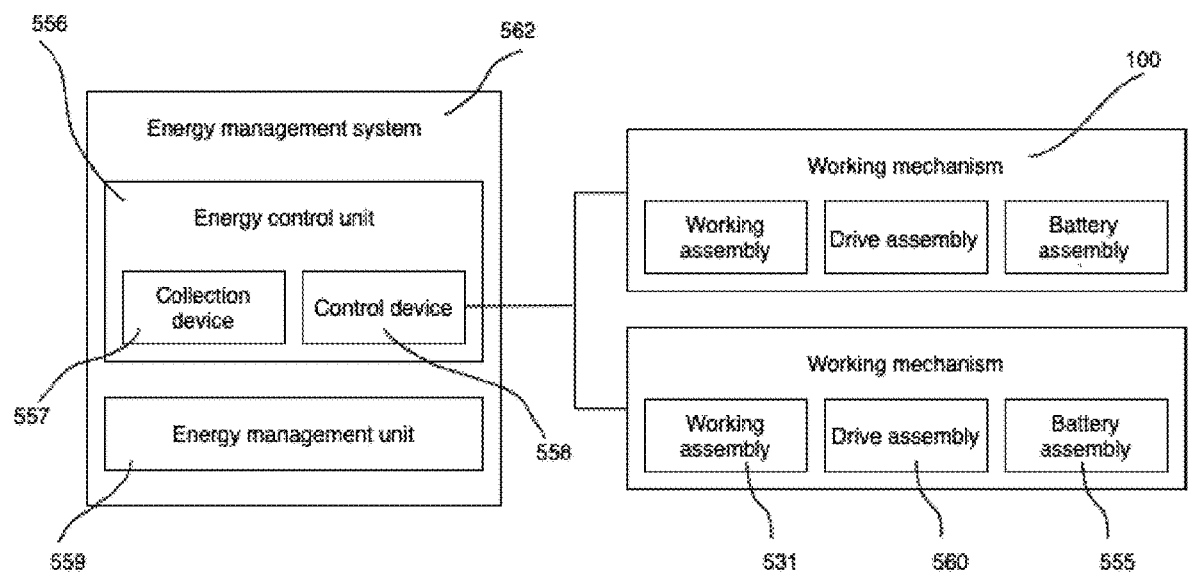
FIG. 23 is a structural block diagram of the energy management system of the present invention.
Figure 24:
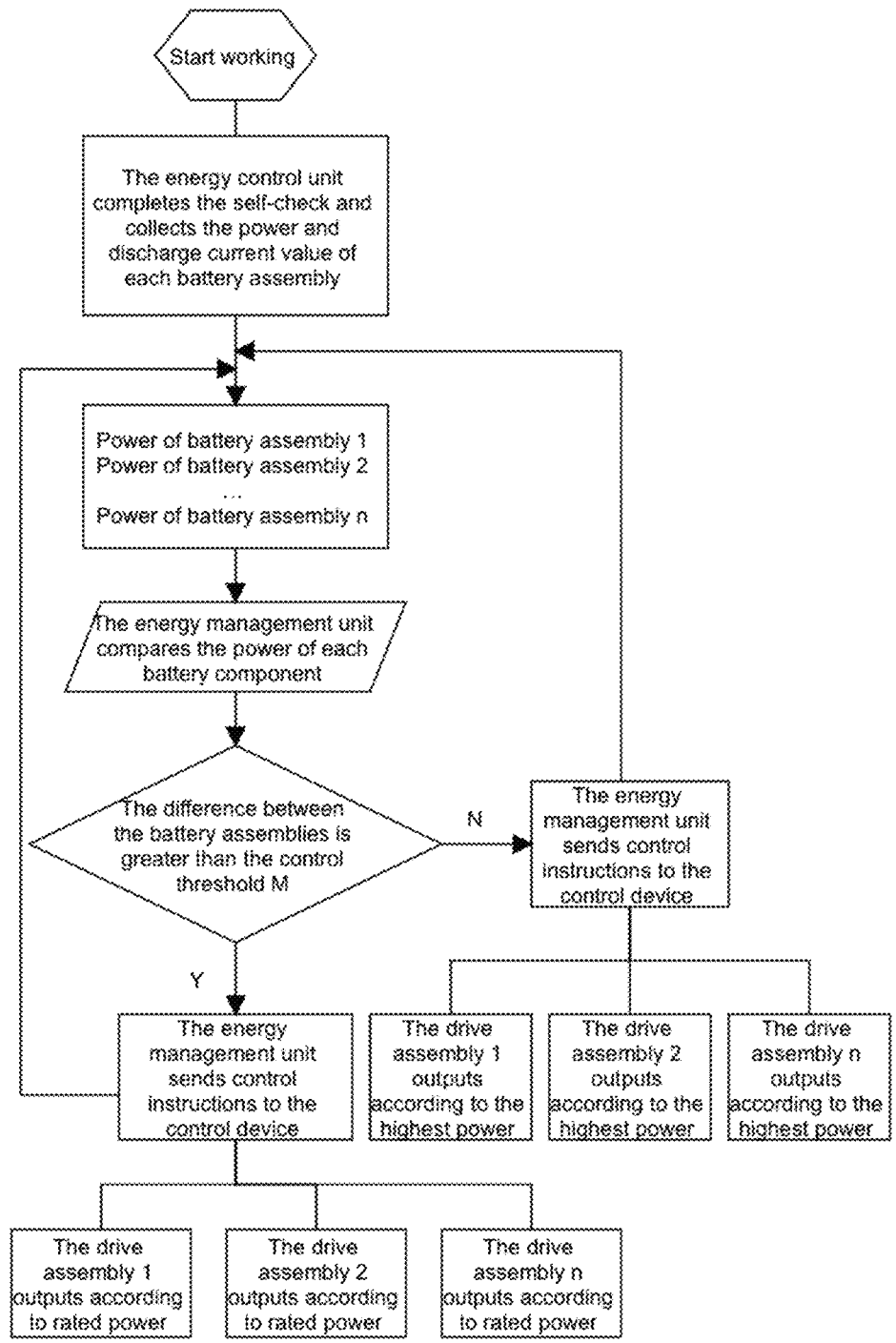
FIG. 24 is a control principle diagram of the energy management system of the present invention.

As shown in FIGS. 23-24, the present invention provides an energy management system 562 for adjusting the use state of the electric tool 100.

As shown in FIG. 23, there are at least two sets of electric tools 100 connected to the energy management system 562, and each set of electric tools 100 includes a working component 531 for performing a corresponding work task, and a drive for driving the working component 531 to work. The assembly 560 and the battery assembly 555 for powering the driving assembly 560. The working component 531 and the driving component 560 can also be defined as power consumption units, that is, the energy management system 562 can be electrically connected to the working component 531 and the driving component 560.

As shown in FIG. 23, the energy management system 562 includes an energy control unit 556 and an energy management unit 559. The energy control unit 556 is electrically connected to the electric tool 100 and the energy management unit 559, respectively, and includes a collection device 557 and a control device 558 for receiving control instructions issued by the energy management unit 559 and controlling the state adjustment of the electric tool 100. Further, the control device 558 is electrically connected to the driving assembly 560 to control the output speed of the driving assembly 560.

As shown in FIG. 23, the collecting device 557 is electrically connected to the driving assembly 560, the battery assembly 555, and the energy management unit 559 in each electric tool 100, so as to collect information about the use status of the electric tool 100, that is, collecting work Use status information of the component 531, the driving component 560, and the battery component 555.

As shown in FIG. 23, the usage status information collected by the collection device 557 includes at least the voltage information, current information, rotational speed information and output power information of the battery assembly 555 in each electric tool 100. It should be noted that the types of use status information exemplified in the invention are only exemplary, and are not limited thereto.

As shown in FIG. 23, the collection device 557 can simultaneously collect the power information, current information, and drive component 560 information of the battery assembly 555, or different collection devices 557 can separately collect the power information of the battery assembly 555 and the rotational speed information of the drive component 560.

As shown in FIG. 23, the control device 558 is electrically connected to the energy management unit 559 and the drive assembly 560 and/or the battery assembly 555. Specifically, the control device 558 is used to receive the control instructions issued by the energy management unit 559 and perform the control command adjusts the rotation speed of the driving assembly 560 and/or the output of the battery assembly 555, and further adjusts the use state of the electric tool 100 to ensure that the energy of each electric tool 100 is in a balanced state.

As shown in FIGS. 23-24, the energy management unit 559 is configured to collect the usage status information transmitted by each energy control unit 556, and calculate the status between different power usage units (for example, the working components 531) based on the usage status information. Difference. In the present invention, the state difference value is the absolute value of the difference value of the state information used in different power-consuming units, and the types of state information used for calculating the state difference value are the same to ensure the accuracy of the calculation result. The use state information selected by the present invention for calculating the state difference is the remaining power information of the battery assembly 555 in different electric tools 100, that is, at this time, the state difference is the power difference C. This setting can facilitate the energy management unit 559 evaluates the output power and/or power consumption of the electric tool 100 to further facilitate the evaluation of the use state of the electric tool 100.

As shown in FIGS. 23-24, the energy management unit 559 is also configured to set a control threshold M. Specifically, when the energy management unit 559 detects that any state difference value acquired by the collection exceeds the corresponding control threshold M, the energy management unit 559 issues control instructions to the energy control unit 556, and the use state of the electric tool 100 is adjusted through the energy control unit 556.

As shown in FIGS. 23-24, the energy management unit 559 is configured to summarize the usage status information from each energy control unit 556 and calculate the status difference. Specifically, the energy management unit 559 can be used to set a control threshold. M. Input control instructions and send control instructions to the energy control unit 556, and the interactive device can also be used to display the use status information of each electric tool 100 to facilitate the operator to control and manage the power tool 100 in real time according to the use status information.

As shown in FIGS. 23-24, the setting of the control threshold M in the present invention can be either the fixed information preset by the energy management system 562 at the factory, or the setting made by the operator according to actual needs during use. Adjustable information.

As shown in FIGS. 23-24, the control command is control information used to adjust/control the working state of the electric tool 100, which can be a current control command, a voltage control command, etc., used to adjust the working state command or speed of the battery assembly 555. A control command or the like is used to adjust any one of the working state commands of the driving component 560, and the control command is a power control command used to control the output power of the driving component 560.

Figure 25:
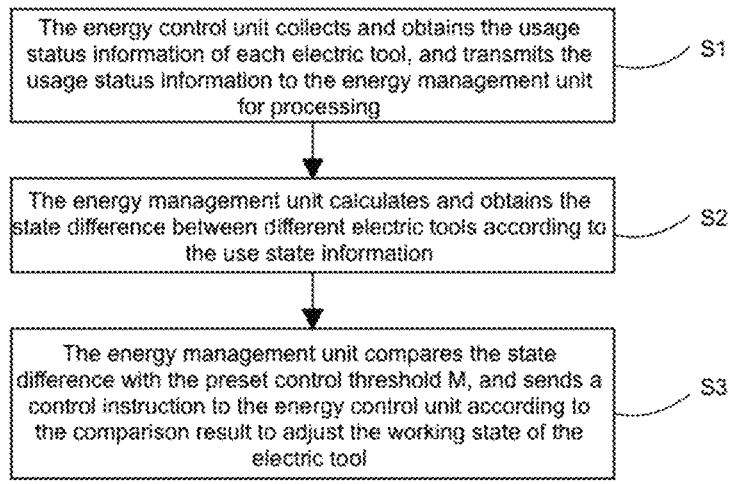
FIG. 25 is a flowchart of the energy management method of the present invention.

As shown in FIG. 25, the present invention also provides an energy management method that uses the energy management system 562 to perform energy management and control on the electric tool 100. The energy management method includes the following steps:

S1. The energy control unit 556 collects and obtains the usage status information of each electric tool 100, and transmits it to the energy management unit 559 for processing;

S2. The energy management unit 559 calculates and obtains the state difference between the different electric tools 100 according to the use state information;

S3. The energy management unit 559 compares the state difference with the preset control threshold M, and sends a control instruction to the energy control unit 556 according to the comparison result to adjust the working state of the electric tool 100.

The steps S1 to S3 will be described in detail below in conjunction with the specific structure of the energy management system 562.

Step S1 can be:

S11. The energy control unit 556 collects within a set time or real-time collection and acquisition of the usage status information of each electric tool 100 connected to the energy control unit 556;

S12. The energy management unit 559 receives the usage status information of each electric tool 100, and performs summary statistics on the usage status information of each electric tool 100.

In step S11, the set time is specifically collected by the collecting device 557 to obtain the usage status information of each electric tool 100 at the same time point and within the same time interval. The accuracy of the energy evaluation is to avoid the difference in energy consumption of each electric tool 100 due to different collection times, which will then affect the energy evaluation result of the energy management system 562.

In step S12, the energy management unit 559 may classify the usage status information according to the category of the usage status information collected by the collection device 557, so as to avoid confusing the summary statistics of the usage status information, which will affect subsequent calculations.

Step S2 is specifically that the energy management unit 559 calculates and obtains the state difference between different electric tools 100 according to the use state information. In the present invention, each use state information corresponds to at least one state difference value, that is, the state in the present invention The type of the difference is consistent with the type of the collected usage status information, the status difference is the power difference C, and the usage status information is the remaining power information of the battery assembly 555.

Figure 26:
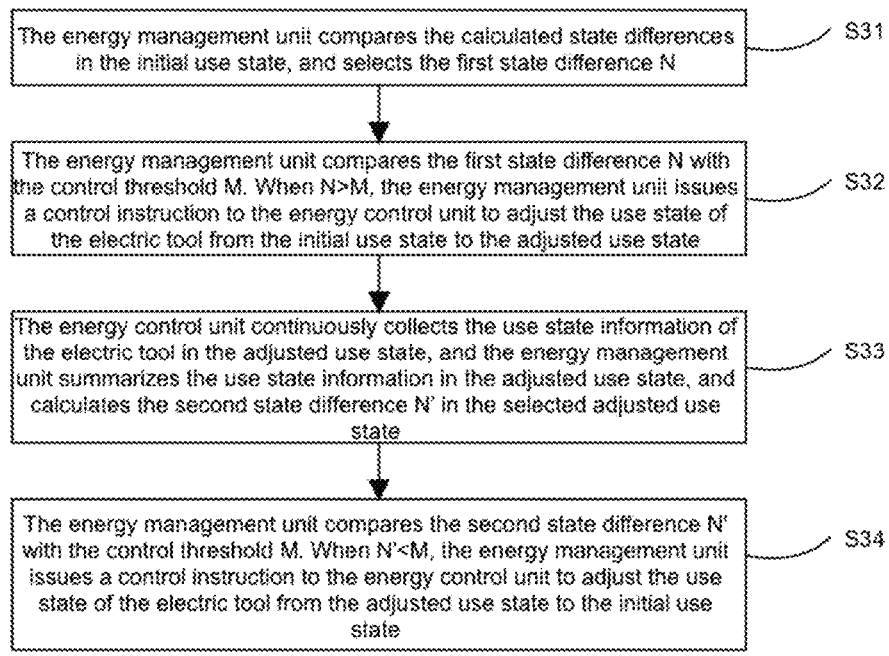
FIG. 26 is a structural block diagram of the energy management method of step S3 in FIG. 25.

As shown in FIG. 26, step S3 can be:

S31. The energy management unit 559 compares the calculated state difference values in the initial use state, and selects the first state difference value N;

S32. The energy management unit 559 compares the first state difference N with the control threshold value M. When N>M, the energy management unit 559 issues a control instruction to the energy control unit 556 to adjust the use state of the electric tool 100 from the initial use state to adjust the state of use;

S33. The energy control unit 556 continuously collects the use state information of the electric tool 100 in the adjusted use state, and the energy management unit 559 summarizes the use state information in the adjusted use state, and calculates the second state difference value N in the selected adjusted use state;

S34. The energy management unit 559 compares the second state difference N' with the control threshold M. When N'<M, the energy management unit 559 issues a control instruction to the energy control unit 556 to adjust the use state of the electric tool 100 Self-adjust the use state to the initial use state.

As shown in FIG. 26, the initial use state is the rated use state of the electric tool 100, that is, when the electric tool 100 is in the initial use state, the battery assembly 555 is fully charged and the drive assembly 560 works according to the rated power, and the adjusted use state is the electric tool 100 When the power of the middle battery component 555 is insufficient/lower than the average power level, the driving component 560 operates at a power lower than the rated power.

As shown in FIG. 26, in step S31, the first state difference value N is the state difference value with the largest value among the state difference values in the initial use state.

As shown in FIG. 26, in step S32, the energy management unit 559 compares the first state difference value N with the control threshold value M. When N>M, the energy management unit 559 identifies the value used to calculate the first state difference value N Two electric tools 100, and mark the electric tools 100 with low usage status information (such as low remaining power/low output current) among the two electric tools 100, and further mark the electric tools 100 with the energy control unit 556. The use state of the tool 100 is adjusted to reduce the rotation speed of the drive assembly 560 or the output voltage of the battery assembly 555 without affecting the use effect of the working assembly 531, and reduce the power of the drive assembly 560, so that the use state of the electric tool 100 is free. From the initial use state to the adjusted use state, the energy between the marked power tool 100 and the remaining power tools 100 is further balanced.

As shown in FIG. 26, in step S33, the second state difference value N' is the state difference value of the largest value among the state difference values in the adjusted use state.

As shown in FIG. 26, the energy management unit 559 compares the second state difference value N' with the control threshold value M. When N'<M, the energy management unit 559 identifies the power tool 100 that is operating in the adjusted state of use. 100, and issue a control command through the energy control unit 556 to control all the drive components 560 connected to the energy management system 562 to have the same rotation speed or the battery components 555 to have the same output power, and the electric tool 100 will self-adjust and return to the initial use state. Or work according to the maximum power.

As shown in FIG. 26, the second state difference value N' is the state difference value of the largest value among the state difference values in the adjusted use state.

Figure 27:
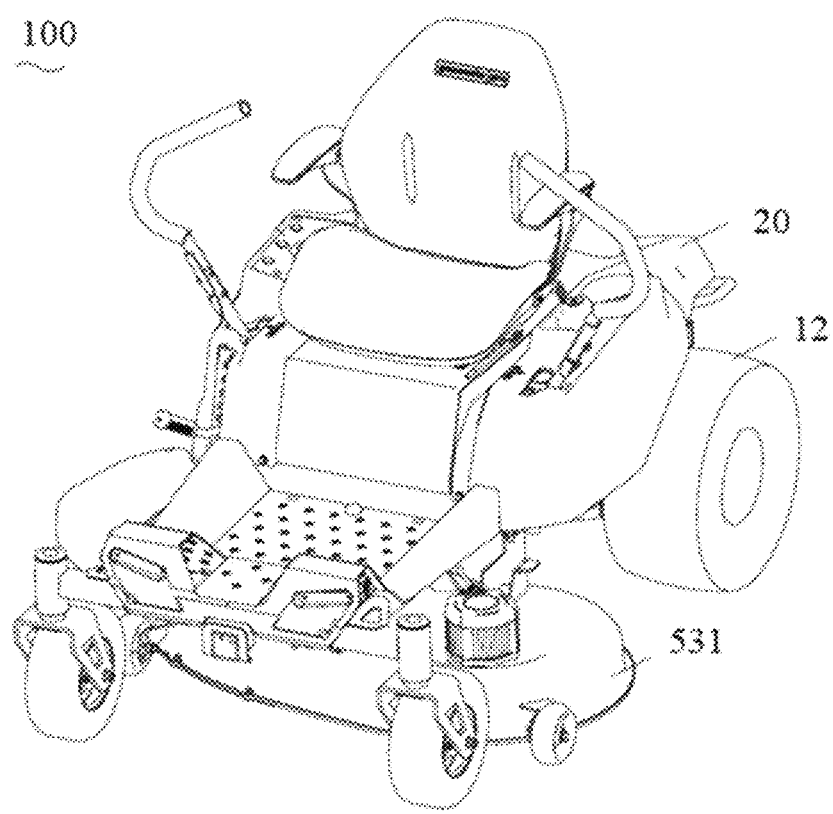
FIG. 27 is a schematic diagram of the structure of the electric tool of the present invention.
Figure 28:
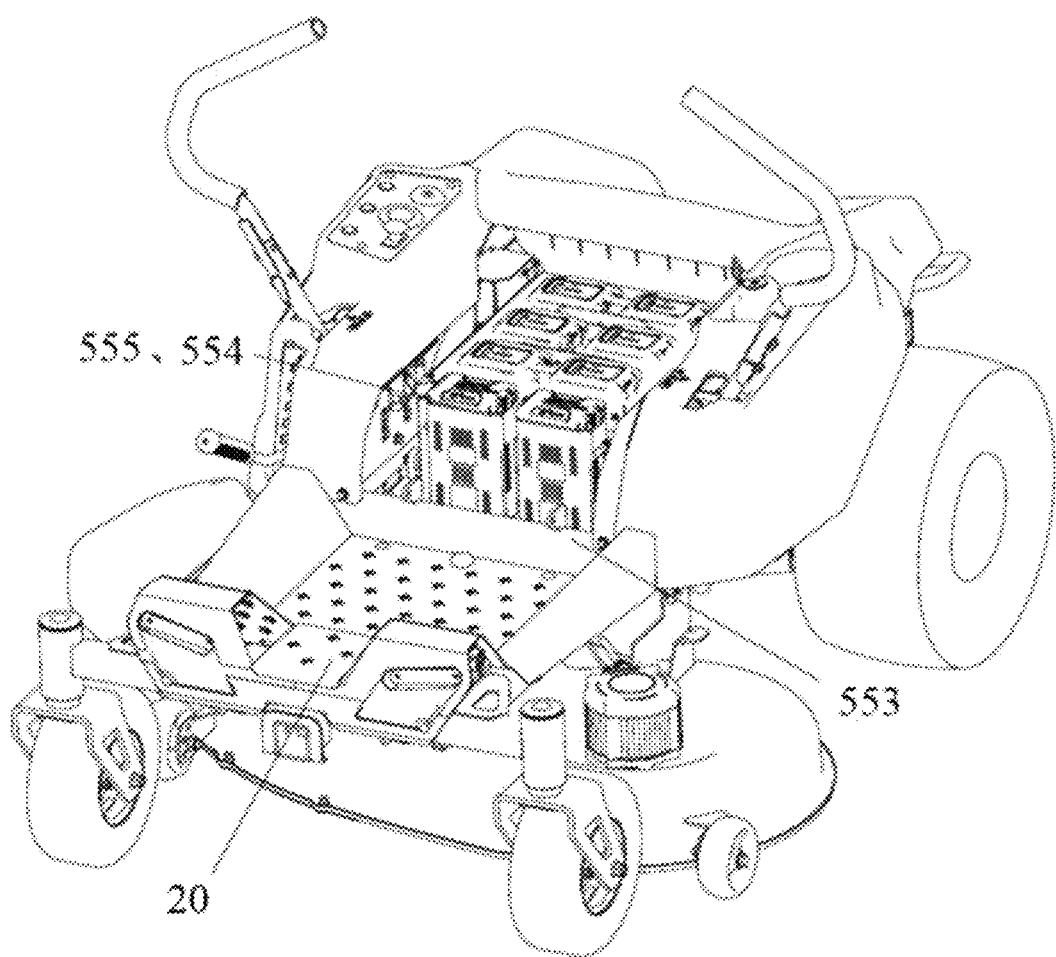
FIG. 28 is a schematic structural view of the electric tool of which part of the structure is omitted in FIG. 27.

As shown in FIGS. 27-28, the present invention also provides an electric tool 100. The electric tool 100 includes a frame 20, a working system 561 and a power system (not labeled) provided on the frame 20, and an energy management system 562 for adjusting the working state of the working system 561.

As shown in FIG. 27, the frame 20 is used to carry the working system 561 and the power system. The working system 561 is detachably connected to the frame 20 and electrically connected to the energy management system 562, including a component welding 541 detachably connected to the frame 20 and a component welding 541 arranged on the component welding 541 for realizing garden work tasks Power tools 100.

Figure 29:
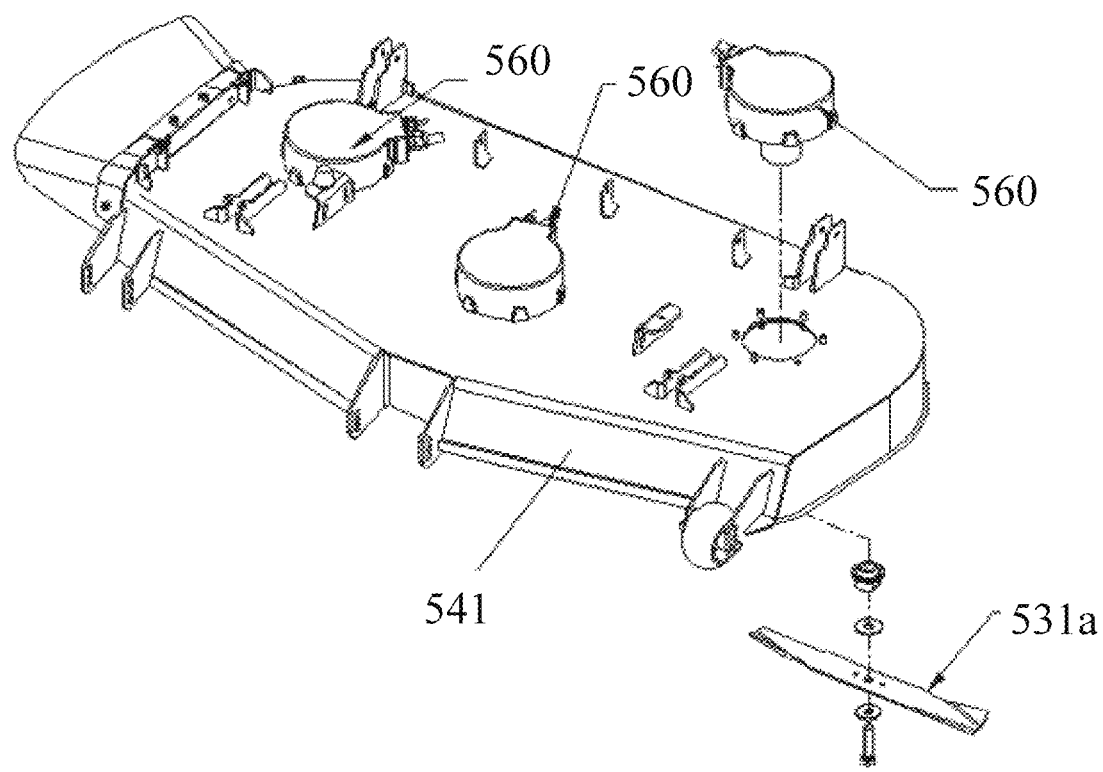
FIG. 29 is a schematic diagram of the disassembly of the tool system in FIG. 27.
Figure 30:
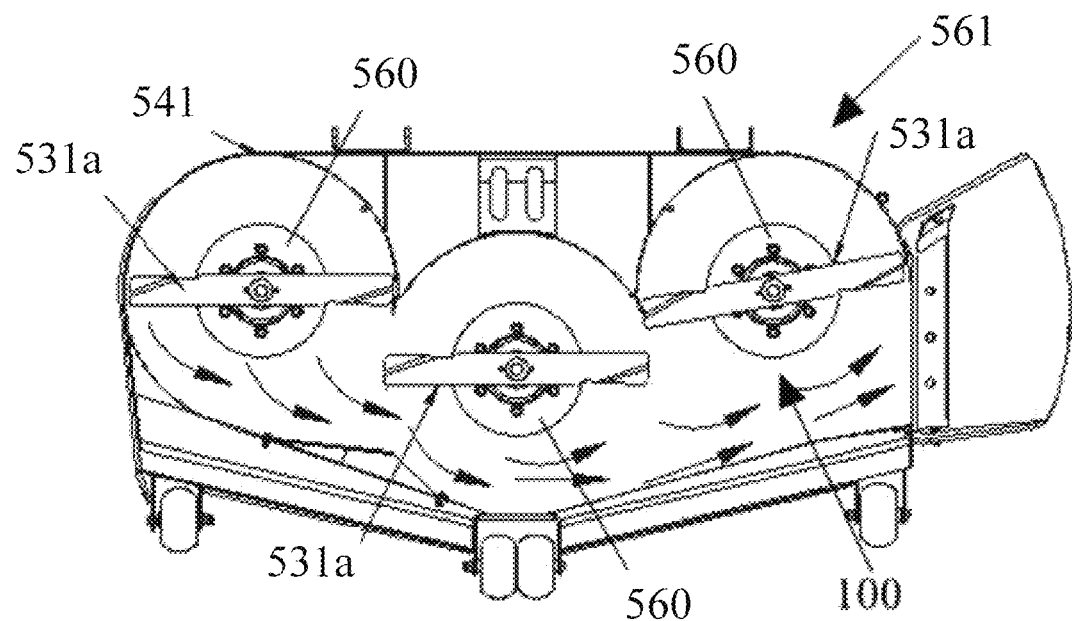
FIG. 30 is a schematic structural diagram of the tool system in FIG. 27 from another angle.
Figure 31:
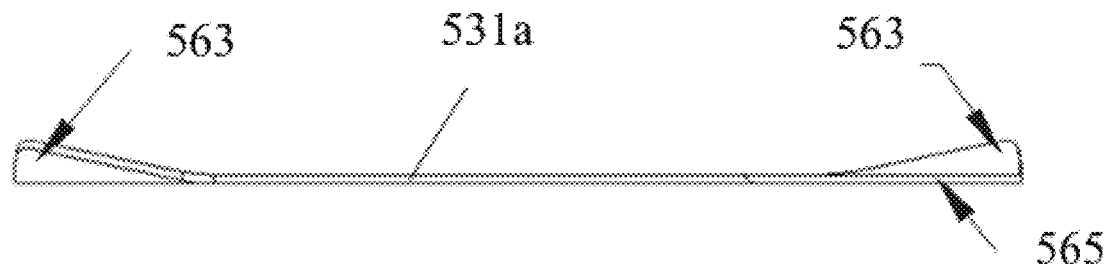
FIG. 31 is a schematic diagram of the structure of the tool assembly in FIG. 27.

As shown in FIGS. 29-31, the electric tool 100 is a lawn mower, and the electric tool 100 is a mowing work device. The working assembly 531 is a cutting knife for performing mowing tasks, and the two ends of the cutting knife 531a have The wind blade 563 tilted upward in the vertical direction and the knife tip 565 located below the wind blade 563 for breaking the grass, the driving assembly 560 is a driving motor for driving the working assembly 531, and the driving motor 560 and the cutting knife 531a are arranged in a one-to-one correspondence to individually drive each cutting knife 531a to operate. In this embodiment, the electric tool 100 is provided with 3 groups at the same time, and the 3 cutting knives 531a are arranged on the component welding 530 by displacing the 3 drives. The motor 560 is drivingly connected to the component welding 530 to increase the mowing area of the mowing power tool 100.

Figure 32:
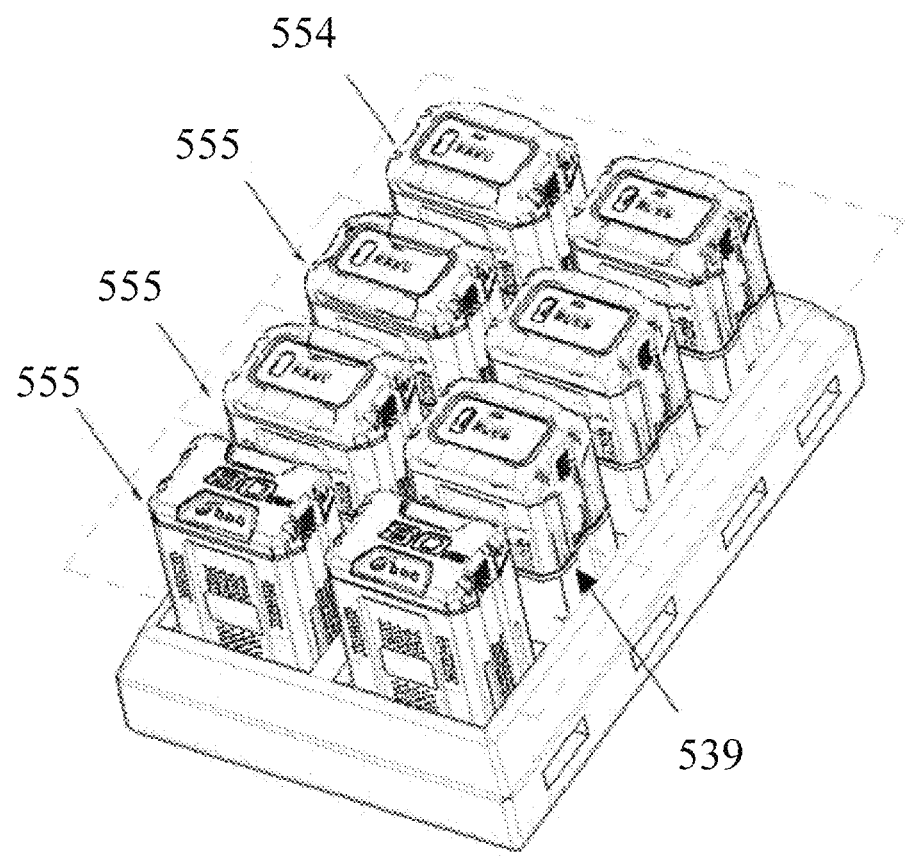
FIG. 32 is a schematic diagram of the structure of the battery assembly in FIG. 27.

As shown in FIG. 32, the battery assembly 555 and the driving motor 560 are arranged correspondingly to supply power to each driving motor 560, and each battery assembly 555 includes one or more battery packs 539. In this embodiment, it is used for The battery assemblies 555 powered by the driving motor 560 are arranged in a matrix to form a whole to facilitate the installation of the battery assemblies 555.

As shown in FIG. 32, the power system includes a walking assembly 12 for driving the electric tool 100 to walk and a battery unit 554 for powering the walking assembly. In the present invention, the electric tool 100 may be a riding garden tool, and the walking assembly 12 includes the front wheel assembly (not numbered) and the driving wheel assembly (not numbered) for driving the power tool 100 to travel, the battery unit 554 is electrically connected to the driving wheel assembly to provide power to the driving wheel assembly.

As shown in FIG. 32, the battery unit 554 includes one or more battery packs 539, and in this embodiment, the battery unit 554 and the battery assembly 555 are both connected and installed in the battery mounting cavity 553 provided on the rack 20 to All the battery packs 539 in the electric tool 100 are arranged in a regular manner, so as to reduce the difficulty of designing and manufacturing the electric tool 100.

Figure 33:
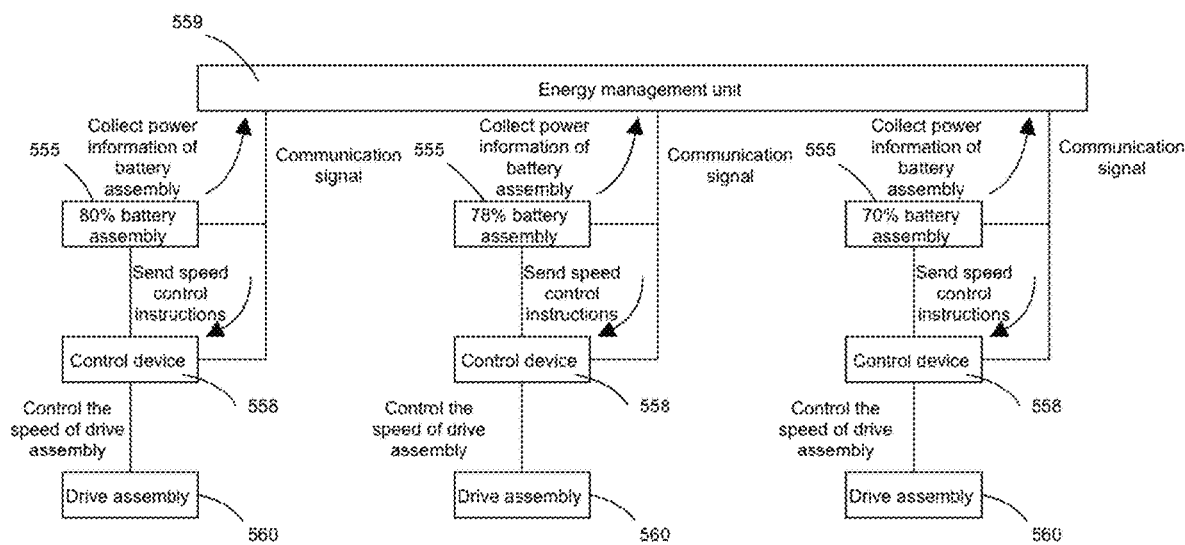
FIG. 33 is a control principle diagram of the electric tool in FIG. 27.

As shown in FIG. 33, the energy management system 562 used to adjust the working state of the working system 561 is the aforementioned energy management system, which also has an energy control unit that is electrically connected to the electric tool 100 for collecting the usage state information of the electric tool 100 556 and the energy management unit 559 for adjusting the working status of the electric tool 100 according to the usage status information collected by the energy control unit 556, and the energy management system 562 can be used to execute the aforementioned energy management method, because the energy management in this embodiment The structure and function of the system 562 and the aforementioned energy management system are basically the same, so the same content will not be repeated in the following description.

As shown in FIGS. 31-33, during the use of the power tool 100 of this embodiment, the cutting blade 531a is driven by the drive assembly 560 to run at a high speed, and the blade 565 is used to break the grass. During the working process, the blade 563 A working space is formed between the panels welded to the component 541, and the cutting blade 531a generates negative pressure around the wind blade 563 during high-speed rotation, so as to absorb the grass broken by the blade tip 565 to the vicinity of the cutting blade 531a, and The airflow is generated along the rotation direction of the three cutting blades 531a to blow the broken grass out of the component welding 541 to complete the mowing work. However, due to the inconsistency of the amount of broken grass of the three cutting blades 531a during the mowing process, the three cutting blades 531a the load is inconsistent, which further leads to inconsistency with the actual power used by the three drive components 560.

As shown in FIGS. 31-33, the remaining power of the battery assembly 555 in each electric tool 100 will differ greatly after the electric tool 100 is used for a period of time. The energy management system 562, which is electrically connected to the component 555, begins to evaluate the power of the battery component 555 in the three groups of power tools 100. Under the condition of ensuring the mowing effect of the power tool 100, the battery with less remaining power is reduced within a certain range The rotational speed of the driving motor 560 corresponding to the component 555, thereby reducing the power of the driving motor 560 and the power consumption of the battery assembly 555, until the remaining power of the three groups of electric tools 100 reaches an equilibrium level or there is a set of power between the three groups of battery components 555. Set the difference value, the energy management system 562 controls the three groups of electric tools 100 to output according to the same output power. While ensuring the use effect of the electric tool 100, it accurately monitors the discharge of each battery assembly 555, and according to the power of the battery assembly 555 Loss, the power of the drive motor 560 is controlled, and the working time of the electric tool 100 is maximized.

As shown in FIGS. 31-33, the energy management system 562 of the present invention is provided with an energy control unit 556 for collecting information about the use state of the electric tool 100 and an energy management unit 559 for issuing control instructions to the use of the electric tool 100 according to the use state information. So that the energy management system 562 can accurately collect and control the power consumption of the battery assembly 555 corresponding to each electric tool 100, and can adjust the use state of the electric tool 100 according to changes in the use state information to ensure that the power tool 100 is The loss of the battery assembly 555 corresponding to each power tool 100 is roughly the same. While ensuring the working efficiency of the power tool 100, it also improves the life time of garden tools using the energy management system 562 and the energy management method, so that it has a higher use. Efficiency and a good user experience.

Figure 34:
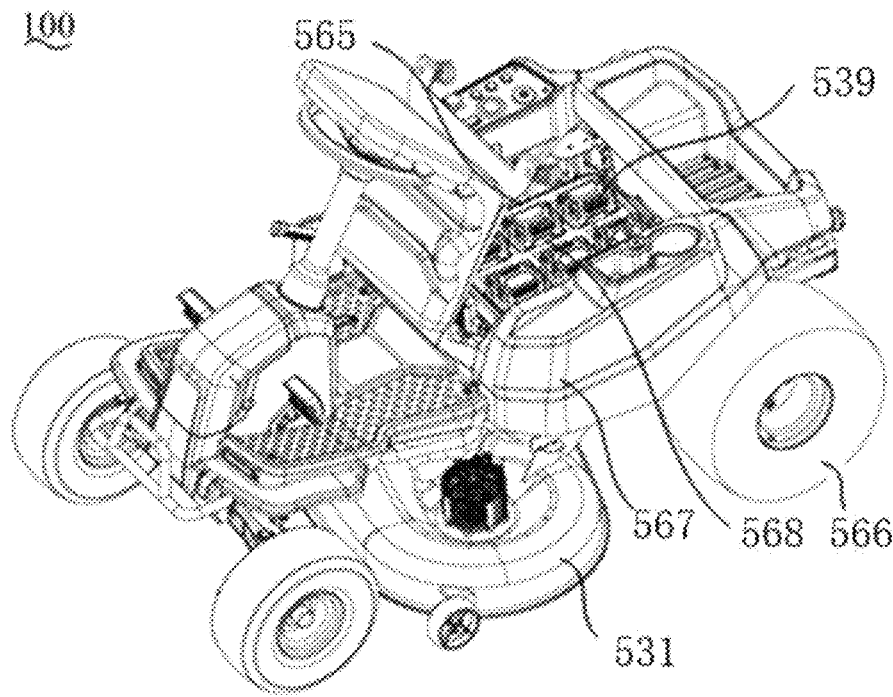
FIG. 34 is a schematic diagram of the structure of the electric tool of the present invention.

As shown in FIG. 34, the present invention further provides an electric tool 100, which includes a housing 567, a power supply assembly 565 and a driving assembly 569 housed in the housing 567, and a working assembly 531 and a walking assembly 566 connected to the housing 567. Where the power supply component 565 is used to provide power to the drive component 569, and the drive component 569 is used to drive the working component 531 and the walking component 566, so that the electric tool 100 can move in the working area and complete the corresponding garden through the working component 531 Tasks of the working group. The working component 531 and the walking component 566 can also be defined as power consumption units.

Figure 35:
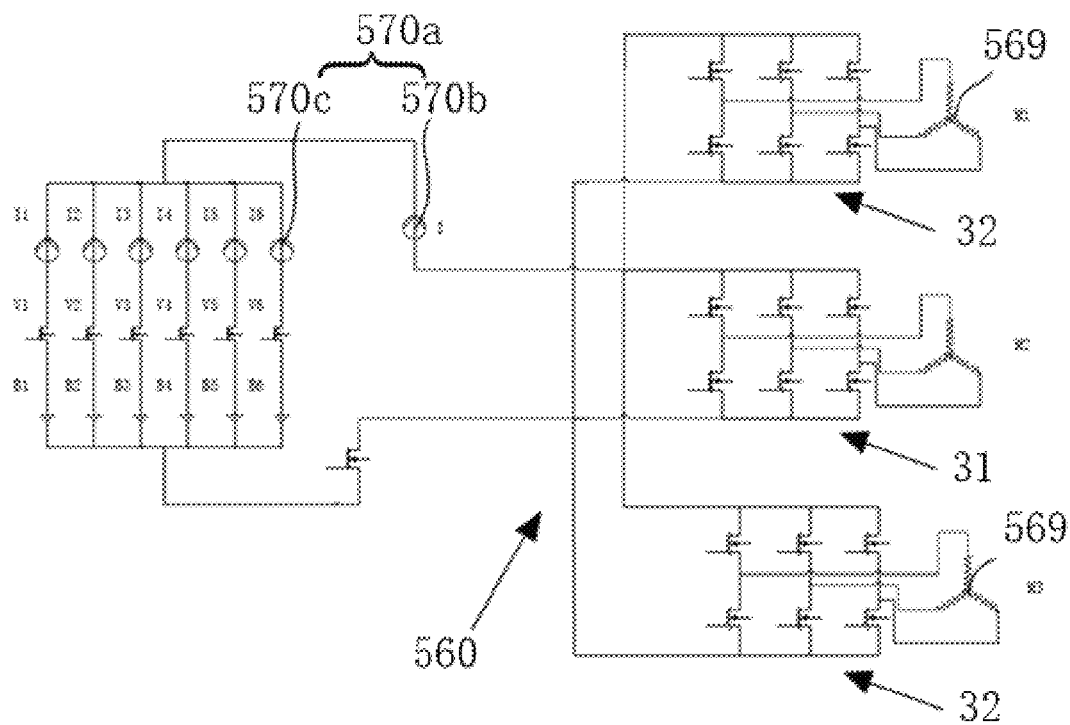
FIG. 35 is a schematic diagram of the circuit between the power supply component and the drive component of the present invention.

As shown in FIGS. 34-35, the power supply assembly 565 includes a battery pack 539, a battery pack compartment 568 for accommodating the battery pack 539, and a sensor 570*a*. One or more battery packs 539 can be provided, and each battery pack 539 can work independently, or can be connected in series or in parallel to realize the output of electric energy.

As shown in FIG. 34, the battery pack compartment 568 is connected to the housing 567. The battery pack compartment 568 is provided with a plurality of positions (not labeled) for electrically connecting the battery pack 539, and the plurality of positions are arranged in a regular arrangement to be effective the size of the power supply assembly 565 is reduced to realize the miniaturization of the electric tool 100, and in the present invention, the battery pack 539 and the battery pack compartment 568 are detachably connected.

As shown in FIG. 35, the sensor 570*a* includes a first sensor 570*b* connected to the output circuit of the power supply assembly 567 and a second sensor 570*c* electrically connected to each position. In the present invention, the sensor 570*a* is used to obtain the charging and discharging parameters of the power supply component 565. It is defined that the maximum number of battery packs 539 that can be connected in the power supply component 565 is N, and the number of battery packs 539 that are actually connected in the power supply component 565 is n, And n≤N, the charge and discharge parameters include at least the acceptable charge capacity Q of n battery packs 539, the discharge rate C of each battery pack 539 in the n battery packs 539, and the power SOC, and in the present invention, the charge power Q is obtained by calculating at least the discharge rate C and the power SOC of n battery packs 539.

As shown in FIG. 35, the charging and discharging parameters also include the total current size and the total current direction of the power supply component 565 obtained by the first sensor 570*b*, and the sub-current size of the battery pack 539 connected to the power supply component 565 obtained by the second sensor 570*c*; Sub-current direction, voltage, temperature, fault information, remaining power and other parameters related to the performance of the battery pack 539; and the discharge rate C and power SOC are also acquired by the second sensor 570*c*.

As shown in FIG. 35, the driving assembly 569 includes a first motor 31 drivingly connected to the working assembly 531 and a second motor 32 drivingly connected to the walking assembly 566. In a preferred embodiment of the present invention, the first motor 31 is simultaneously There are multiple, and the second motor 32 is provided with multiple at the same time, and is arranged in a one-to-one correspondence with the traveling wheels 51 in the traveling assembly 566.

Figure 36:
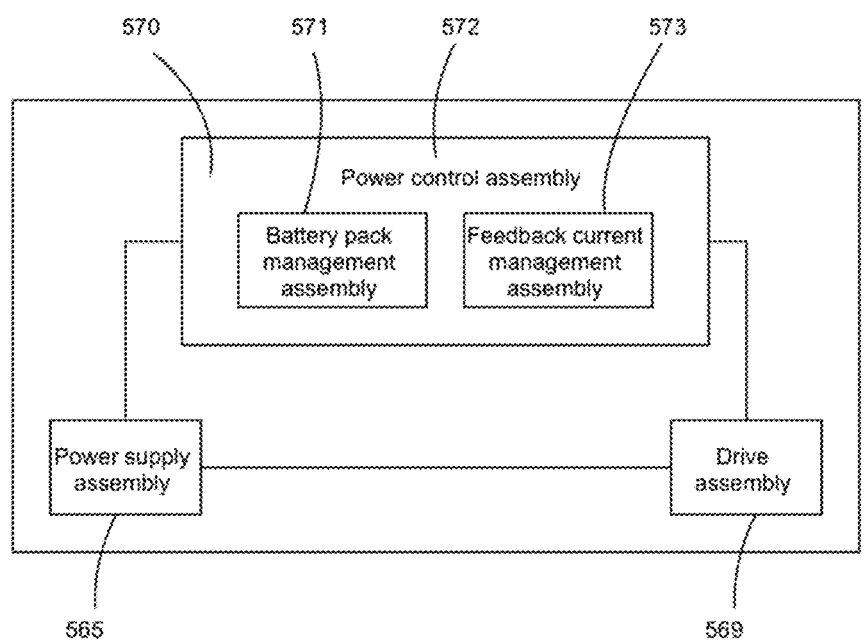
FIG. 36 is a block diagram of the connection structure of the electric energy management unit, the power supply component, and the drive component in the present invention.

As shown in FIG. 36, the electric tool 100 further includes a power management unit 570, which includes a power control module 572, a battery pack management module 571 and a feedback current management module 573 electrically connected to the power control module 572, respectively.

As shown in FIG. 36, the battery pack management module 571 is electrically connected to the power supply component 565 to obtain the charging and discharging parameters of the power supply component 565; the feedback current management module 573 is electrically connected to the driving component 569 to obtain the power supply component 569 For feedback information, the power control module is used to receive charging and discharging parameters and feedback information, and controlling the driving component 569 to reverse charge the power supply component 565 according to the charging and discharging parameters and the feedback information, or to directly release the feedback current through the driving component 569. Wherein, the feedback information includes at least the feedback power AH generated when the first motor 31 and the second motor 32 in the driving assembly 569 decelerate/overspeed.

Figure 37:
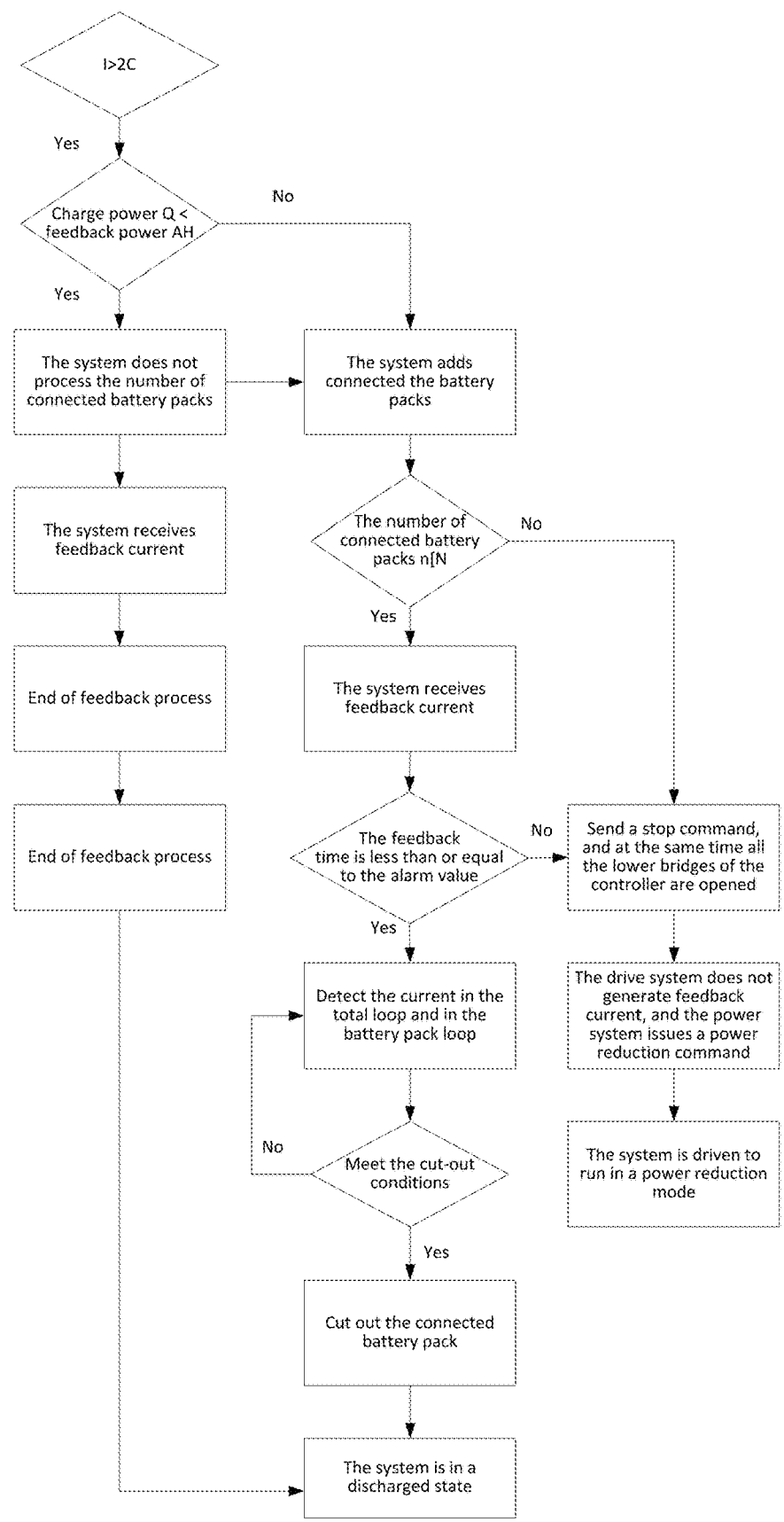
FIG. 37 is a flow chart of judgment when the power management unit of the present invention is working.

As shown in FIGS. 35-37, the feedback current management module 573 is electrically connected to the second sensor 570*c* to obtain the feedback information of the driving component 569; the output circuit is connected to the power control module 572, and can be connected to the power control module 572. Turn on/off under the control of 572; the feedback information in the present invention also includes the feedback current I and the feedback time T, and the feedback power AH is at least related to the feedback current I and the feedback time T.

As shown in FIGS. 35-37, the walking assembly 566 of the electric tool 100 has three feedback braking situations during operation. One is that the speed of the second motor 32 corresponding to the walking assembly 566 exceeds the speed provided by the electric tool 100. Maximum speed. At this time, the second motor 32 can directly feed back electrical energy to the power supply component 565 through the feedback circuit in the feedback current management module 573, and at the same time provide electromagnetic torque for braking, which may occur when going downhill, for example.

As shown in FIGS. 35-37, another situation occurs during the deceleration of the walking assembly 566 during normal driving. At this time, the second motor 32 is in the power generation state to generate feedback current, and the feedback circuit feeds back part of the feedback current to the power supply assembly. 565, and continuously charge the power supply component 565 during this process. The third feedback braking situation is that when the second motor 32 is powered off, the working assembly 531 continues to rotate under the action of inertia. At this time, the second motor 32 will also generate feedback current, that is, in the present invention, the feedback power AH is at least It is jointly determined by the aforementioned three regenerative braking situations.

As shown in FIGS. 35-37, the power control module 572 is used to receive the charging power Q and the feedback power AH, and determine the magnitude of the charging power Q and the feedback power AH, to control the driving component 569 to reverse the power supply component 565 The consumption of the feedback power AH is realized directly by charging or by driving the component 569.

As shown in FIGS. 35-37, the maximum number of battery packs 539 that can be connected in the power supply component 565 is defined as N, and the number of battery packs 539 that are actually connected in the power supply component 565 is n, and n≤N, then the charging power Q is defined by The number n of battery packs connected in the power supply component, the discharge rate C of each battery pack connected, and the power SOC are calculated and obtained by the electric energy control module 572. When N battery packs 539 are connected to the power supply component 565 at the same time, the power supply component 565 has the maximum charging power Qmax.

As shown in FIGS. 35-37, when the second motor 32 is in a decelerating/overspeeding state and the first motor 31 and/or the second motor 32 generates feedback current, the power control module 572 controls the charging power Q and the maximum charging power Qmax. And the feedback power AH is calculated and compared. Further, when the charging power Q≥the feedback power AH, the power control module 572 uses the driving component 569 to reversely charge the n battery packs 539, and according to the power of each battery pack 539 The SOC controls the charging time of the battery pack 539 to avoid overcharging the battery pack 539.

As shown in FIGS. 35-37, when the charging power Q≤the feedback power AH≤the maximum charging power $Q_{max}$, the power control module 572 controls the battery pack 539 in the released state in the power supply component 5651 to be connected, so that the adjusted charging power Q'≥return power AH; then the power control module 572 uses the drive component 569 to reversely charge each battery pack 539 in the power supply component 565; similarly, the power control module 6 can still charge each battery pack according to each battery pack in the process. The power SOC of 539 controls the charging time of the battery pack 539 to prevent the battery pack 539 from overcharging.

As shown in FIGS. 35-37, when the charging power Q<the maximum charging power is $Q_{max}$<the feedback power AH, the power control module 572 realizes the release of the feedback power AH through the driving component 569; or the power control module 572 controls N batteries All the packs 539 are connected to the power supply component 565, and the N battery packs 539 are reversely charged through the drive component 569 until the charging power Q=the maximum charging power is $Q_{max}$, the power control module 572 controls the drive component 569 to stop supplying power The component 565 supplies power, and the remaining feedback power AH is released through the driving component 569.

As shown in FIGS. 35-37, a switch member 569 is provided in the second motor 32, and the switch member 569 is in control connection with the power control module 572, and the switch member 569 can be turned on under the control of the power control module 572, and the first motor The feedback current I or the remaining feedback power AH generated by a motor 31 and/or the second motor 32 is released through the motor internal resistance of the second motor 32.

As shown in FIGS. 35-37, only the power control module 572 is used to control the power supply assembly 565 to connect to the battery pack 539 in the released state, so that the feedback current I can be fully or partially acted on the battery pack 539. It also improves the utility of the power tool 100. In fact, the power control module 572 can also control the battery pack 539 in the power supply assembly 565 to release according to the charge power Q and the feedback power AH, so that the battery pack connected to the power supply assembly 565 The power of 539 is in an equilibrium state, and during this process, the power control module 572 can evaluate the remaining power of each battery pack 539 connected to the battery pack compartment 568 to release the fully charged battery pack 539.

As shown in FIGS. 35-37, in the foregoing description, only the number n of battery packs 539 connected to the power supply assembly 565 is used as an example. In fact, the calculation of the number n of battery packs by the power control module 572 is also related to the battery pack The temperature t of 539 is related to the power SOC. Specifically, taking the temperature t=40° C. as an example, the power control module 572 detects that the charging power Q<the feedback power AH, and the feedback current I≤2 times the discharge rate C, and the power control When the module 572 evaluates that the power SOC of the power supply component 565 is greater than or equal to 90%, the power control module 572 will connect two battery packs 539 to the feedback circuit at the same time to receive the feedback current I. If the battery pack is available at this time The number of 539 n<2, the power control module 572 can alarm, and control the power tool 100 to take a speed-down action, the switch member 569 in the second motor 32 is turned on, so that the feedback power AH is consumed on the internal windings of the second motor 32, Does not feed back to the power supply component 565, so as to ensure the safety of the battery pack 539.

Please refer to Table 1, which shows the feedback current I of the power supply component 565 and the driving component 569, the discharge rate C of the battery pack 539, and the number of battery packs 539 during the use of the power management unit 570 in a preferred embodiment of the present invention. n. The relationship between the temperature t of the battery pack 539 and the power SOC:

TABLE 1

| Temp. t | Feedback Current I | Power SOC ≥ 90% | Power SOC ≥ 50% | Power SOC ≥ 30% | Power SOC ≥ 20% |
|---|---|---|---|---|---|
| 40° C. | I ≤ 2C | n ≥ 2 | n ≥ 1 | n ≥ 1 | n ≥ 1 |
|  | 2C < I ≤ 4C | n ≥ 3 | n ≥ 2 | n ≥ 2 | n ≥ 2 |
|  | 4C < I ≤ 8C | n ≥ 5 | n ≥ 4 | n ≥ 4 | n ≥ 4 |
|  | 8C < I ≤ 12C | n ≥ 6 | n ≥ 5 | n ≥ 5 | n ≥ 5 |
|  | When I > 12C, then the feedback time T > 100 ms, or the quantity | When I > 12C, all N battery packs 539 are connected, and when the feedback time T > 100 ms, the power control | When I > 12C, all N battery packs 539 are connected, and when the feedback time T > 100 ms, the power control | When I > 12C, all N battery packs 539 are connected, and when the feedback time T > 100 ms, the power control | When I > 12C, all N battery packs 539 are connected, and when the feedback time T > 100 ms, the power control |

TABLE 1-continued

| Temp. t | Feedback Current I | Power SOC ≥ 90% | Power SOC ≥ 50% | Power SOC ≥ 30% | Power SOC ≥ 20% |
|---|---|---|---|---|---|
| | of battery packs 539 is insufficient | module 572 controls the drive component 569 to cease providing power to the power supply component 565. The release of the remaining feedback power AH through the drive component 569 is thus realized, and the power management unit 570 issues a power down command. | module 572 controls the drive component 569 to cease providing power to the power supply component 565. The release of the remaining feedback power AH through the drive component 569 is thus realized, and the power management unit 570 issues a power down command. | module 572 controls the drive component 569 to cease providing power to the power supply component 565. The release of the remaining feedback power AH through the drive component 569 is thus realized, and the power management unit 570 issues a power down command. | module 572 controls the drive component 569 to cease providing power to the power supply component 565. The release of the remaining feedback power AH through the drive component 569 is thus realized, and the power management unit 570 issues a power down command. |
| 25° C. | I ≤ 2C | n ≥ 2 | n ≥ 1 | n ≥ 1 | n ≥ 1 |
| | 2C < I ≤ 4C | n ≥ 3 | n ≥ 2 | n ≥ 2 | n ≥ 2 |
| | 4C < I ≤ 8C | n ≥ 5 | n ≥ 4 | n ≥ 4 | n ≥ 4 |
| | 8C < I ≤ 12C | n ≥ 6 | n ≥ 5 | n ≥ 5 | n ≥ 5 |
| | When I > 12C, then the feedback time T > 100 ms, or the quantity of battery packs 539 is insufficient | When I > 12C, all N battery packs 539 are connected, and when the feedback time T > 100 ms, the power control module 572 controls the drive component 569 to cease providing power to the power supply component 565. The release of the remaining feedback power AH through the drive component 569 is thus realized, and the power management unit 570 issues a power down command. | When I > 12C, all N battery packs 539 are connected, and when the feedback time T > 100 ms, the power control module 572 controls the drive component 569 to cease providing power to the power supply component 565. The release of the remaining feedback power AH through the drive component 569 is thus realized, and the power management unit 570 issues a power down command. | When I > 12C, all N battery packs 539 are connected, and when the feedback time T > 100 ms, the power control module 572 controls the drive component 569 to cease providing power to the power supply component 565. The release of the remaining feedback power AH through the drive component 569 is thus realized, and the power management unit 570 issues a power down command. | When I > 12C, all N battery packs 539 are connected, and when the feedback time T > 100 ms, the power control module 572 controls the drive component 569 to cease providing power to the power supply component 565. The release of the remaining feedback power AH through the drive component 569 is thus realized, and the power management unit 570 issues a power down command. |
| 0° C. | I ≤ 2C | n ≥ 6 | n ≥ 3 | n ≥ 3 | n ≥ 3 |
| | 2C < I ≤ 4C | n ≥ 6 | n ≥ 4 | n ≥ 4 | n ≥ 4 |
| | 4C < I ≤ 8C | n ≥ 6 | n ≥ 5 | n ≥ 5 | n ≥ 5 |
| | When I > 8C, then the feedback time T > 100 ms, or the quantity of battery packs 539 is insufficient | When I > 8C, all N battery packs 539 are connected, and when the feedback time T > 100 ms, the power control module 572 controls the drive component 569 to cease providing power to the power supply component 565. The release of the remaining feedback power AH through the drive component 569 is thus realized, and the power management unit 570 issues a power down command. | When I > 8C, all N battery packs 539 are connected, and when the feedback time T > 100 ms, the power control module 572 controls the drive component 569 to cease providing power to the power supply component 565. The release of the remaining feedback power AH through the drive component 569 is thus realized, and the power management unit 570 issues a power down command. | When I > 8C, all N battery packs 539 are connected, and when the feedback time T > 100 ms, the power control module 572 controls the drive component 569 to cease providing power to the power supply component 565. The release of the remaining feedback power AH through the drive component 569 is thus realized, and the power management unit 570 issues a power down command. | When I > 8C, all N battery packs 539 are connected, and when the feedback time T > 100 ms, the power control module 572 controls the drive component 569 to cease providing power to the power supply component 565. The release of the remaining feedback power AH through the drive component 569 is thus realized, and the power management unit 570 issues a power down command. |
| -10° C. | I ≤ 2C | n ≥ 6 | n ≥ 4 | n ≥ 4 | n ≥ 4 |
| | When I > 2C, then the feedback time T > 100 ms, or the quantity of battery packs 539 is insufficient | When I > 2C, all N battery packs 539 are connected, and when the feedback time T > 100 ms, the power control module 572 controls the drive component 569 to | When I > 2C, all N battery packs 539 are connected, and when the feedback time T > 100 ms, the power control module 572 controls the drive component 569 to | When I > 2C, all N battery packs 539 are connected, and when the feedback time T > 100 ms, the power control module 572 controls the drive component 569 to | When I > 2C, all N battery packs 539 are connected, and when the feedback time T > 100 ms, the power control module 572 controls the drive component 569 to |

TABLE 1-continued

| Temp. t | Feedback Current I | Power SOC ≥ 90% | Power SOC ≥ 50% | Power SOC ≥ 30% | Power SOC ≥ 20% |
|---|---|---|---|---|---|
| | | cease providing power to the power supply component 565. The release of the remaining feedback power AH through the drive component 569 is thus realized, and the power management unit 570 issues a power down command. | cease providing power to the power supply component 565. The release of the remaining feedback power AH through the drive component 569 is thus realized, and the power management unit 570 issues a power down command. | cease providing power to the power supply component 565. The release of the remaining feedback power AH through the drive component 569 is thus realized, and the power management unit 570 issues a power down command. | cease providing power to the power supply component 565. The release of the remaining feedback power AH through the drive component 569 is thus realized, and the power management unit 570 issues a power down command. |

As shown in FIGS. 35-37, the power control module 572 estimates that the power SOC of the power supply component 565 is greater than or equal to 90% as an example for illustration. In other embodiments of the present invention, the power SOC may also be 50% or 30% and 20%. The smaller the power SOC, the greater the charging power Q of the power supply component 565. At this time, the larger the number n of battery packs 539 that need to be connected to the power supply component 565. At this time, only the charging power Q needs to be guaranteed. Feed back the power AH.

In this specification and the accompanying drawings, the electric tool 100 is an electric lawn mower as an example for illustration. In other embodiments of the present invention, the electric tool 100 may also be an electric drill, a chain saw, a table saw, or a lawn mower. Lawn trimmers, hair dryers, etc. are commonly used electric tools that also have a power supply component 565, a drive component 569, and an electric power management unit 570.

As shown in FIGS. 34-37, the electric tool 100 of the present invention is provided with an electric power control assembly 570 connected to the power supply assembly 565 and the drive assembly 569 respectively, and can automatically and timely be in position according to the state of the battery pack 539 in the electric tool 100 The battery pack 539 in the released state is connected to the feedback circuit to jointly absorb the feedback current I generated by the driving component 569 to prevent a single battery pack 539 from being overcharged, thereby prolonging the life of the battery pack 539 and providing feedback current to the driving component 569. While effective utilization and release of I, the working efficiency of the electric tool 100 is improved.

Figure 38:
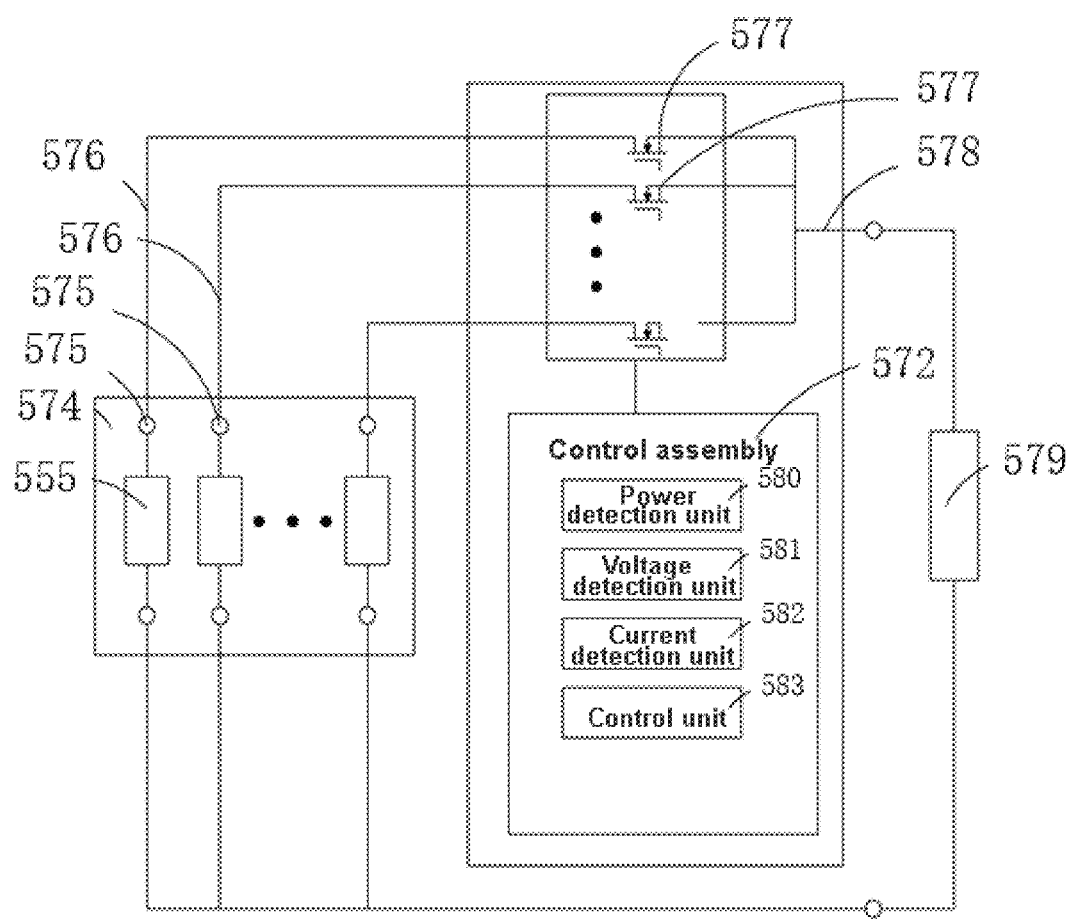
FIG. 38 is a schematic diagram of modules of the battery assembly management device of the present invention.

As shown in FIG. 38, the present invention provides a battery component management device for controlling a number of battery components 555 to work in parallel to supply power to a load 579. The battery assembly management device includes a battery compartment 574 for accommodating the battery assembly 555, a control assembly 572, and an output branch 578.

As shown in FIG. 38, the battery compartment 574 is provided with at least two battery interfaces 575. Each battery interface 575 is used to connect to the battery assembly 555, and the battery assembly 555 connected to it forms a power supply branch 576. In practical applications, the number of the battery interfaces 575 can be set as required. The specifications of the multiple battery assemblies 555 connected to the battery interface 575 may be the same or different. Each power supply branch 576 is further provided with a switch 577, and the other end of the switch 577 is connected to the output branch 578, so that the power supply branch 576 and the output branch 578 are controlled by the switch 577. Between on and off. In this embodiment, the switch 577 is a switch tube. The control component 572 includes a power detection unit 580 to detect the power of the battery component 555, a voltage detection unit 581 to detect the voltage of the battery component 555, and a current detection to detect the current of the power supply branch 576 and the output branch 578. Unit 582 and control unit 583.

As shown in FIG. 38, during use, the control unit 583 obtains the internal information of the battery assembly 555 through the battery interface 575, and determines whether the battery assembly 555 is abnormal according to the internal information. If the battery assembly 555 is abnormal, the control unit 583 controls the power supply branch 576 corresponding to the battery assembly 555 to stop working, and sends an alarm message to notify the user of the abnormal battery assembly 555. The abnormality may be the lack of a single cell in the battery assembly, the voltage of the single cell or battery pack is too high, the voltage of the single cell or the battery pack is too low, the temperature of the single cell or the battery pack is too high, and so on. In this embodiment, the control unit 583 controls whether the power supply branch 576 works by controlling the switch 577. The control unit 583 controls the power detection unit 580 to work to detect the power of the battery assembly 555 corresponding to each power supply branch 576. If the number of battery components 555 whose power is greater than the first power threshold $Q_{1\ is\ not\ less\ than\ N\ 1}$, the control unit 583 directly or indirectly controls the upper limit of the output current of each battery component 555 to the rated current $I_{m\ of}$ the battery component 555. If the number of battery components 555 with power greater than the first power threshold $Q_{1\ is\ less\ than\ N\ 1}$, and the number of battery components 555 with power greater than the second power threshold $Q_2$ is not less than $N_2$, the control unit 583 directly or indirectly controls each battery The upper limit of the output current of the component 555 is $k_1*I_m$. If the number of battery components 555 whose power is greater than the second power threshold $Q_{2\ is\ less\ than\ N\ 3}$, the control unit 583 directly or indirectly controls the upper limit of the output current of each battery component 555 to $k_2*I_m$, where $Q_1>Q_2$, $0<k_2<k_1<1$. The direct control means that the control unit 583 reduces the current output or the upper limit of the current output of the power supply branch 576 by controlling the duty cycle of the control signal of the switch 577. The indirect control means that the control unit 583 sends a current limit signal to the load 579, so as to indirectly achieve the purpose of reducing the upper limit of the output current of the battery assembly 555 by means of the load 579 self-limiting power. The first power threshold $Q_1$ and the second power threshold $Q_2$ may refer to power or a percentage of power. The $N_1$, $N_2$, $N_3$, $k_1$, and $k_2$ can be set as required. For example, $N_{1\ is}$ set to 4, $N_{2\ is}$ set to 2, $N_{3\ is}$ set to 2, $k_{1\ is}$ set to 60%, and $k_{2\ is}$ set to 50%. This arrangement can effectively prevent the battery assembly 555 from being over-discharged, thereby protecting the battery assembly 555 and prolonging the service life of the battery assembly 555.

As shown in FIG. 38, the control unit 583 determines the priority level of each power supply branch 576 according to the level of power, and then controls the power supply branch 576 with the highest priority to supply power to the load 579. When the difference between the power of the currently working battery component 555 and the power of the battery component 555 of the power supply branch 576 corresponding to the next priority level is within the first power range, the control unit 583 controls the power supply branch corresponding to the next priority level 576 works, and is connected in parallel with the currently working power supply branch 576 to supply power to the load 579. The size of the first power interval can be set as needed. Of course, in other embodiments, the control unit 583 may also determine the priority level of each power supply branch 576 according to the percentage of power, and then control the power supply branch 576 with the highest priority to supply power to the load 579; the power percentage It is the ratio of the current power of the battery assembly 555 to the rated power. When the difference between the power percentage of the battery component 555 currently working and the power percentage of the battery component 555 of the power supply branch 576 corresponding to the next priority level is within the first proportional interval, the control unit 583 controls the power supply corresponding to the next priority level The branch 576 works, and is connected in parallel with the currently working power supply branch 576 to supply power to the load 579. The size of the first ratio interval can be set as required. Of course, it is understandable that the control unit 583 can also determine the priority level of each power supply branch 576 according to the voltage level, and then control the power supply branch 576 with the highest priority level to supply power to the load 579; When the difference between the voltage of the battery assembly 555 and the voltage of the battery assembly 555 of the power supply branch 576 corresponding to the next priority level is within the first voltage interval, the control unit 583 controls the power supply branch 576 corresponding to the next priority level to work, and It is connected in parallel with the currently working power supply branch 576 to supply power to the load 579. The first voltage interval may be 3V-5V. Of course, the range of the first voltage interval can also be set as needed.

As shown in FIG. 38, when the voltage detection unit 581 detects that the voltage of the battery assembly 555 is greater than the overvoltage value or less than the undervoltage value, the control unit 583 controls the power supply branch 576 corresponding to the battery assembly 555. The switch 577 is turned off, so that the power supply branch 576 corresponding to the battery assembly 555 stops working, thereby protecting the battery assembly 555.

As shown in FIG. 38, when the current detection unit 582 detects that the current of the power supply branch 576 is greater than the first current threshold or less than the second current threshold, the control unit 583 controls the power supply branch 576 to stop working to protect the power supply branch 576 corresponds to the battery assembly 555 and the load 579. The first current threshold is the maximum current allowed by the power supply branch 576. The second current threshold value is the minimum current value allowed by the power supply branch 576, and is usually set to zero. When the current of the power supply branch 576 is less than zero, the battery assembly 555 corresponding to the power supply branch 576 is in a charging state.

As shown in FIG. 38, the control unit 583 also detects the number N of battery assemblies 555 currently operating. The current detection unit 582 also detects the current of the output branch 578, that is, the total current I output by all the battery assemblies 555 currently working. If $_{I>(N*I_m+\Delta I)}$, the control unit 583 directly or indirectly controls the battery assembly 555 to reduce the output current, wherein the current offset [Delta] I is set in advance. When $_{I>(N*I_m+\Delta I)}$ and exceeds a preset time threshold, the control unit 583 directly or indirectly controls the battery assembly 555 to reduce the current output.

As shown in FIG. 38, the battery component management device of the present invention can intelligently limit the output current of the battery component 555 or intelligently switch the working mode of the load 579 according to the power and quantity of the battery component 555, thereby extending the load. The working time of 579 avoids the disadvantages of excessive use of the battery assembly 555, thereby protecting the battery assembly 555, prolonging the service life of the battery assembly 555, and improving the overall working efficiency of the load 579.

Figure 39:
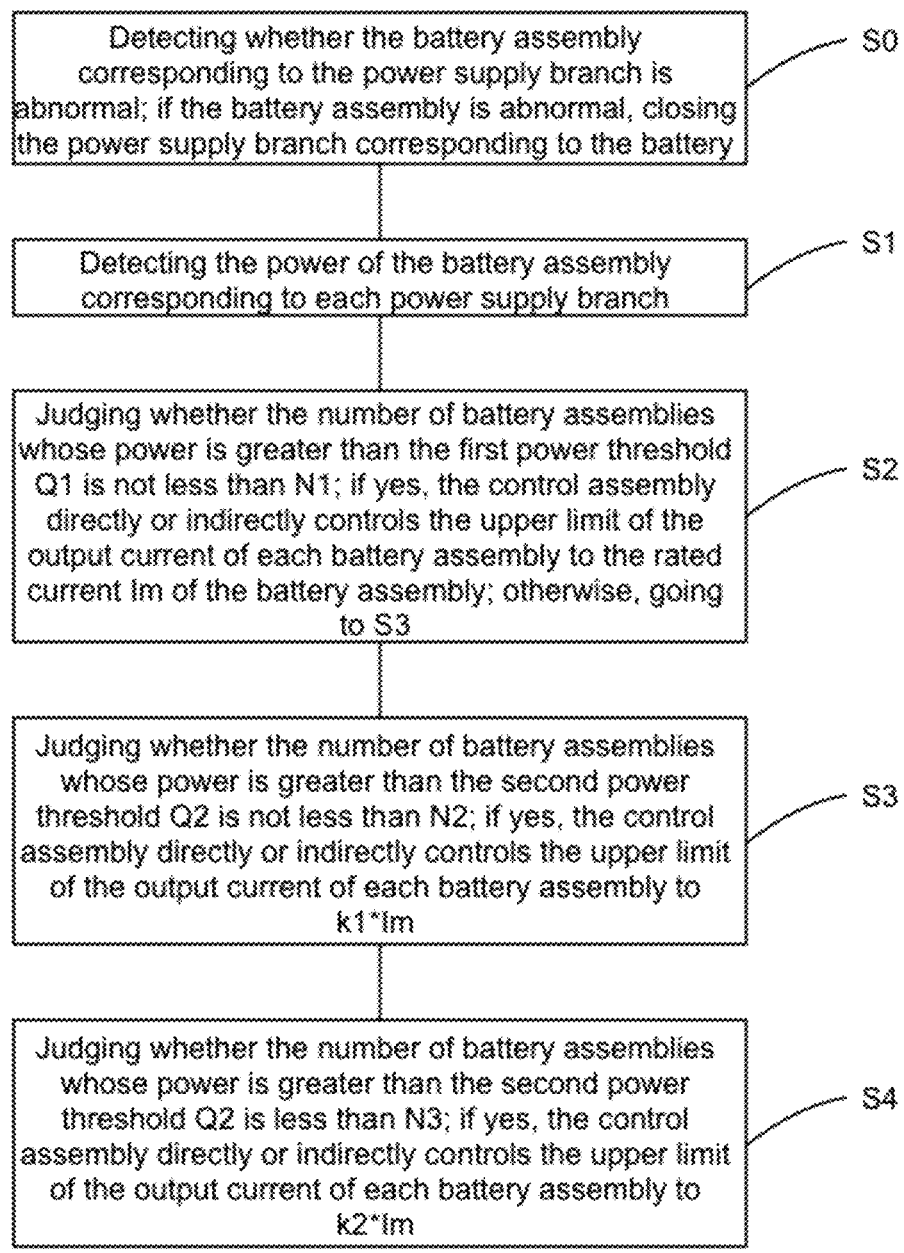
FIG. 39 is a schematic flow chart of the battery pack management method of the present invention.

As shown in FIG. 39, the present invention also provides a battery component management method for controlling a number of battery components 555 to work in parallel to supply power to the load 579. The battery component management method includes the following steps:

S0: Detect whether the battery component corresponding to the power supply branch is abnormal; if the battery component is abnormal, close the power supply branch corresponding to the battery component.

S1: Detect the power of the battery component corresponding to each power supply branch.

S2: determining a first power is greater than the threshold quantity Q of the battery pack $_1$ is the number N is not less than $_1$; if yes, control component directly or indirectly controls the output current limit for each battery module rated current $I_m$ of the battery pack; otherwise, Go to step S3.

S3: Judging whether the number of battery components whose power is greater than the second power threshold $Q_{2\ is\ not\ less\ than\ N\ 2}$; if so, the control component directly or indirectly controls the upper limit of the output current of each battery component to $k_1*I_m$; where $Q_1>Q_2$, $0<k_1<1$.

S4: Determine whether the number of battery components with a power greater than the second power threshold Q2 is less than N3; if so, the control component directly or indirectly controls the upper limit of the output current of each battery component to $k_2*I_m$, where $0<k_2<k_1<1$.

Figure 40:
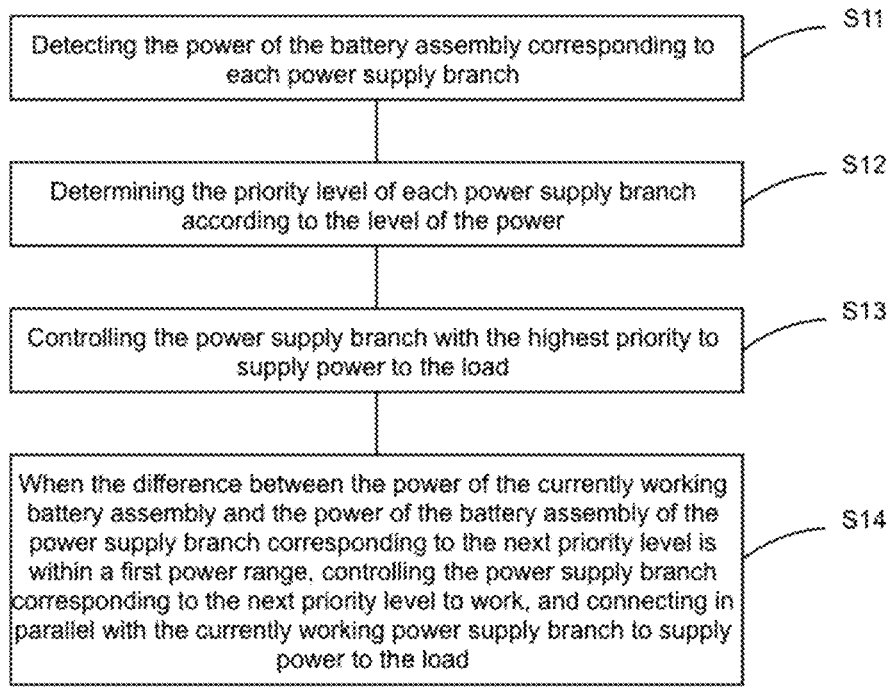
FIG. 40 is a schematic flowchart of step S1.

As shown in FIG. 40, the step S1 further includes the following steps:

S11: Detect the power of the battery component corresponding to each power supply branch;

S12: Determine the priority level of each power supply branch according to the level of power;

S13: Control the power supply branch with the highest priority to supply power to the load;

S14: When the difference between the power of the currently working battery component and the power of the battery component of the power supply branch corresponding to the next priority level is within the first power range, control the power supply branch corresponding to the next priority level to work, and compare it to the current work The power supply branches are connected in parallel to supply power to the load.

Figure 41:
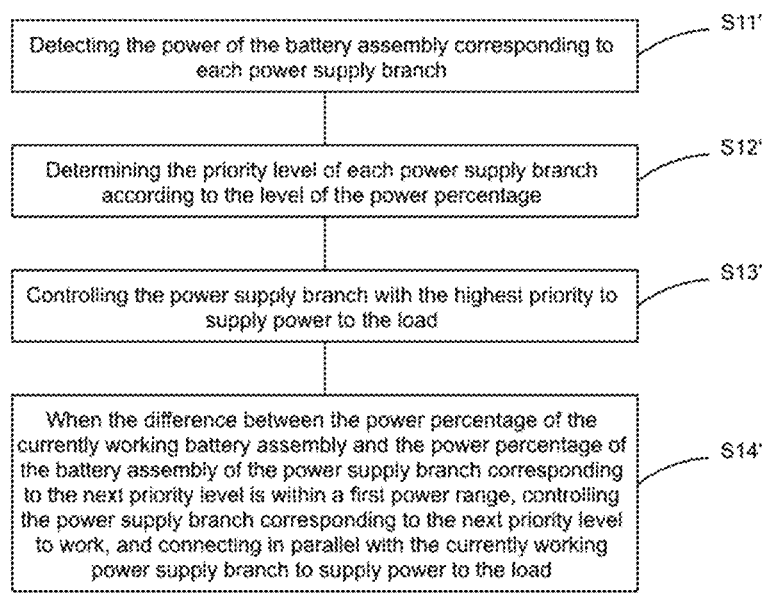
FIG. 41 is a schematic flowchart of step S1 in another embodiment.

As shown in FIG. 41, in other embodiments, the step S1 may also be:

S11': Detect the percentage of power of the battery assembly corresponding to each power supply branch;

S12': Determine the priority level of each power supply branch according to the percentage of electricity;

S13': Control the power supply branch with the highest priority to supply power to the load;

S14': When the difference between the power percentage of the battery component currently working and the power percentage of the battery component of the power supply branch corresponding to the next priority level is within the first proportional interval, control the power supply branch corresponding to the next priority level to work, and it is connected in parallel with the current working power supply branch to supply power to the load.

Figure 42:
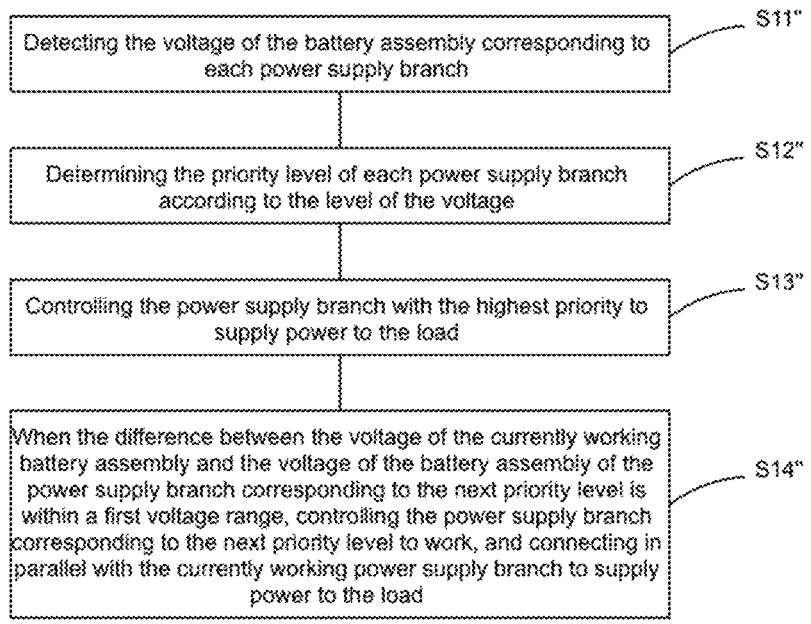
FIG. 42 is a schematic flowchart of step S1 in another embodiment.

As shown in FIG. 42, the step S1 may also be:

S11": Detect the voltage of the battery component corresponding to each power supply branch;

S12": Determine the priority level of each power supply branch according to the voltage level;

S13": Control the power supply branch with the highest priority to supply power to the load;

S14": When the difference between the voltage of the currently working battery component and the voltage of the battery component of the power supply branch corresponding to the next priority level is within the first voltage interval, control the power supply branch corresponding to the next priority level to work and compare it with the current the working power supply branches are connected in parallel to supply power to the load.

Figure 43:
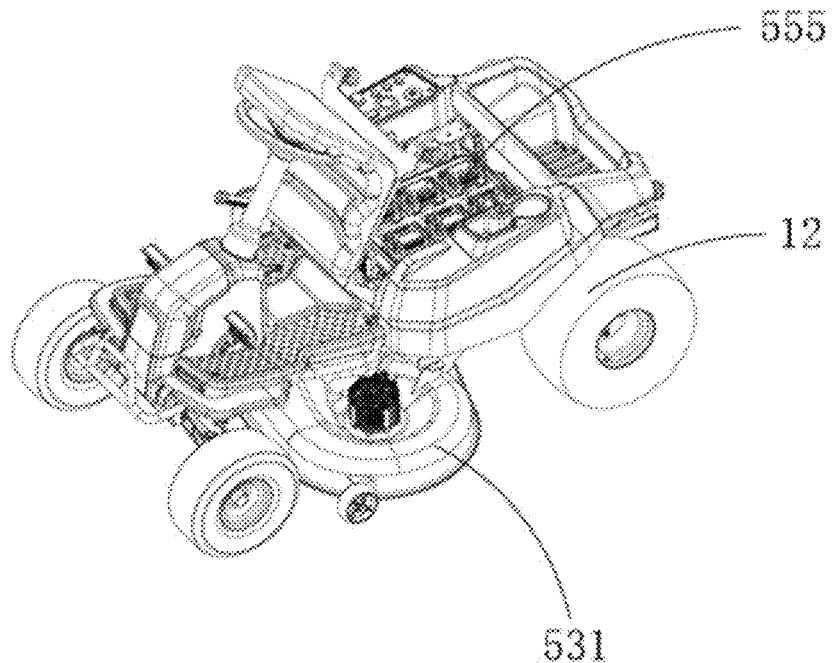
FIG. 43 is a schematic diagram of the structure of an electric vehicle.

As shown in FIG. 43, the present invention also discloses an electric tool 100, including a traveling mechanism 12, an operating mechanism 531, a control mechanism (not shown) that controls the operation of the traveling mechanism 12 and the operating mechanism 531, and a number of battery assemblies 555 And the battery assembly management device. In this embodiment, the operating mechanism 531 may be a mowing component, but in other embodiments, the operating mechanism 531 may also be other functional components. In this embodiment, the control mechanism controls the walking mechanism 12 and the operating mechanism 531 at the same time. However, in other embodiments, a walking control mechanism for controlling the walking mechanism 12 and the operation of the operating mechanism 531 may be separately provided. Control agency. The battery assembly management device controls the plurality of battery assemblies 555 to work together in parallel to supply power to the traveling mechanism 101 and the operating mechanism 102. When the number of battery assemblies 555 whose power is greater than the first power threshold $Q_1$ is not less than $N_1$, the control unit 583 sends a performance priority signal to the control mechanism, and the control mechanism does not respond to the traveling mechanism 101 and the operating mechanism 102. As a limit, the traveling mechanism 101 can travel at a maximum speed $V_m$, and the operating mechanism 102 can perform work at a maximum rotation speed $R_m$. At this time, the electric tool 100 is in the performance priority mode, that is, the first state, which can cope with the complex and heavy-duty grass conditions. When the number of battery components 555 whose power is greater than the first power threshold $Q_1$ is less than $N_1$, and the number of battery components 555 whose power is greater than the second power threshold $Q_2$ is not less than $N_2$, the control unit 583 sends a current limiting signal to the A control mechanism, the control mechanism controls the walking mechanism 12 and the operating mechanism 531 to run at a mid-range speed. At this time, the maximum operating speed of the walking mechanism 12 is $k_3*V_m$, and the maximum rotational speed of the operating mechanism 531 is $k_4*R_m$, so that the output current of the battery assembly 555 is not greater than the upper limit $k_1*I_m$. At this time, the electric tool 100 is in the energy-saving mode, that is, the second state, which can cope with lighter grass conditions. When the number of battery assemblies 555 whose power is greater than the second power threshold $Q_2$ is less than $N_3$, the control unit 583 sends a current limiting signal to the control mechanism, and the control mechanism controls the walking mechanism 12 and the operating mechanism 531 to operate at low gears. At this time, the maximum operating speed of the traveling mechanism is $k_5*V_m$, and the maximum rotational speed of the operating mechanism 531 is $k_6*R_m$, so that the output current of the battery assembly 555 does not exceed the upper limit $k_2*I_m$. At this time, the electric tool 100 is in the super energy-saving mode, that is, the third state, which can cope with simple grass conditions. In this embodiment, the number of the battery assembly 555 is, for example, 6, the $Q_1$ is 50%, the $Q_2$ is 20%, the $N_1$ is 4, and the $N_2$ and $N_3$ are 2. The $k_3$ and $k_4$ are 0.6, and the $k_5$ and $k_6$ are 0.6. Of course, the values of $Q_1$, $Q_2$, $N_1$, $N_2$, $N_3$, $k_3$, $k_4$, $k_5$, and $k_6$ can also be set as required.

As shown in FIG. 43, when the number of battery assemblies 555 whose power is greater than the second power threshold Q2 is less than $N_3$, the electric tool 100 is controlled to be in the third state; it can also be set as: when the power is greater than the third power threshold $Q_3$ When the number of battery assemblies 555 is less than $N_3$, the electric tool 100 is controlled to be in the third state, where: $Q_3 \leq Q_2$.

Therefore, the battery component management device of the present invention can intelligently switch the working mode of the load according to the power and quantity of the battery components, thereby prolonging the working time of the load, avoiding the abuse of battery components being overused, and improving the overall working efficiency of the load.

Figure 44:
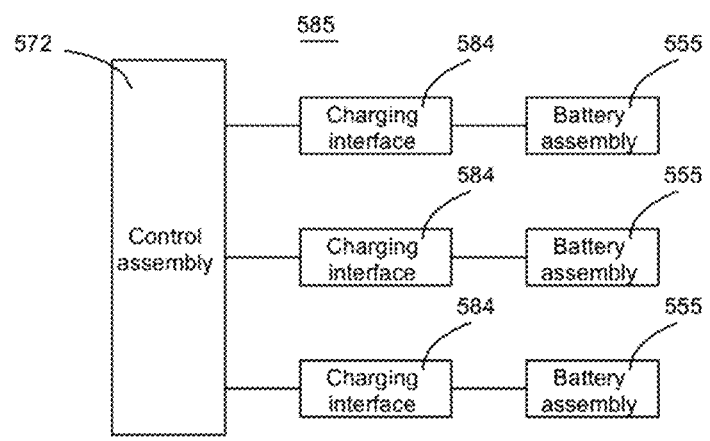
FIG. 44 is a schematic diagram of the module of the charger of the present invention.

As shown in FIG. 44, the present invention discloses a charger 585, which includes at least two charging ports 584 and a control component 572 for controlling the charging ports 584.

As shown in FIG. 44, the charging interface 584 is used to connect a battery assembly 555 (or a power supply unit) of the same specification to be charged, and the battery assembly 555 connected to it forms a charging circuit. The battery assembly 555 can be a single battery or a battery pack composed of multiple single batteries. The charging circuit is provided with a switch (not shown) to be turned on or off under the control of the control component 572. The switch can be a MOS tube, a relay, and so on. Each of the charging circuits has a corresponding priority level and a level status corresponding to the priority level. The priority level is used to indicate the priority charging sequence of the charging circuit among all charging circuits. Usually, you can use a number to indicate the priority level. For example, suppose a charger has three charging ports A, B, and C, and set the priority level of the charging circuit corresponding to the charging port B to 1, the priority level of the charging circuit corresponding to the charging port A to 2, and the charging port corresponding to the C charging port. The priority level of the charging circuit is 3; when the charger is working, the charger first charges the battery component connected to the charging port B, then the battery component connected to the charging port A, and finally the battery component connected to the charging port C Charging, where the numbers 1, 2, and 3 indicate the priority levels of the charging circuits corresponding to the A, B, and C charging ports. Of course, it is understandable that there are many ways to express the priority levels, which will not be listed here. The control component 572 obtains the status information of the battery component 555 corresponding to each charging circuit before charging, and determines the priority level of the corresponding charging circuit and the level status corresponding to the priority level according to the status information of the battery component 555. The control component 572 communicates with the battery component 555 through a CAN bus or a serial port and obtains status information of the battery component 555. The status information is the remaining power of the battery assembly 555 before charging or the voltage before charging. The level state may be the remaining power of the battery assembly 555 before charging, or the ratio of the remaining power of the battery assembly 555 before charging to the capacity of the battery assembly 555. Of course, it is understandable that the level state may also be the voltage before the battery assembly 555 is charged, or the ratio of the voltage before the battery assembly 555 is charged to the voltage when the battery assembly 555 is fully charged. For example, suppose a charger has three charging ports A1, B1, and C1, and it charges A1 battery pack, B1 battery pack, and C1 battery pack respectively. The remaining power of A1 battery pack is 40% of the total power. The remaining power is 20% of the total power, and the remaining power of the C1 battery pack is 60% of the total power, then the priority level corresponding to the B1 charging interface is 1, and the corresponding level status is 20%; the priority level corresponding to the A1 charging interface If it is 2, the corresponding level status is 40%; the priority level corresponding to the C1 charging interface is 3, and the corresponding level status is 60%. In this embodiment, each priority level corresponds to one charging interface 30 or charging circuit, but in other embodiments, it can also be set as a priority level corresponding to multiple charging interfaces 30 or charging circuits. In this case, the priority level corresponds to Multiple charging ports 30 or charging circuits work at the same time. For example, when the level states corresponding to any two charging circuits are the same, the priority levels corresponding to the two charging circuits are set to be the same. Of course, in other embodiments, the status information and level status information can also be represented by the time required for the battery assembly 555 to be fully charged.

Figure 45:
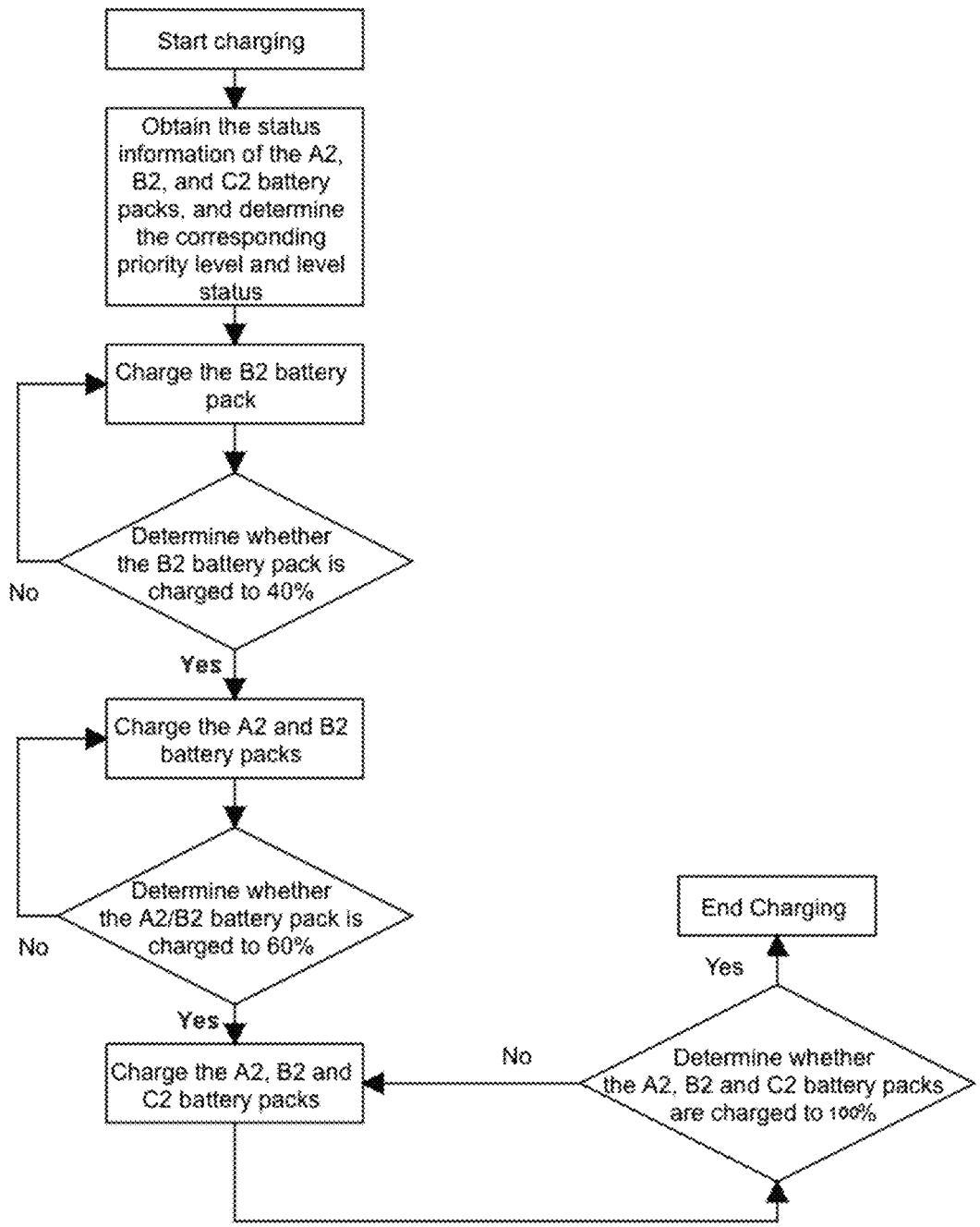
FIG. 45 is a schematic flowchart of an embodiment of a charger control method of the present invention.

As shown in FIGS. 44-45, the control component 572 sequentially controls the operation of the corresponding charging loops according to the priority order. When the currently working charging circuit charges the corresponding battery component 555 to the level state corresponding to the next priority level, the control component 572 controls the charging circuit corresponding to the next priority level to work together with the currently working charging circuit, and so on, Until all the charging circuits are in working state, so as to charge the battery components 555 corresponding to the charging circuits to the full state at the same time. With this configuration, battery assemblies 555 of different power levels can be fully charged at the same time, thereby effectively avoiding problems such as overcharging of the battery pack and discharging of the battery pack during charging, thereby increasing the service life of the battery pack. For example, suppose a charger has three charging interfaces A2, B2, and C2, and respectively charge A2 battery packs with 40% status information, B2 battery packs with 20% status information, and C2 battery packs with 60% status information. The control component 572 obtains the status information of the A2, B2, and C2 battery packs, and sorts them from small to large, so as to determine that the priority level corresponding to the A2 battery pack is 2, the corresponding level status is 40%, and the B2 battery pack corresponds to The priority level is 1, the corresponding level status is 20%, the priority level corresponding to the C2 battery pack is 3, and the corresponding level status is 60%. Then, the control component 572 first controls the operation of the charging circuit corresponding to the B2 battery pack. When the B2 battery pack is charged to 40%, the control component 572 controls the charging circuit corresponding to the A2 battery pack to work with the charging circuit corresponding to the B2 battery pack. When the A2 or B2 battery pack is charged to 60%, the control component 572 controls the charging circuits corresponding to the A2, B2, and C2 battery packs to work at the same time to charge the A2, B2, and C2 battery packs to a fully charged state.

As shown in FIGS. 44-45, before controlling the operation of the charging circuit, the control component 572 obtains the internal information of the battery component 555 and determines whether the battery component 555 is abnormal. If the battery assembly 555 is abnormal, the control assembly 572 closes the charging circuit corresponding to the battery assembly 555 and sends an abnormal signal. The abnormality may be the lack of a single battery in the battery pack, the excessively high voltage of the single battery, and so on. The abnormal signal may be represented by an indicator light corresponding to the charging interface 584. For example, the flashing indicator light can be used to indicate that the battery pack is abnormal. After the fault of the abnormal battery assembly 555 is eliminated, the control assembly 572 re-determines the priority level corresponding to each charging circuit. When the power or voltage of the battery component 555 after the fault is eliminated is less than the power or voltage of the battery component 555 corresponding to the currently working charging circuit, the control component 572 closes all the currently working charging circuits and controls the faulty The charging circuit corresponding to the battery assembly 555 works.

As shown in FIGS. 44-45, when the control component 572 controls the charging circuit to work, the control component 572 simultaneously detects the charging temperature of the battery component 555 corresponding to the charging circuit. If the charging temperature is abnormal, the control component 572 controls the charging circuit to close, and at the same time sends out an abnormal reminder.

Figure 46:
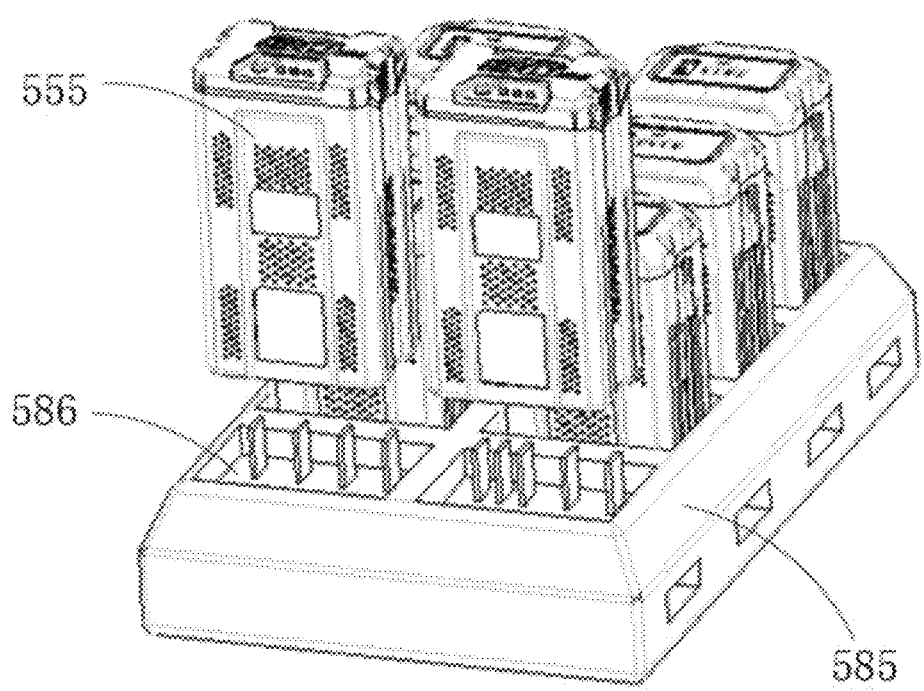
FIG. 46 is a schematic diagram of the cooperation between a charger and a battery assembly according to an embodiment of the present invention.
Figure 47:
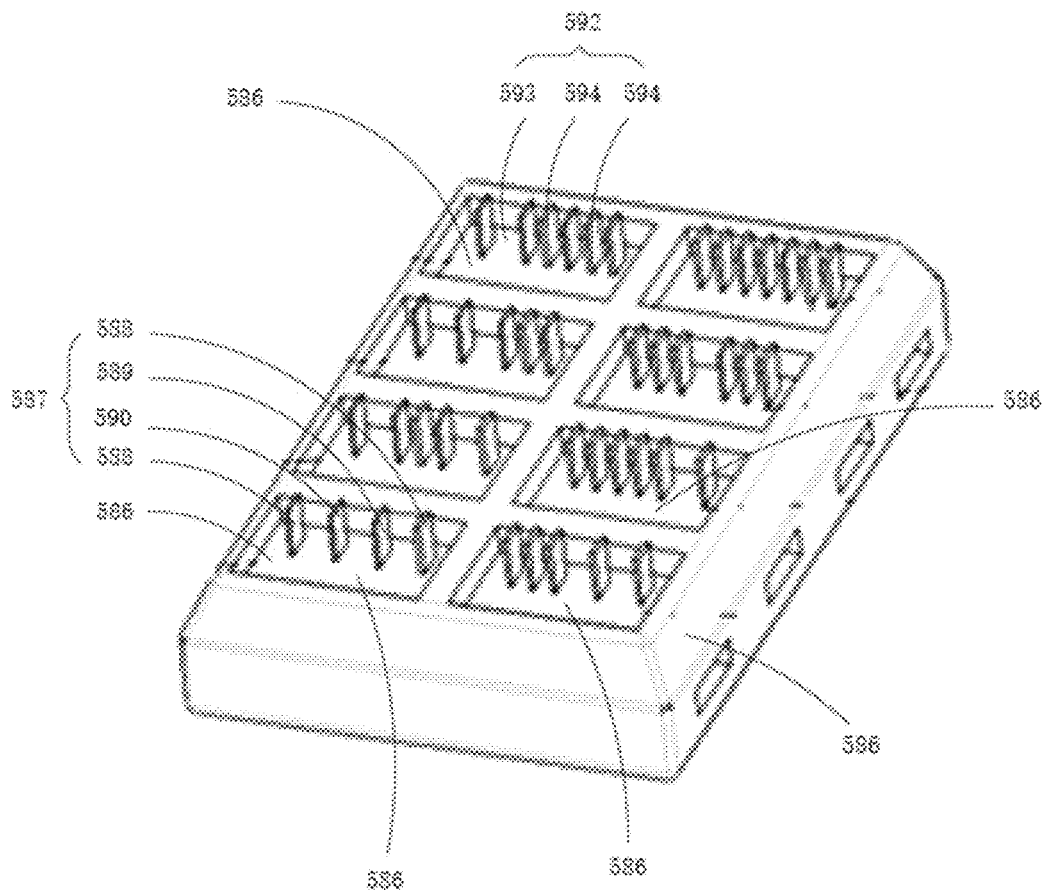
FIG. 47 is a three-dimensional schematic diagram of the charger shown in FIG. 46.

As shown in FIGS. 46-47, the charger 585 is provided with a battery compartment 586 corresponding to the charging interface 584 and accommodating the battery assembly 555, and a battery compartment 586 for detecting whether the battery assembly 555 is in the battery compartment 586. Detection sensor (not shown). When the detection sensor detects the battery assembly 555 and the control assembly 572 cannot obtain the status information of the corresponding battery assembly 555, the charger 585 sends an abnormal signal to remind the user that the battery assembly 555 is not plugged in. The detection sensor may be a gravity sensor, a distance sensor, etc. installed in the battery compartment 586. The battery compartment 586 is provided with a conductive terminal group 587 and a positioning insert assembly 592, and the conductive terminal group 587 and the positioning insert assembly 592 are spaced apart from each other. The conductive terminal group 587 includes a pair of charging terminals 588, a communication terminal 590, and a charging positive electrode 589. The positioning insert assembly 592 includes a space 593 and a positioning insert 594. The battery compartment 586 determines the address through different combinations of the positions and numbers of the empty positions 593 and the positioning inserts 594. For example, the logical address of the battery compartment 5861 is 000, the logical address of the battery compartment 5862 is 585, the logical address of the battery compartment 5863 is 110, and the logical address of the battery compartment 5864 is 011. The battery assembly 555 is provided with a positioning slot assembly (not shown) that cooperates with the positioning insert assembly 592. The control component 572 determines the address of the battery component 555 according to the mating state of the positioning insert component 592 and the positioning socket component. Of course, it can be understood that, in other embodiments, the control component 572 can also dynamically assign an address to the charging interface 584 connected to the battery component 555 or the corresponding charging circuit.

Figure 48:
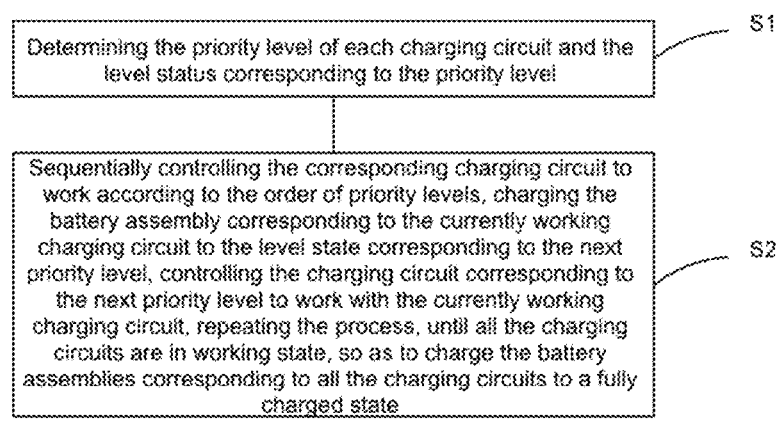
FIG. 48 is a flowchart of the charging control method of the present invention.

As shown in FIG. 48, the present invention also provides a charging control method, which includes the following steps:

S1: Determine the priority level of each charging loop and the level status corresponding to the priority level.

S2: Control the operation of the corresponding charging circuit in sequence according to the priority level, and charge the battery component corresponding to the current working charging circuit to the level state corresponding to the next priority level, and then control the charging circuit corresponding to the next priority level to the current working The charging circuits work together, and so on, until all the charging circuits are in working state, so as to charge the battery components corresponding to all the charging circuits to a fully charged state.

The step S1 also includes: detecting whether the battery assembly corresponding to the charging interface is abnormal; if the battery assembly is abnormal, closing the charging circuit corresponding to the battery assembly.

The step S2 further includes: when the charging circuit is working, detecting the charging temperature of the battery assembly corresponding to the charging circuit; if the charging temperature is abnormal, closing the charging circuit corresponding to the battery assembly.

Therefore, the charger 585 of the present invention can control the charging circuit positioning insert components of different priority levels to work together according to the priority levels, so that battery packs of different power levels can be fully charged at the same time, thereby effectively avoiding overcharging of the battery pack and battery during charging. Problems such as battery pack discharge, thereby increasing the service life of the battery pack.

Figure 49:
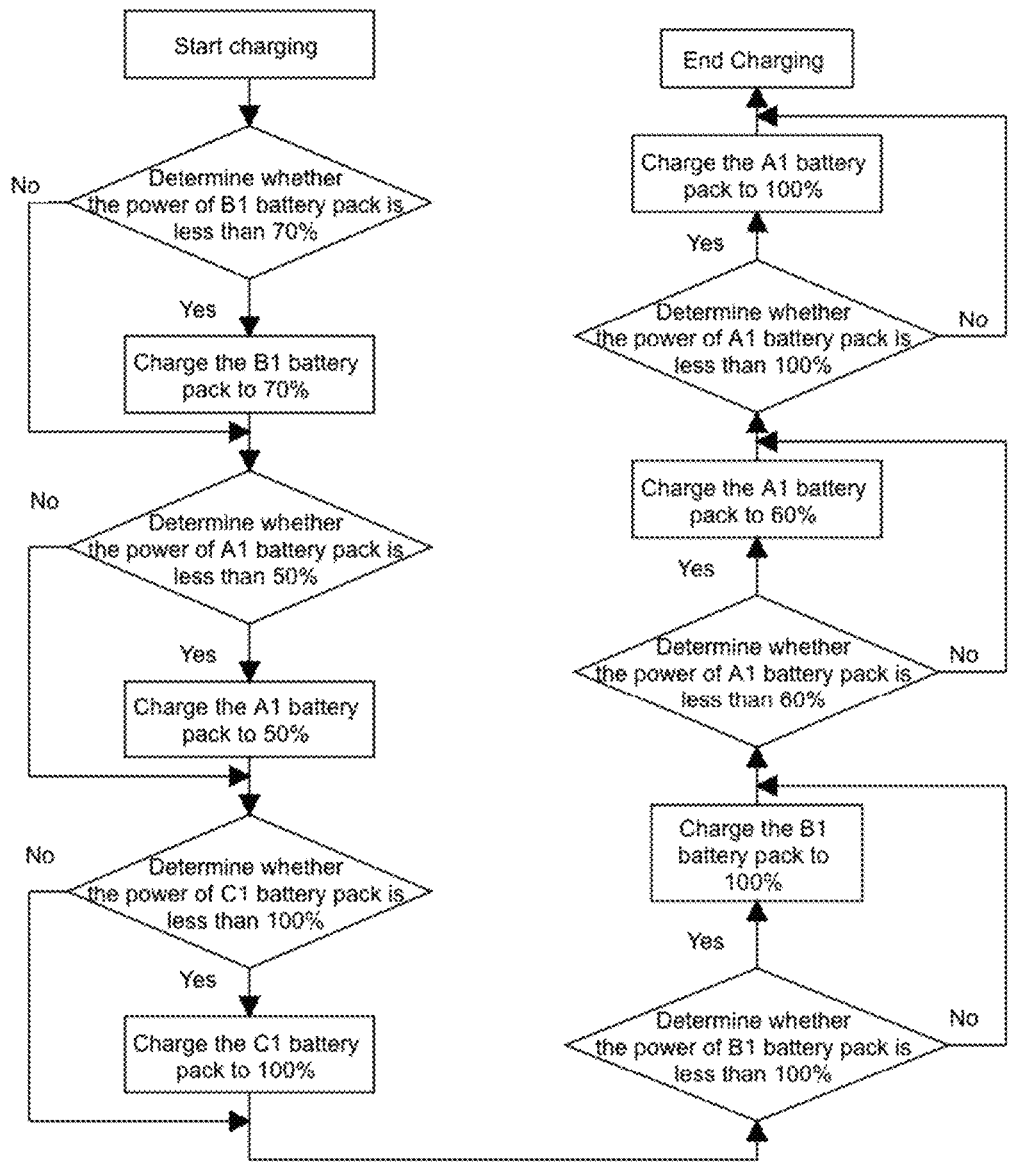
FIG. 49 is a schematic flowchart of an embodiment of a charger control method of the present invention.

As shown in FIG. 44 and FIG. 49, the control component 572 sequentially controls the corresponding charging loops according to the priority order to charge the corresponding battery component 555 to the corresponding level state, and then controls the corresponding battery components in sequence according to the priority order again. The charging loop works to charge the corresponding battery assembly 555 to the next corresponding level state, and so on, until all the battery assemblies 555 are in a fully charged state. For example, suppose a charger has three charging ports A1, B1, and C1. The priority levels are 2, 1, and 3 respectively, and the A1 battery pack, B1 battery pack, and C1 battery pack are charged respectively; the A1 charging port has 50%, There are three levels of 60% and 100%. The B1 charging interface has two levels of 70% and 100%. The C1 charging interface has a level of 100%. When the charger is working, the charger first sets the B1 of the B1 charging interface. Charge the battery pack to 70% of the total power, then charge the A1 battery pack of the A1 charging port to 50% of the total power, then charge the C1 battery pack of the C1 charging port to 100% of the total power, and then charge the B1 charging port to 100% of the total power. Charge the B1 battery pack to 100% of the total power, then charge the A1 battery pack of the A1 charging port to 60% of the total power, and finally charge the A1 battery pack of the A1 charging port to 100% of the total power. The control component 572 sequentially controls the corresponding charging loop to work once according to the priority order to charge the corresponding battery component 555 to a corresponding level state. This process is defined as a charging round.

As shown in FIG. 49, before controlling the operation of the charging circuit, the control component 572 obtains the status information of the battery component 555 and determines whether the battery component 555 is abnormal. If the battery assembly 555 is abnormal, the control assembly 572 closes the charging circuit corresponding to the battery assembly 555, sends an abnormal signal, and kicks the charging interface 584 corresponding to the battery assembly 555 out of the current charging round. The abnormality may be the lack of a single battery in the battery pack, the excessively high voltage of the single battery, and so on. The abnormal signal may be represented by an indicator light corresponding to the charging interface 584. For example, the flashing indicator light can be used to indicate that the battery pack is abnormal. When the fault of the battery assembly 555 is eliminated, the control assembly 572 re-determines the priority level corresponding to each charging interface 584 and starts a new charging round. Of course, the control component 572 can also re-determine the priority levels of all the charging ports 584 after the charging round in the current priority order is completed.

As shown in FIG. 49, the charger 585 is provided with a battery compartment (not shown) corresponding to the charging interface 584 and accommodating the battery assembly 555, and a detection sensor for detecting whether there is a battery assembly 555 in the battery compartment. When the detection sensor detects the battery assembly 555 and the control assembly 572 cannot obtain the status information of the corresponding battery assembly 555, the charger 585 sends an abnormal signal to remind the user that the battery assembly 555 is not plugged in. The detection sensor may be a gravity sensor, a distance sensor, etc. installed in the battery compartment.

As shown in FIG. 49, when the control component 572 controls the charging circuit to work, the control component 572 also detects the charging temperature of the battery component 555 corresponding to the charging circuit at the same time; if the charging temperature is abnormal, the control The component 572 controls the charging circuit to close, sends an abnormal signal, and kicks the charging interface 584 corresponding to the charging circuit out of the current charging round.

As shown in FIG. 49, each level status has a first level status value and a second level status value; the control component 572 first determines whether the battery component 555 corresponding to the charging interface 584 meets the first level status value; if the charging interface If the battery component 555 corresponding to 584 meets the first-level state value, the control component 572 closes the charging circuit corresponding to the charging interface 584; if the battery component 555 corresponding to the charging interface 584 does not meet the first-level state value, the control component 572 controls the operation of the charging circuit corresponding to the charging port 584 to charge the battery component 555 corresponding to the charging port 584 to the second level state value. It can be understood that the state value of the first level and the state value of the second level may be equal or different. The following is an example. Assume that a battery pack has an A2 charging interface, a B2 charging interface, and a C2 charging interface, and the priority levels are 1, 2, and 3 respectively, and the A2 battery pack, the B2 battery pack, and the C2 battery pack are charged respectively. The A2 charging interface has a level A status and a level B status, the B2 charging interface has a level C status and a level D status, and the C2 charging interface has a level E status; the first level status value of the level A status is 50%, and the second level status value 60%; the first level status value and the second level status value of the B level status are 100%; the first level status value of the C level status is 80%, the second level status value is 90%; the D level status The first-level status value and the second-level status value are both 100%; the first-level status value and the second-level status value of the E-level status are both 100%.

Figure 50:
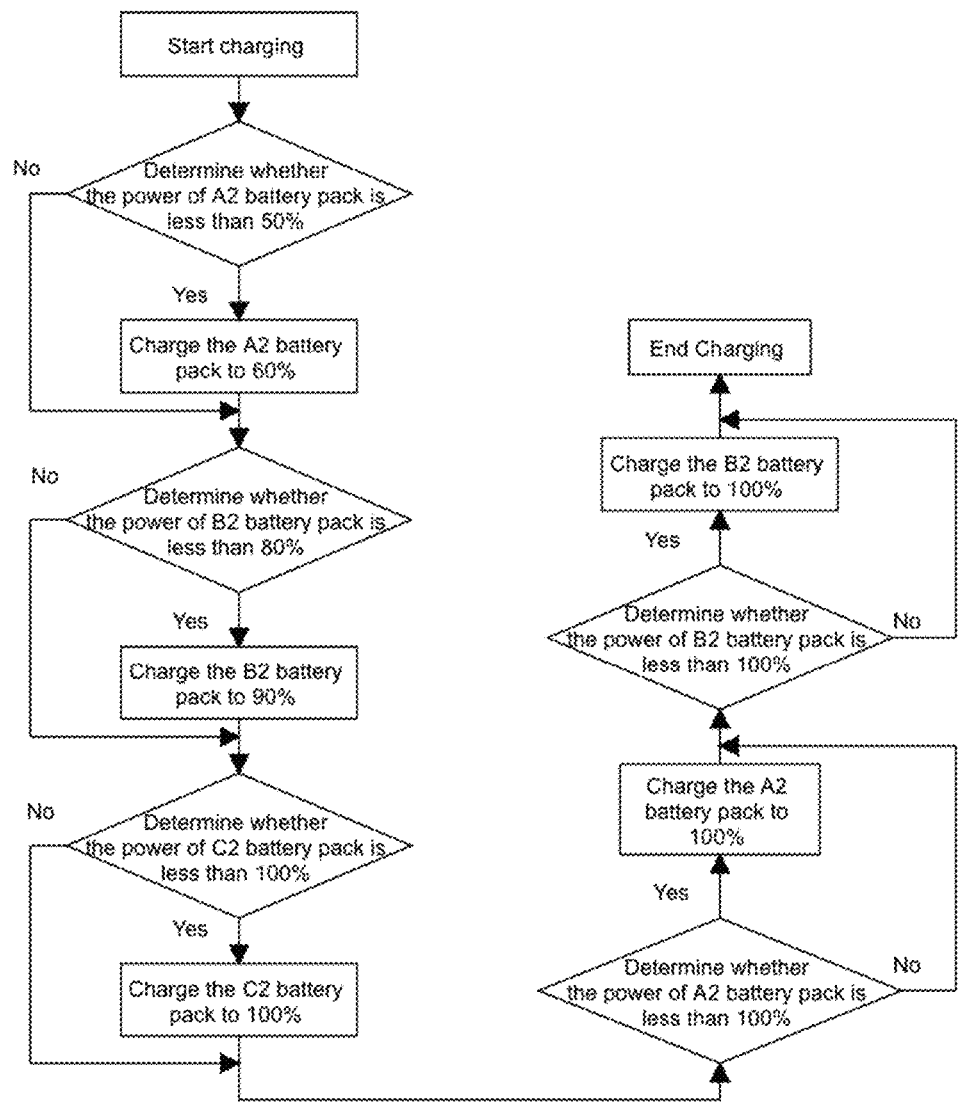
FIG. 50 is a schematic flowchart of another embodiment of a charger control method of the present invention.

As shown in FIG. 50, the working sequence of the charger is as follows:

P1: Determine whether the power of the A2 battery pack is less than 50%; if so, charge the power of the A2 battery pack to 60%, and then skip to step P2.

P2: Determine whether the power of the B2 battery pack is less than 80%; if so, charge the power of the B2 battery pack to 90%, and then skip to step P3.

P3: Determine whether the power of the C2 battery pack is less than 100%; if so, charge the power of the C2 battery pack to 100%, and then skip to step P4.

P4: Determine whether the power of the A2 battery pack is less than 100%; if so, charge the power of the A2 battery pack to 100%, and then skip to step P5.

P5: Determine whether the power of the B2 battery pack is less than 100%; if so, charge the power of the B2 battery pack to 100%.

Figure 51:
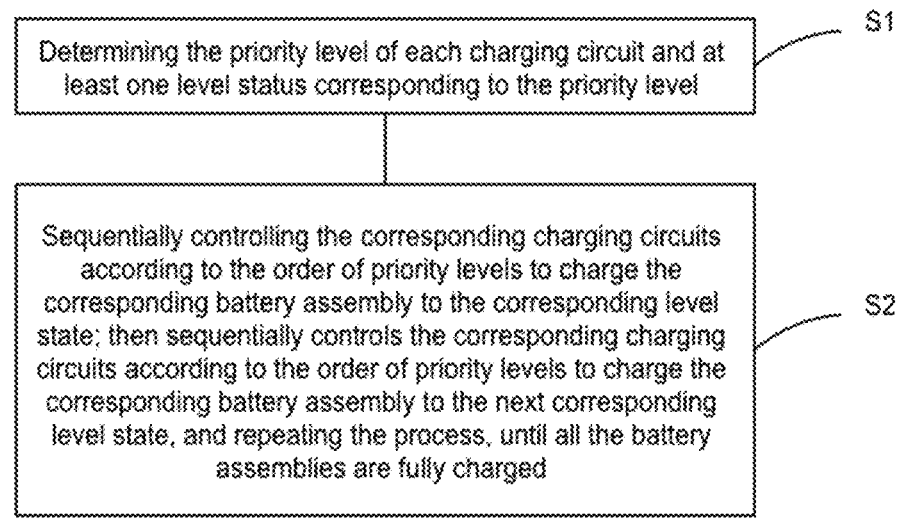
FIG. 51 is a flowchart of the charging control method of the present invention.

As shown in FIG. 51, the present invention also discloses a charging control method, which includes the following steps:

S1: Determine the priority level of each charging loop and at least one level state corresponding to the priority level;

S2: Control the corresponding charging circuits in sequence according to the priority order to charge the corresponding battery components to the corresponding level state; then control the corresponding charging circuits in sequence according to the priority order to charge the corresponding battery components to the next corresponding level Status, and so on, until all battery components are fully charged.

The step S1 also includes: detecting whether the battery assembly corresponding to the charging interface is abnormal; if the battery assembly is abnormal, closing the charging circuit corresponding to the battery assembly.

The step S2 further includes: after completing a charge in the priority order, that is, after completing a charge round, re-determining the priority level of each charging loop.

Figure 52:
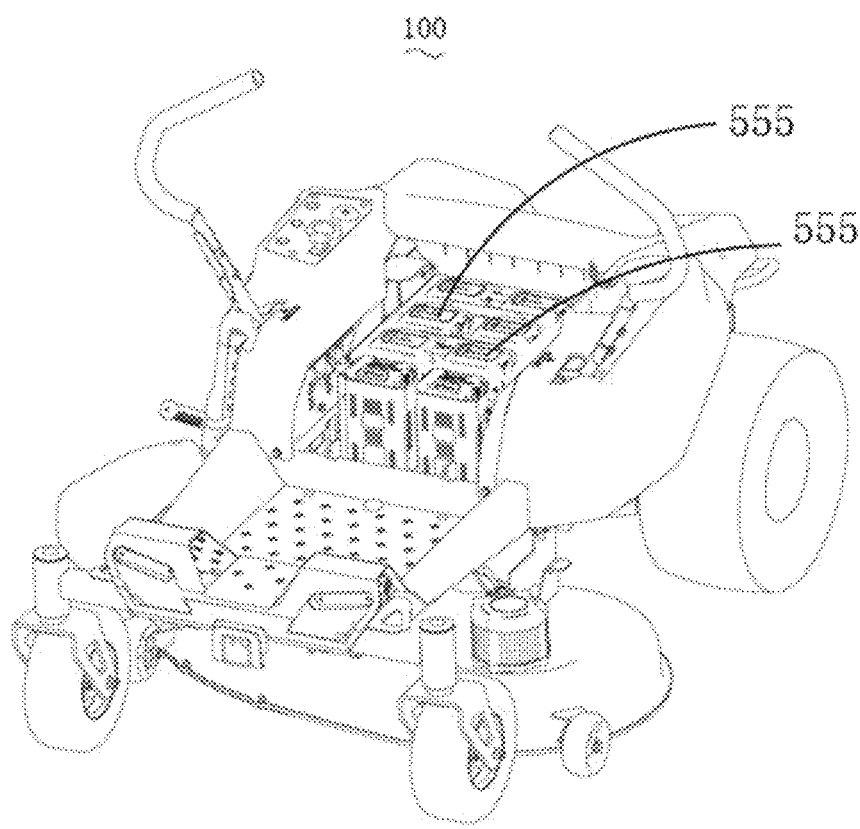
FIG. 52 is a schematic diagram of a three-dimensional structure of an electric tool.

As shown in FIG. 52, the present invention also discloses an electric tool 100, which includes at least two battery assemblies 555 and a charging system. The battery assembly 555 is installed on the electric tool 100 and supplies power to the electric tool 100. The charging system and the electric tool 100 may be arranged in a separate structure, or may be arranged in an integrated structure, that is, the charging system is fixedly installed on the electric tool 100. The charging system includes at least two charging interfaces and control components that are matched with the battery assembly 555. The structure of the charging interface and the control assembly and the mutual cooperation relationship are the same as those of the charging interface 584 and the control assembly 572 described above.

Therefore, the charger 585 of the present invention can intelligently charge several battery packs step by step according to the priority level, so that the power levels of the several battery packs are matched with each other, so that the several battery packs cooperate to supply power to the device, which is convenient for the user to use the device in emergency. This effectively improves the user experience.

The above description is only a preferred embodiment of the present invention and an explanation of the technical principles used. Those skilled in the art should understand that the scope of the invention involved in the present invention is not limited to a technical solution formed by a specific combination of the above technical features. At the same time, it should also cover other technical solutions formed by arbitrarily combining the above technical features or their equivalent features without departing from the inventive concept. For example, the above features are similar to those disclosed in the present invention (but not limited to). The technical solution formed by replacing the technical features of the function with each other.

The invention claimed is:

1. An electric vehicle, including:
    frame;
    a first power consuming unit and a second power consuming unit, the first power consuming unit and the second power consuming unit are connected to the frame; and
    a battery system includes a battery accommodating part connected to the frame, the battery accommodating part having a first power supply unit, a second power supply unit, a third power supply unit, and a fourth power supply unit, the first, second, third, and fourth power supply units being arranged separately on the battery accommodating part, the first power supply unit and the second power supply unit each include at least one battery pack, and the first power supply unit separately supplies power to the first power consuming unit, the second power supply unit separately supplies power to the second power consuming unit;
    wherein, the at least one battery pack can be removed from the first power supply unit or the second power supply unit and directly coupled to a hand-held tool to supply power thereto.

2. The electric vehicle according to claim 1, wherein the number of the battery packs in the first power supply unit and the second power supply unit are the same or different.

3. The electric vehicle according to claim 1, wherein the first power consuming unit and the second power consuming unit are detachably connected to the frame.

4. The electric vehicle according to claim 1, further comprising a manipulation unit provided on the frame, and the manipulation unit is used to control the electric vehicle.

5. The electric vehicle according to claim 4, wherein the control unit is electrically connected to the first power consuming unit and the second power consuming unit.

6. The electric vehicle according to claim 4, wherein the manipulation unit further comprises a height adjustment unit, and the height adjustment unit is used to adjust the height of the electric vehicle.

\* \* \* \* \*